(12) United States Patent
Li et al.

(10) Patent No.: US 6,591,266 B1
(45) Date of Patent: Jul. 8, 2003

(54) SYSTEM AND METHOD FOR INTELLIGENT CACHING AND REFRESH OF DYNAMICALLY GENERATED AND STATIC WEB CONTENT

(75) Inventors: Wen Syan Li, Fremont, CA (US); Kasim Selouk Candan, Mountain View, CA (US); Divyakant Agrawal, Santa Barbara, CA (US)

(73) Assignee: NEC Corporation, Tokyo (JP)

( * ) Notice: Subject to any disclaimer, the term of this patent is extended or adjusted under 35 U.S.C. 154(b) by 395 days.

(21) Appl. No.: 09/639,208

(22) Filed: Aug. 14, 2000

Related U.S. Application Data

(60) Provisional application No. 60/218,418, filed on Jul. 14, 2000.

(51) Int. Cl.[7] .............................. G06F 17/30; G06F 7/00
(52) U.S. Cl. ................................ 707/10; 707/2; 707/9; 707/104.1
(58) Field of Search ...................... 707/4–10, 100–104.1

(56) References Cited

U.S. PATENT DOCUMENTS

| | | | | |
|---|---|---|---|---|
| 5,941,957 A | * | 8/1999 | Ingrassia et al. ............ 709/248 |
| 5,951,643 A | * | 9/1999 | Shelton et al. ............... 709/227 |
| 5,951,652 A | * | 9/1999 | Ingrassia et al. ............ 709/248 |
| 5,954,798 A | * | 9/1999 | Shelton et al. ............... 709/224 |
| 6,035,332 A | * | 3/2000 | Ingrassia et al. ............ 709/224 |
| 6,490,575 B1 | * | 12/2002 | Berstis ........................... 707/3 |

\* cited by examiner

Primary Examiner—Greta Robinson
Assistant Examiner—Linh Black
(74) Attorney, Agent, or Firm—Foley & Lardner

(57) ABSTRACT

A system for updating Web pages stored in cache based on modifications to data stored in a database is disclosed. The system for updating stored Web pages may be part of a larger system having a database management system for storing data used to generate Web pages. The database management system is capable of identifying modified data stored in the database. The system for updating stored Web pages is comprised of one or more servers programmed for maintaining associations between the stored Web pages and the stored data, and receiving the identity of modified data from the memory management system. In addition, the servers are capable of determining, from the identified modified data and the maintained associations, which stored Web pages are associated with the identified modified data. Furthermore, the servers are capable of communicating an update command to the cache that contains the stored Web pages associated with the identified modified data, for the purpose of updating the stored Web pages.

164 Claims, 20 Drawing Sheets

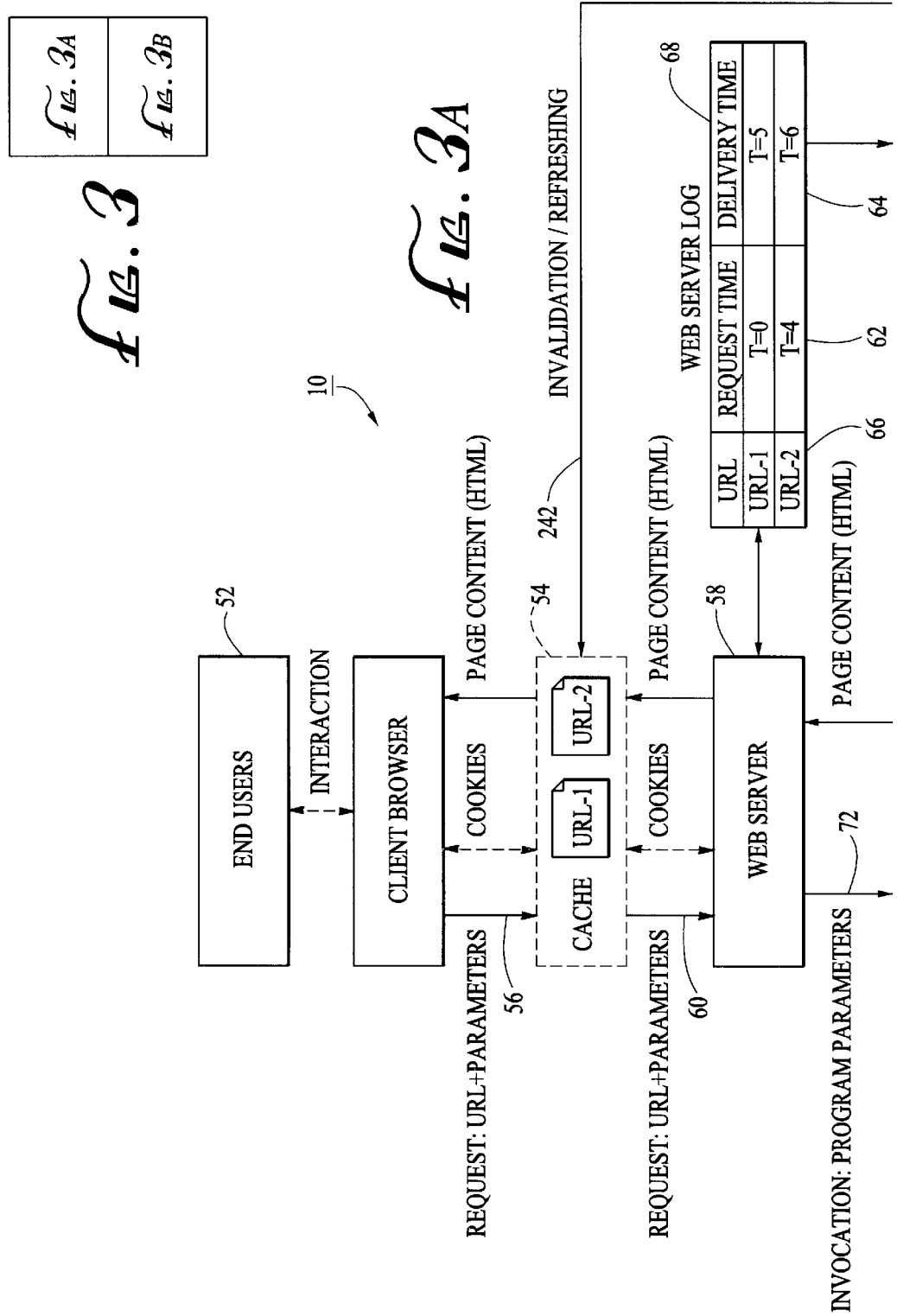

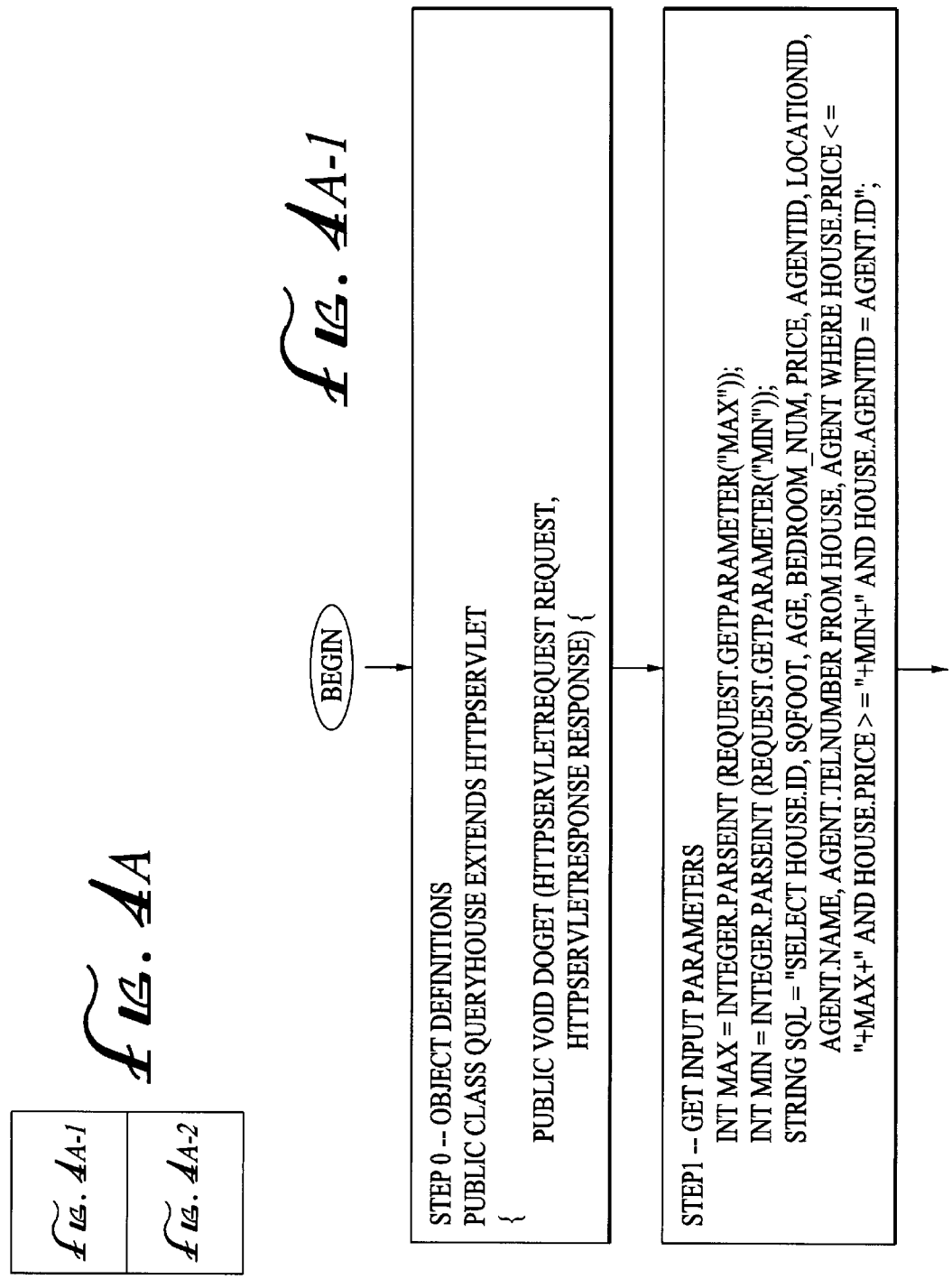

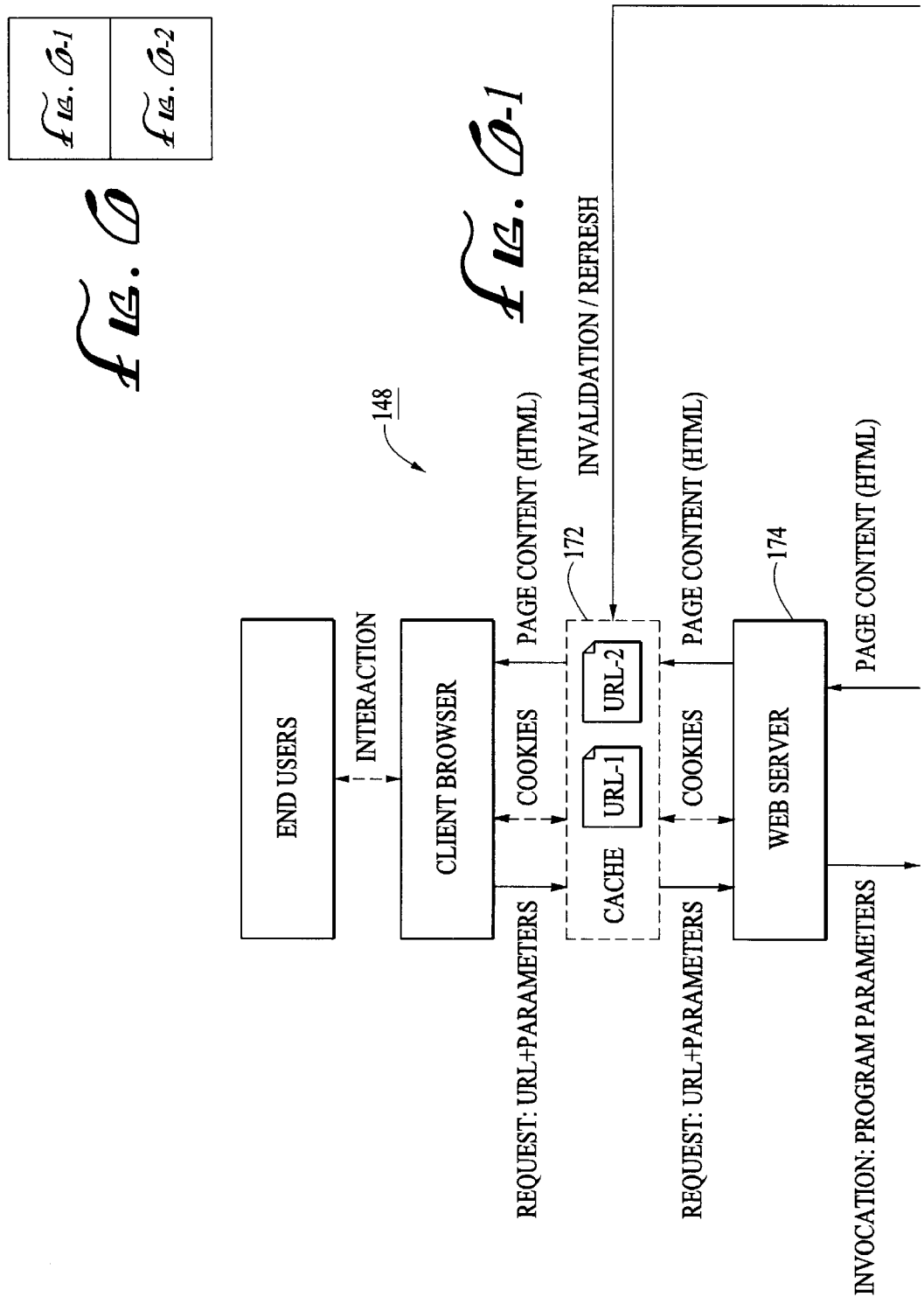

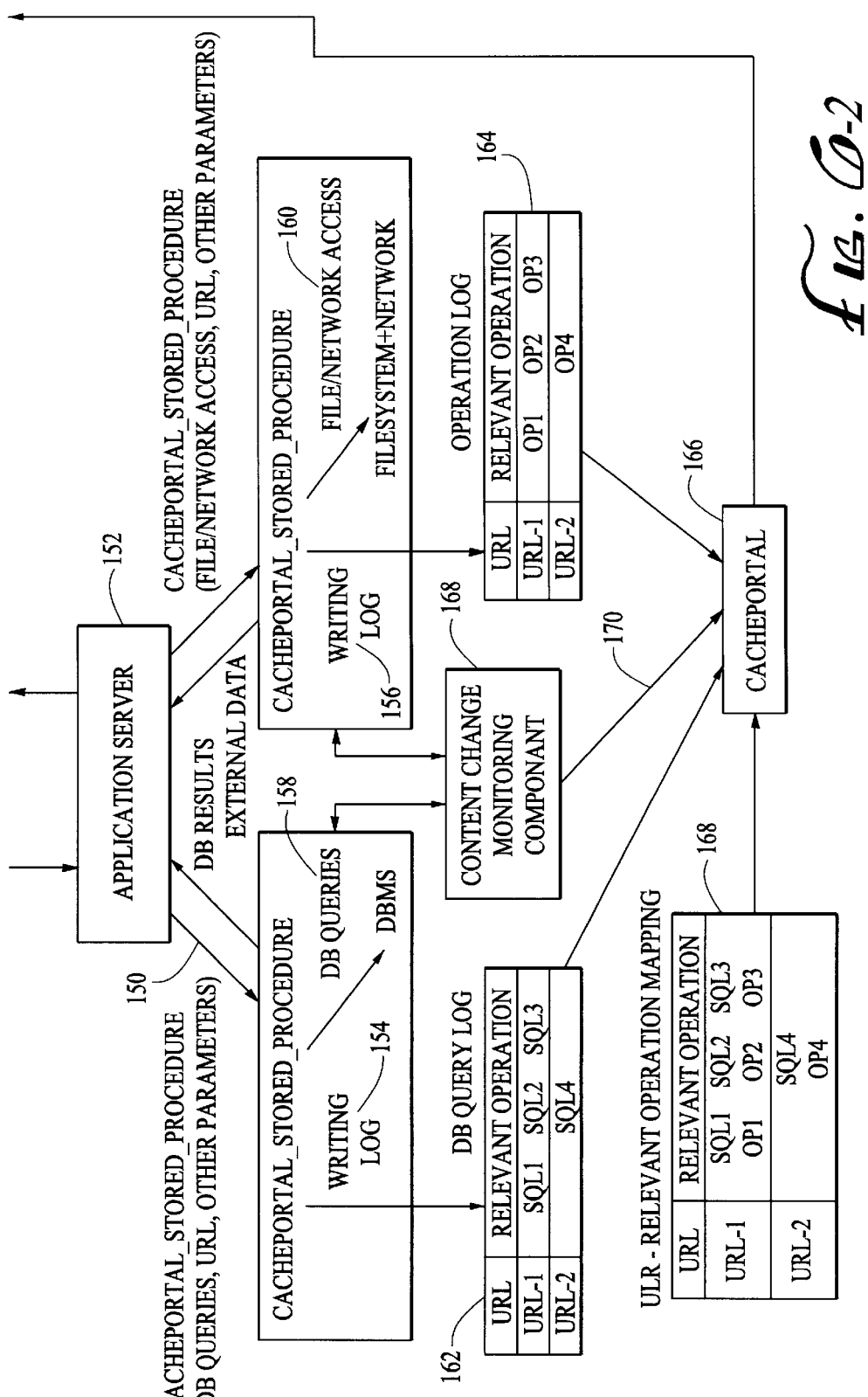

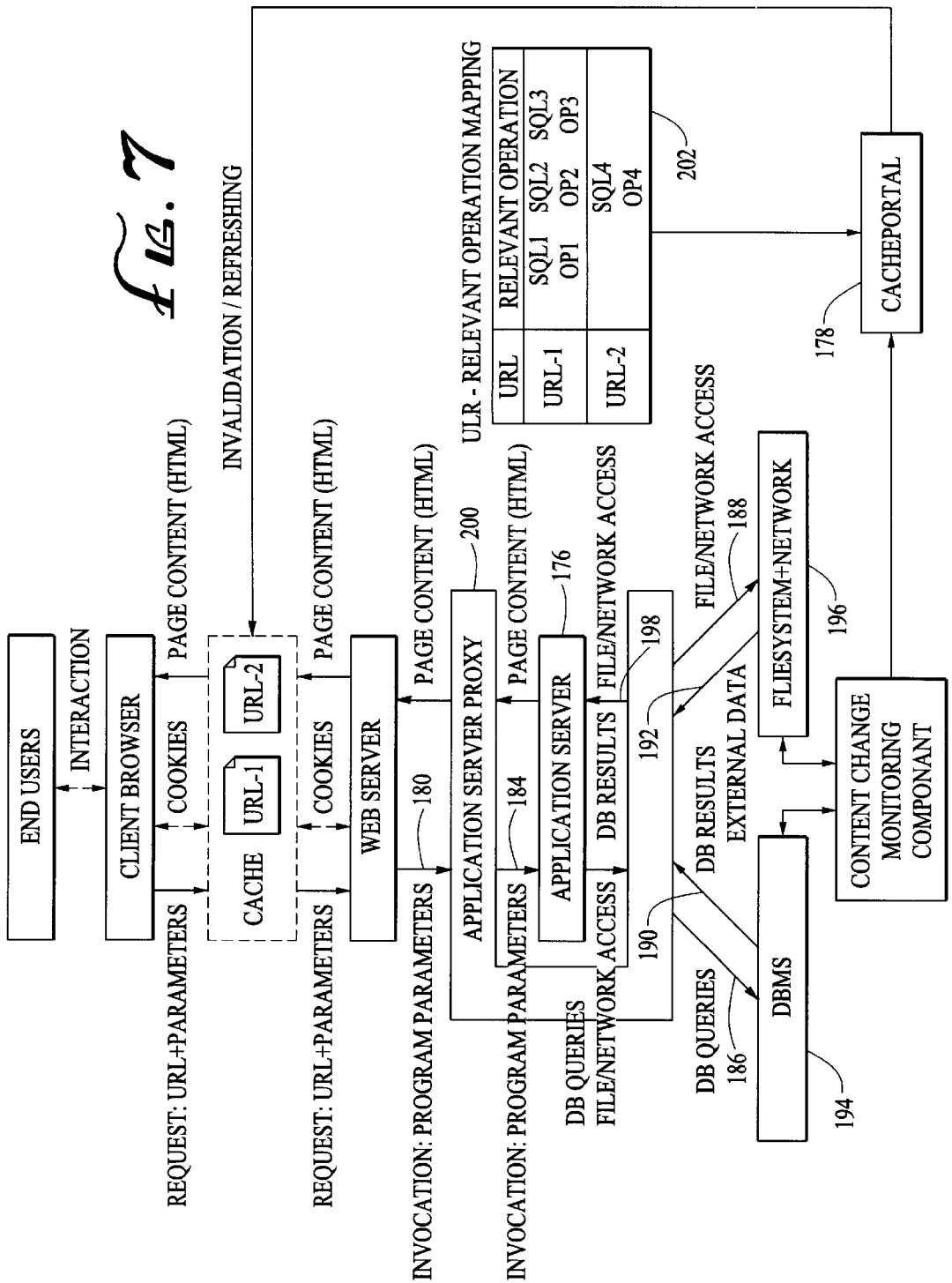

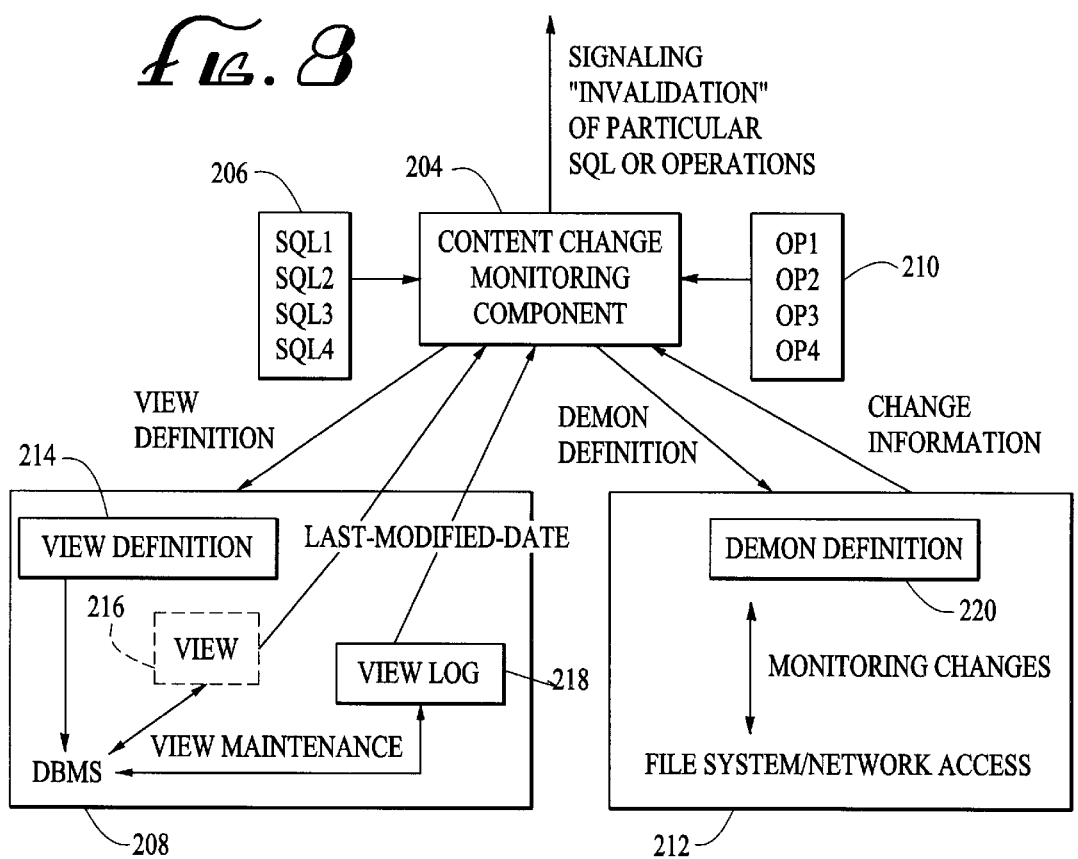

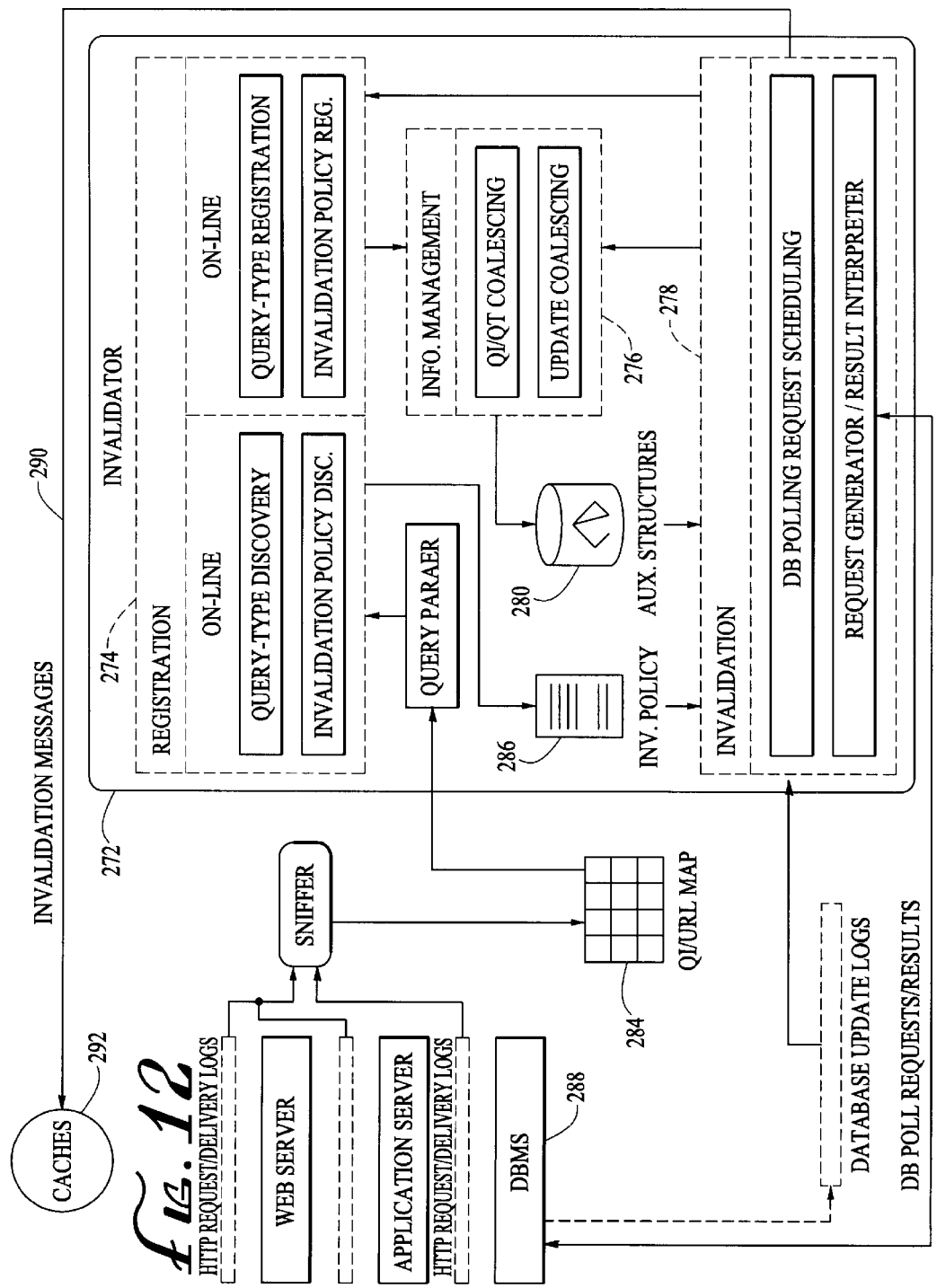

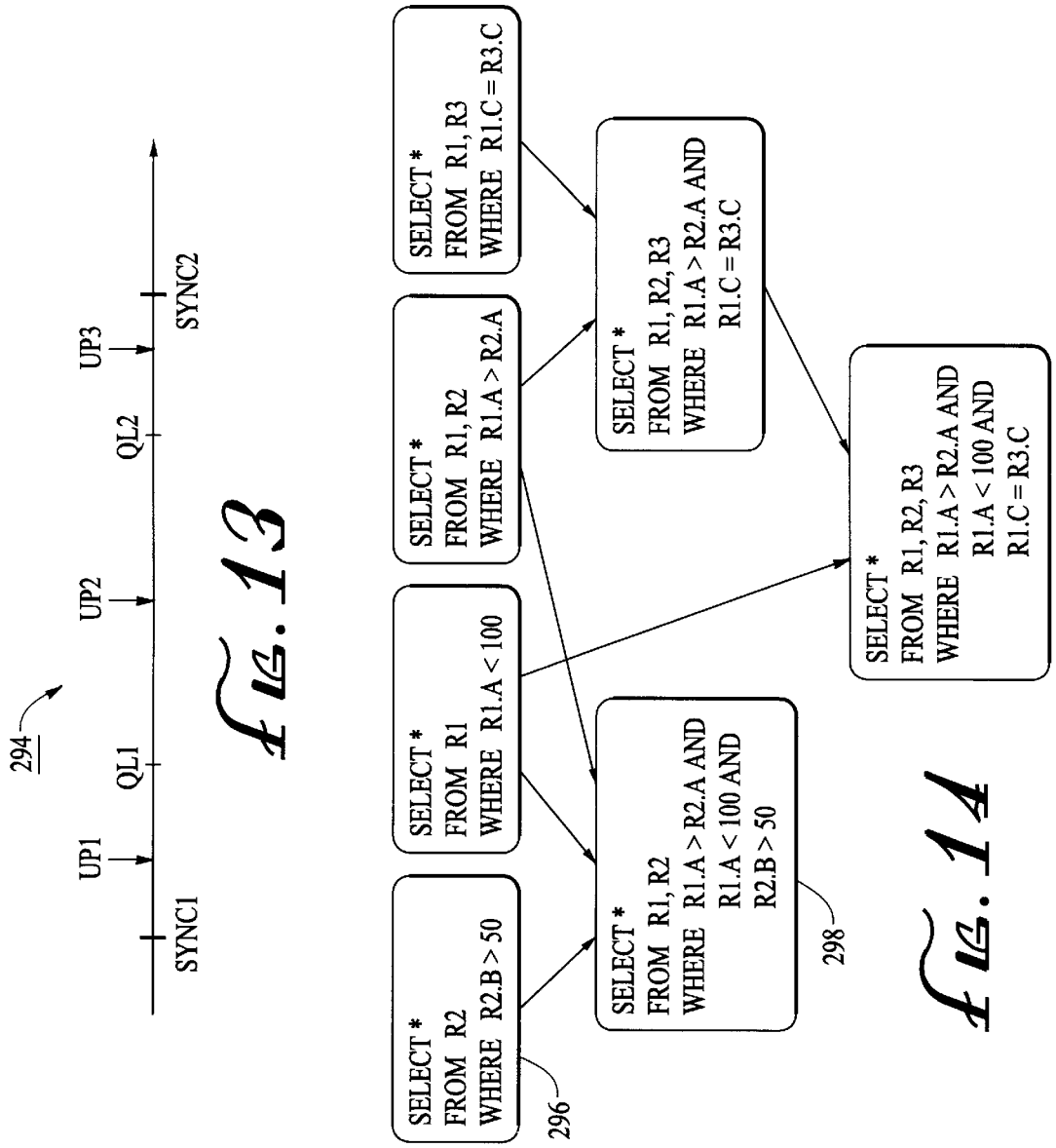

SYSTEM AND METHOD FOR INTELLIGENT CACHING AND REFRESH OF DYNAMICALLY GENERATED AND STATIC WEB CONTENT

CROSS-REFERENCE TO RELATED APPLICATIONS

Embodiments of the present invention claim priority from a U.S. Provisional Application entitled "Method and Apparatus for Intelligent Caching and Refresh of Dynamically Generated and Static Web Contents," Serial No. 60/218,418, filed Jul. 14, 2000, the contents of which are incorporated by reference herein.

BACKGROUND OF THE INVENTION

1. Field of the Invention

The present invention relates, generally, to content delivery networks and, in preferred embodiments, to systems and methods for intelligent caching and refreshing of dynamically generated and static Web content to improve content delivery services.

2. Description of the Related Art

Web performance is a key point of differentiation among content providers. Crashes and slowdowns within major Web sites demonstrate the difficulties companies face in trying to deal with high Web traffic. As Internet backbone technologies have developed, many innovations in the area of service management have improved bandwidth and Web content retrieval response time. These improvements to infrastructure, however, cannot solve traffic problems at all points within the Internet.

For example, assume in FIG. 1 that an end user 12 in a network 14 in Japan requests access to a page from a Web site 16 in a network 18 in the United States. The request must pass through several gateways 20, 22, and 24 before reaching Web site 16. Although Web site 16 may have large bandwidth (the ability to rapidly communicate large quantities of data), the gateways connecting the network 14 in Japan to the network 18 in the United States may be slow, and thus, when end user 12 attempts to access the page from Web site 16, the gateways may create a bottleneck. Such gateway bottlenecks may result in the access time for one page of data being on the order of 10 seconds or more. Because of the gateway bottlenecks, and because there are many uncertainties along the Internet paths from end user 12 to/from the Web site 16, content delivery networks or systems are now being developed.

Fundamentally, content delivery systems may be designed and deployed for at least two major purposes; one is to achieve load balancing, and the other is to reduce response time. A content delivery system may be implemented using a high speed dedicated line to deliver content while bypassing all gateways or reducing the number of Internet gateways in the transmission path. However, such a dedicated network is expensive and cannot be deployed for all networks. Another approach to implementing content delivery systems is through the use of intelligent caching, mirroring, proxy servers, or other techniques which redirect end users to available servers that contain the desired content and are close to or easily accessible by the end users to ensure fast response time. With some of the traffic redirected, traffic surges will decrease and end users benefit from faster response time. The term generally used for the architecture and functionality of such networks or systems is content delivery services (CDS).

Many approaches and architectures have been proposed for CDS and most of these services, systems, and architectures have focused on static content. For example, CachePortal™ is a system providing CDS, and is described in pending U.S. patent application Ser. No. 09/545,805, entitled "System and Method for Efficient Content Delivery," filed Apr. 7, 2000, the contents of which are incorporated herein by reference. CachePortal™ has access to mirror servers which are used as edge cache to provide content to end users with less network delay. CachePortal™ can distribute content among mirror servers as well as remove, refresh, or invalidate the content in the mirror servers. CachePortal™ can also modify the attributes of content in the mirror servers. For example, CachePortal™ may check whether an object has been updated. If CachePortal™ finds that it is not updated, then CachePortal™ may change the value of the refresh time stamp or last modified date time stamp.

However, for many e-business sites, Web pages are created dynamically based on the current state of business processes represented in application servers and databases. The techniques required are more complex than what are needed for static content delivery. Given the fact that based on current technology, the application servers, databases, and Web servers or cache which deliver Web pages are independent components, there has been no efficient mechanism to reflect database content changes in the cached Web pages. As a result, conventional application servers typically specify dynamically generated Web pages to be non-cacheable or expire immediately. By so doing, the processing time for such requests will be the time required for the network round trip—time to receive the current data from the Web servers, and time for the backend systems (i.e. application servers and databases) to perform the computations necessary to provide current data.

FIG. 2 shows an overview of a typical current Web page delivery mechanism 24 for Web sites with backend systems. For example, an e-business site may utilize a database management system (DBMS) 26 to maintain the price, item descriptions, and quantity of all products the e-business site sells through its Web site. It should be understood that a DBMS, as described herein, includes memory such as a database for storing content. As illustrated in FIG. 2, an end user 28 interacts with a Web browser 30 to access the Internet and requests information 32 on a product at the e-business site. Such a request may include parameters such as the product name and model number, and may include other items such as cookies 34.

Cookies are small files that were sent by a particular Web site, and now reside in the end user's computer. The cookie is used by the Web site to keep track of what the end user is doing, or to identify the user. For example, when an end user clicks on a button at a particular Web site, that Web site may send a cookie to the end user's computer. This cookie may monitor the activity of the end user as the Web site is navigated. The next time that the user logs onto that Web site, the Web site may search for a cookie in a particular location. If it finds the cookie, it will know that the end user is a repeat customer. The Web site may also use the navigational information from the cookie to customize the Web page for that end user.

Referring again to FIG. 2, the Web page request 32 may be sent from the client browser 30 to a cache 36. In FIG. 2, the cache block 36 is identified with dotted lines to indicate that it may be any one of a number of different types of cache. One type of cache is called edge cache. Edge cache is also called proxy cache and is typically managed and maintained by a third party content delivery service provider such as CachePortal™. Content providers can store content into this edge cache and make it available at locations that are close to the end user. Another type of cache is called reverse cache, which is cache that is owned by entities close to the end user and is typically located close to the end user. Another type of cache is called server side cache, which is cache that is owned by the content provider. Yet another type of cache is called Web server cache. Web server cache may be found in machines that typically would deliver Web server content from disk to the end user. However because disk access is slow, the content from the disk may be copied to another location within that Web server. This location would provide faster access to that content than the disk. These storage locations are known as Web server caches.

Referring again to FIG. 2, if the Web page request 32 is not serviced by the cache 36 because the page is not found in cache 36, or is expired or invalidated in cache 36, the request will be passed to the e-business Web server 38. In some e-business applications, some frequently accessed pages, such as catalog pages, are pre-generated in advance and are put on the Web server 38 in advance. For example, a Web server machine 38 may have a sub-directory called HTTPD. Web pages that are static (do not change frequently) may be stored within that sub-directory. If those pages are requested by the client browser 30 and the HTTPD subdirectory contains an up to date copy of the Web page, those pages will be delivered straight from the Web server 38 back to the client browser 30 without ever going to the application server 40.

However, pages such as product information and availability pages are dynamic in that they change frequently. Such pages are typically not stored in the Web server 38, but are dynamically created by backend systems when such a page is requested, which may include application servers 40, DBMS 26, and "filesystem+network" or external data sources 42. When a request 44 for a dynamically created Web page is received, the Web server 38 may utilize a sub-directory called CGI (common gateway interface) to convert the request into a new request 46 (which includes the URL and other parameters) that can be understood by the application server 40. The application server 40 receives the Web page request 46 and other parameters from the Web server 38, performs any necessary computations, and accesses the DBMS 26 by way of queries 240, if necessary. The DBMS 26 then returns the information 46 back to the application server 40, where the application server 40 uses this data to put together the dynamically created Web page 48 in HTML.

It should be understood that the application server 40 may be a different machine from the Web server 38, or it may actually be the same machine as the Web server 38, just performing a different function than the Web server 38. More generally, it should be understood that although the figures in this description indicate separate functional blocks for the Web servers 38, application servers 40, API handlers (see subsequent figures), DBMS 26, and content change monitoring components (see subsequent figures), all of these functional elements may be combined in one server or separated into multiple servers. Furthermore, illustrated in FIG. 2 and several other figures in this description is a functional block entitled Filesystem+Network 42. It should be understood that that this block 42 is a generalization of the DBMS block 26, which may include a DBMS and/or any external source of data.

When the program is executed on the application server 40, it may issue one query 240, get the result 46 back, run for an additional period of time, and then issue subsequent queries 240 to get additional information 46 needed to generate the requested Web page 48. For example, in the airline reservation system example, a first query 240 might be issued to determine the available flights on a particular day, and subsequent queries 240 may be issued to determine the prices for those flights. In so doing, different DBMSs 26 or 42 may need to be accessed. Once the application server 40 has put together the dynamically created Web page 48, it sends the Web page indicated at 48 back to the Web server 38. The Web server 38 then sends a forwarded Web page indicated at 50 back to the Web browser 30.

Additionally, when the Web server 38 sends this dynamically generated page 50 to the Web browser 30, it may also store this page 50 to cache 36. With the dynamically generated page 50 in the cache 36, when another user requests the same information, the Web page 50 can be delivered straight from the cache 36 to the end user, without the additional processing time that would be required if the Web page was to be dynamically created by backend systems.

However, dynamically created Web pages may change often, and thus their storage in cache 36 or in the Web server 38 can be problematic for certain e-business Web sites whose businesses rely on presenting the end user with up-to-date information. However, getting the very latest Web page information may be difficult because the cache 36, Web server 38, application server 40 and the DBMS 26 or 42 may all be located in different machines, and they may be independent entities. Furthermore, there may be little or no coordination between these independently operating machines to ensure that the Web pages stored in cache 36 or in a Web server 38 are up-to-date.

One way to increase the probability that the Web pages in the cache 36 are fresh is to periodically refresh the pages through the Web server 38. However, this may result in many unnecessary requests to the Web server 38, the application server 40, and the DBMSs 26, and even with periodic refreshing, the Web pages in cache 36 cannot be guaranteed to be fresh. Because of the difficulty in ensuring that the data stored in cache 36 is fresh, important dynamic Web pages that are stored in cache 36 are typically set to expire immediately. Alternatively, such Web pages may be designated as non-cacheable.

Thus, a typical request for a dynamic Web page will pass through the Web server 38, application server 40, and DBMS 26 or external data source 42, and then eventually the created Web page will be transmitted back to the end user 28. This network round-trip time includes the time for the backend systems (i.e. application servers 40, DBMSs 26, and external data sources 42) to perform the computations necessary to provide the current data. This time can be in the range of 10–20 seconds, which is very slow. Even though some dynamic Web pages may change only once every hour, the fact that it can change may be enough for businesses to make the content non-cacheable or set for expiration immediately. Thus, even if there are numerous requests prior to any data being changed, conventional systems will force those requests to complete the network round trip, including the execution of processes on backend systems.

SUMMARY OF THE DISCLOSURE

Therefore, it is an advantage of embodiments of the present invention to provide a system and method for intelligent caching and refreshing of Web content to synchronize the data stored in cache or Web servers with the data stored in DBMSs or external data sources.

It is a further advantage of embodiments of the present invention to provide a system and method for intelligent caching and refreshing of Web content where, when data in a DBMS or external data source changes, the Web pages stored in cache or Web servers that utilize that data will be invalidated.

It is a further advantage of embodiments of the present invention to provide a system and method for intelligent caching and refreshing of Web content where, when data in a DBMS or external data source changes, the Web pages stored in Cache or Web servers that utilize that data will be refreshed. As a result, even the dynamically generated pages can be delivered from front end caches or edge caches.

It is a further advantage of embodiments of the present invention to provide a system and method for intelligent caching and refreshing of Web content where, because many content requests can be served from cache, the load to backend systems can be eased.

These and other advantages are accomplished according to a system for updating Web pages stored in cache or Web servers based on modifications to data stored in a DBMS or external data source. Updating may include invalidating or refreshing the Web pages. The system for updating stored Web pages may be part of a larger system having a DBMS for storing data used to generate Web pages. The DBMS is capable of identifying modified data stored in its database.

The system for updating stored Web pages is comprised of one or more servers programmed for maintaining associations between the stored Web pages and the stored data, and receiving the identity of modified data from the database management system. In addition, the servers are capable of determining, from the identified modified data and the maintained associations, which stored Web pages are associated with the identified modified data. Furthermore, the servers are capable of communicating an update command to the cache that contains the stored Web pages associated with the identified modified data, for the purpose of updating the stored Web pages.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 3 is a block diagram showing the connection of FIGS. 3A and 3B.

FIGS. 3A and 3B illustrate an intelligent Web page caching and refreshing mechanism according to an embodiment of the present invention.

FIGS. 4A-1 and 4A-2 show a flowchart containing source code for the creation of a URL/relevant operation mapping table by the application server in the embodiment of FIG. 4 according to an alternative embodiment of the present invention.

FIG. 6 is a block diagram showing the arrangement of FIGS. 6-1 and 6-2.

FIGS. 6-1 and 6-2 are a block diagram illustrating an intelligent Web page caching and refreshing mechanism wherein an application server converts a user request into stored procedures according to an alternative embodiment of the present invention.

FIG. 7 is a block diagram illustrating an intelligent Web page caching and refreshing mechanism wherein an application server proxy maintains the associations between URLs and related queries or operations according to an alternative embodiment of the present invention.

FIG. 8 is a block diagram illustrating a content change monitoring mechanism utilizing view definitions according to an embodiment of the present invention.

FIG. 12 is a block diagram illustrating the architecture of an intelligent invalidator/refresher according to a preferred embodiment of the present invention.

FIG. 13 illustrates a timeline and an example sequence of database update events, update log retrievals, and query instances recorded by a sniffer in a dynamic content caching, invalidation, and refreshing system according to an embodiment of the present invention.

FIG. 14 is a flowchart illustrating a positive query lattice according to an embodiment of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Web performance is a key point of differentiation among content providers. Crashes and slowdowns within major Web sites demonstrate the difficulties companies face in trying to deal with high Web traffic. As Internet backbone technologies have developed, many innovations in the area of service management have improved bandwidth and Web content retrieval response time. These improvements to infrastructure, however, cannot solve traffic problems at all points within the Internet. Gateway bottlenecks may result in the access time for one page of data being on the order of 10 seconds or more. Because of the gateway bottlenecks, and because there are many uncertainties along the Internet paths from end user to Web sites, content delivery networks or systems are now being developed.

Fundamentally, content delivery systems are designed for two major purposes; one is to achieve load balancing, and the other is to reduce response and access time. Embodiments of the present invention described herein reduce response and access time through content delivery systems that use intelligent caching and proxy servers to redirect users to available servers that contain the desired content and are close to or easily accessible by the users. With some of the traffic redirected, traffic surges will decrease and end users benefit from faster response time.

Embodiments of the present invention include methods and systems for intelligently refreshing dynamically generated Web content in the cache as well as in the Web server. These methods and system architectures can also be applied to static content refresh to ensure all contents in the cache are consistent with the contents in the applications and the DBMSs.

Intelligent Caching and Refreshing of Web Content

Intelligent Caching and Refreshing Mechanism 1

Figure 3B:
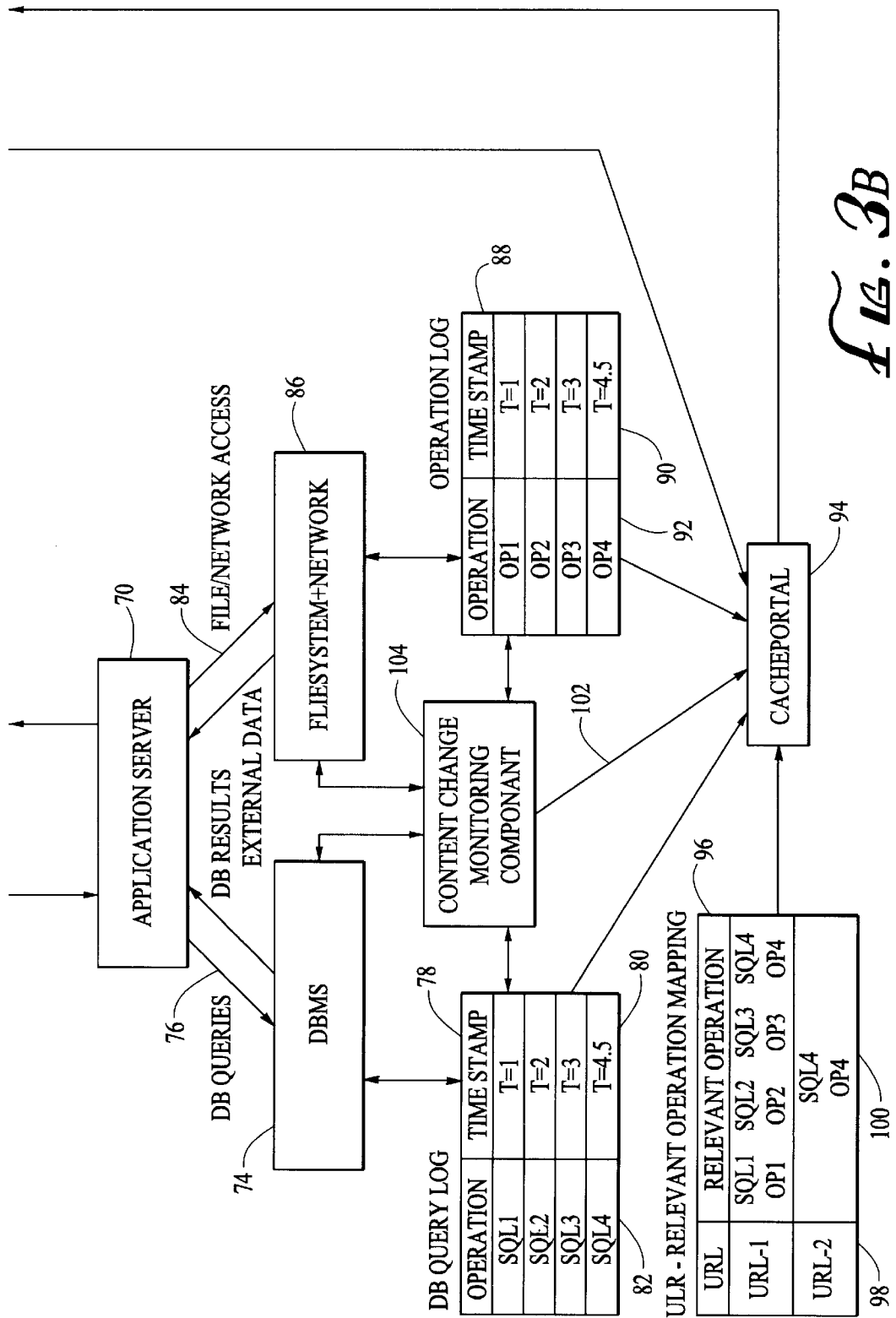

FIG. 3 and FIGS. 3A and 3B illustrate an intelligent Web page caching and refreshing mechanism 10 according to an embodiment of the present invention. As indicated in FIGS. 3A and 3B, if an end user 52 requests a Web page that is not stored in cache 54, or is invalid in cache 54, the request 56 will be passed on to the Web server 58. When an end user Web page request 60 is received by the Web server 58, the Web server 58 keeps a log 68 that stores the request time 62 and the delivery time 64 for each requested Web page 66. For example, the log 68 may have the URL of the request, the time stamp for the arrival of such a request, and the time stamp of the delivery of the Web page back to the Web server 58. Thus, in the example of FIGS. 3A and 3B, the Web server log 68 indicates that between time zero and time five, a request for URL1 was processed. And between time four and time six, a request for URL2 was processed. After the Web server 58 receives the request 60, it will send the request 60 to the application server 70 along with some optional parameters.

After the application server 70 receives the request 72 from the Web server 58, it will process the request 72 and access the underlying DBMS 74 as needed, through queries 76 to the DBMS 74. When the DBMS 74 receives the query or queries 76 from the application server 70, it may keep a database query log 78 for storing the time stamp 80 of when a query 82 is executed on the DBMS 74. For example, in FIGS. 3A and 3B, a structured query language (SQL) query, identified as SQL1, was executed at t=1, SQL2 was executed at t=2, SQL3 was executed at time t=3, and SQL4 was executed at time T=4.5.

It should be understood that the application server 70 is not limited to queries 76 to a single or multiple DBMSs 74. The application server 70 may also issue some necessary external calls, API calls, or http requests 84 to other file systems, DBMSs, or servers 86. Generally, it should be understood that although most of the description herein is given with reference to a DBMS 74, in embodiments of the present invention accesses 84 may be made to external data sources represented by blocks labeled "File system+ network" in all the figures in this description. Thus, an operation log 88 may also be maintained similar to the database query log 78, which can store the time stamp 90 of when an operation 92 is executed on the external data source 86.

In preferred embodiments of the present invention, a content delivery services provider (illustrated herein as CachePortal™ server for exemplary purposes only) receives the Web server log 68, database query log 78, and optionally the operation log information 88. With this information, CachePortal™ 94 can generate and maintain a URL/relevant operation mapping table 96, which stores the associations between URLs 98 and operations or queries 100. For example, because the Web server log 68 indicates that the request for URL1 occurred between time T=0 and t=5, SQL1, 2 and 3 must have been made in connection with the request for URL1. However, because URL1 and URL2 were both being processed between the time T=4 and T=5, it is unclear which request is associated with query SQL 4, which occurred at time T=4.5. (It should be understood that Web servers may be multi-processed or multiple-threaded, which enables simultaneous processing of multiple requests for Web pages.) Thus, in the URL/relevant operation mapping table 96, an association will be created between URL1 and SQL1–4, and an association will be created between URL2 and SQL4. In a similar manner, other associations will be created and stored in the URL/relevant operation mapping table 96.

The content change monitoring component 104 (described hereinafter) maintains, or has access to, the associations between the DBMS records and the queries. In addition, the content change monitoring component 104 monitors and detects changes to the data in the DBMSs or external data sources. When a data change is detected, the content change monitoring component 104 can determine, from its known associations, which queries or operations may be affected by the changed data. For example, suppose that queries SQL1 and SQL2, result in the access of tuples one and two in the DBMS 74. If any data in one of these tuples changes, the change will be detected by the content change monitoring component 104, and it will also determine that queries SQL1 and SQL2 may be affected by the changed data. Consequently, the Web pages generated using these queries may be out of date. In preferred embodiments, the potentially affected queries 102 will be presented to CachePortal™ 94.

CachePortal™ 94 will then use the URL/relevant operation mapping table 96 to determine which URLs are associated with the potentially affected queries 102. The Web pages associated with these URLs will then be have to be invalidated or refreshed. As a provider of content delivery services, CachePortal™ 94 keeps track of where Web pages have been stored. Thus, when it becomes necessary to refresh or invalidate a Web page, CachePortal™ 94 will send an invalidate or refresh request or message 242 to the appropriate location.

The difference between a refresh and invalidate request is that the refresh request will cause the cache 54 to request a new page from the Web server 58. The Web server 58 will then uses its backend systems to retrieve the requested Web page and store it back into the cache 54. Alternatively, the new page can be prepared by the application server 70, the DBMS 74, or CachePortal™ 94. In contrast, by invalidating the Web page in cache 54, the Web page is simply tagged as invalid, expired, or to be deleted; no request is made for a new Web page. Instead, a new Web page will not be created until the next end user request for that invalid Web page. When the end user 52 requests the invalid Web page, the end user's request will generate a redirected Web page request to the Web server 58, which may take a long time to process. However, this long access time may not be a problem overall, if there are many subsequent users who request that same Web page. While the first requesting end user will endure a lengthy access time, the subsequent requests will get the benefit of the first end user's request because they can access the fresh content directly from cache 54. Therefore, overall, the invalidation method may be preferable for large numbers of end users 52.

The decision on whether to invalidate or refresh a Web page is a function of how often the Web page is accessed and the system resources, among other things. For example, if a Web page is accessed infrequently it may not make sense to refresh the Web page. Multiple refreshes of a Web page over a period of time are unnecessary, and a waste of resources, if no requests for that Web page occur during that period of time. In such a case, it may be beneficial to wait until a new request before refreshing the Web page. On the other hand, if frequent accesses to the Web page are expected, it may be beneficial to refresh the content immediately, because such a refresh will likely be needed in the near future.

Another reason why refreshing may not be the best alternative is that cache often uses a replacement strategy. That is, the cache can only store a limited amount of content, and if large amount of content is to be stored in cache, the cache will have to decide which stored object can be thrown out and replaced with new content. It may decide to throw out of cache the least frequently used content, or the content used least recently. However, by automatically refreshing a Web page in cache every time the data associated with that Web page changes, that Web page refreshed in cache will always look like it had been recently used. Thus, it may never get thrown out of cache even though it is infrequently accessed by end users.

As an alternative to a refresh message, a command can be sent from CachePortal™ 94 directly to the Web server 58, which will appear to the Web server 58 to be a request for the targeted Web page from an end user. This command will cause the Web server 58 to fetch a newly created dynamic Web page using its backend systems. This alternative may be more efficient because, if the cache 54 is remotely located, instructing the cache 54 to refresh the Web page may be undesirably slow. In addition, the cache 54 may be owned by a different entity, or it may be cache which has little processing capability other than storing content.

It should be understood that although a cache block 54 is illustrated and described in many of the figures of this description, the static and dynamically created Web pages may not necessarily be stored in cache 54, but may additionally or alternatively be stored in the Web server 58. If the Web pages to be invalidated or refreshed are stored in the Web server 58, CachePortal™ 94 may direct a request to the Web server 58 mark the Web page as invalid, or fetch a new Web page. Alternatively, CachePortal™ 94 may send a request directly to the application server 70 to generate a new Web page.

It should be understood that although the description herein makes reference to CachePortal™ 94, any content delivery system may also be employed.

In alternative embodiments of the present invention, the content change monitoring component 104 may have access to the Web server log 68, and thus will be able to create the URL/Relevant operation mapping table 96 and determine which Web page to invalidate or maintain. If the content change monitoring component 104 additionally knows the location of the content stored in cache 54 or other Web server 58, the content change monitoring component 104 can even send the invalidate or refresh message to that location. Thus, it may be possible for either the content change monitoring component 104 or CachePortal™ 94 to send the invalidate or refresh messages. Furthermore, it should also be understood that content delivery service provider functionality and content change monitoring component 104 functionality (described in greater detail hereinafter) may be merged into the same server.

As described above, the application server 70, DBMS 74, external data source 86, Web server 58, and cache 54 may be independent components, and therefore the clocks on all these systems may not be synchronized. To synchronize these systems, a specific URL request with known queries or operations can be issued to the Web server 58. The time stamps of the log files in Web server 58, application server 70, DBMS 74, or external data source 86 can be examined. Based on this information, the time difference among all systems can be computed, and proper adjustments can be made.

Intelligent Caching and Refreshing Mechanism 2

The key to ensuring that an end user will be able to access the most up-to-date Web page is understanding the association between particular data and the URL of the requested Web page. From the Web server's perspective, it receives a request from the end user which has the URL of the Web page in it. Thus the Web server knows the requested Web page. However, the Web server does not know which data base queries are associated with that particular requested Web page. On the other hand, the DBMS receives queries from the application server, but these queries do not have the URL information embedded in it. From a purely functional point of view, this makes sense because the data base management system does not need to know which Web page needs a particular piece of data. It just receives a request for data in the form of a query and sends a result back to the application server. This presents somewhat of a problem, however, because while the Web server knows the URL and the data base management system knows the query, there is nothing that explicitly links the URL to the query.

The key to making this association is in the application server. If the Web server should send a request to the application server, the application server will know from the request from the Web server the URL of the requested page. The application server may perform some computations, then determine which queries to make to the DBMS. Thus, implicit in the performance of the application server is the association between the URL and the DBMS queries.

Figure 1:
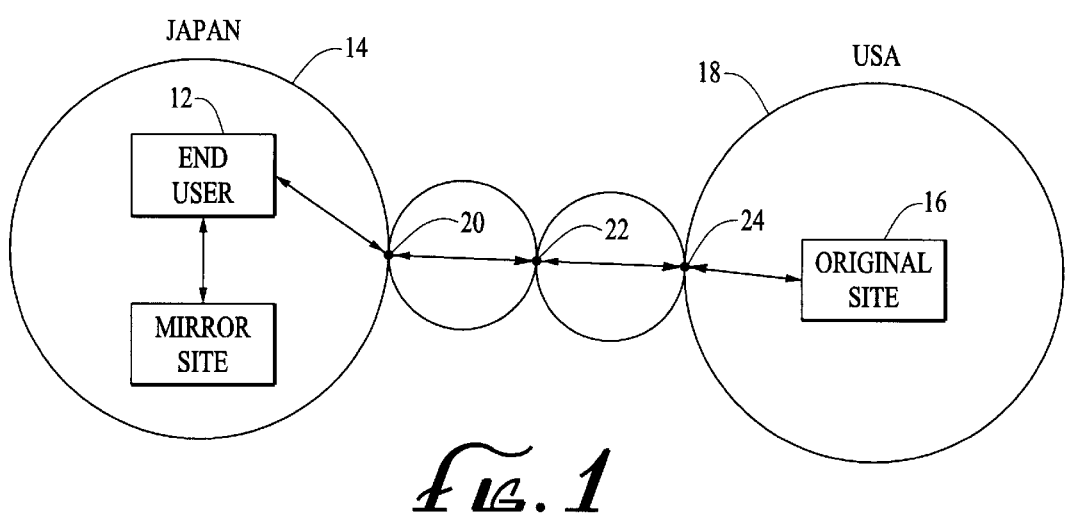
FIG. 1 is a block diagram illustrating an example of a conventional content delivery path between an end user and a Web site.
Figure 2:
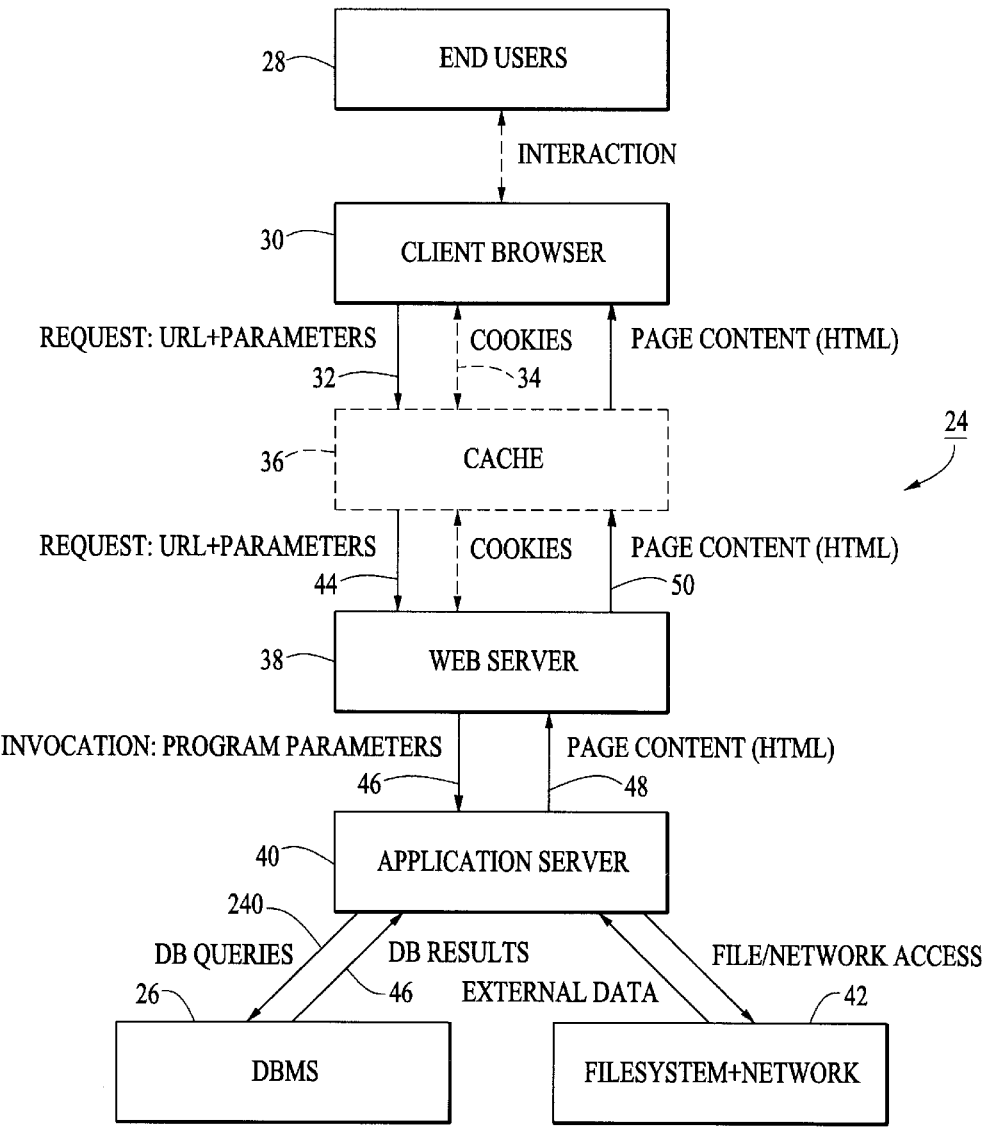
FIG. 2 is a block diagram illustrating an overview of a typical Web page delivery mechanism for Web sites with backend systems.
Figure 4:
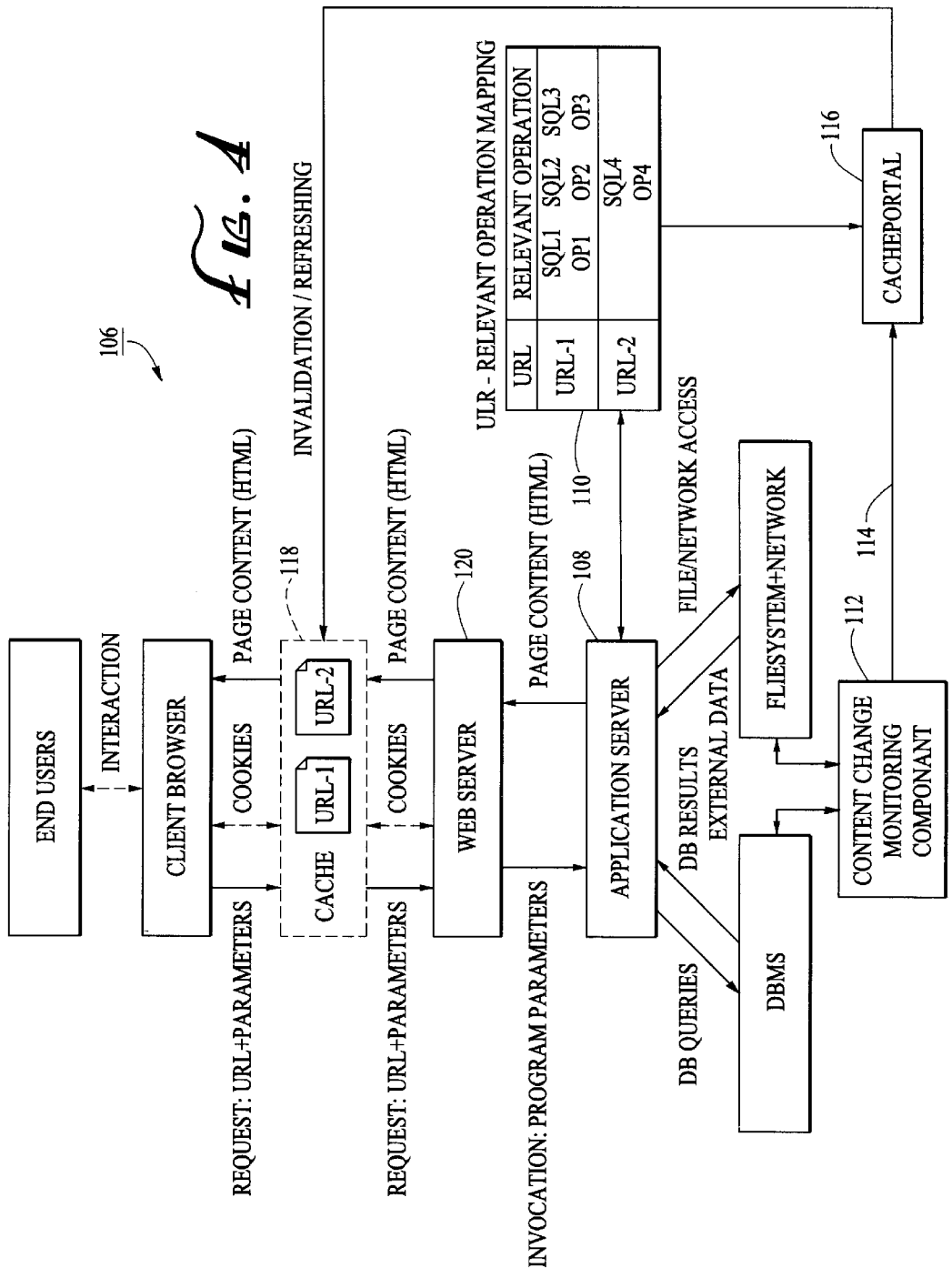
FIG. 4 is a block diagram illustrating an intelligent Web page caching and refreshing mechanism wherein an application server maintains the associations between URLs and related queries or operations according to an alternative embodiment of the present invention.
Figures 2, 4A:
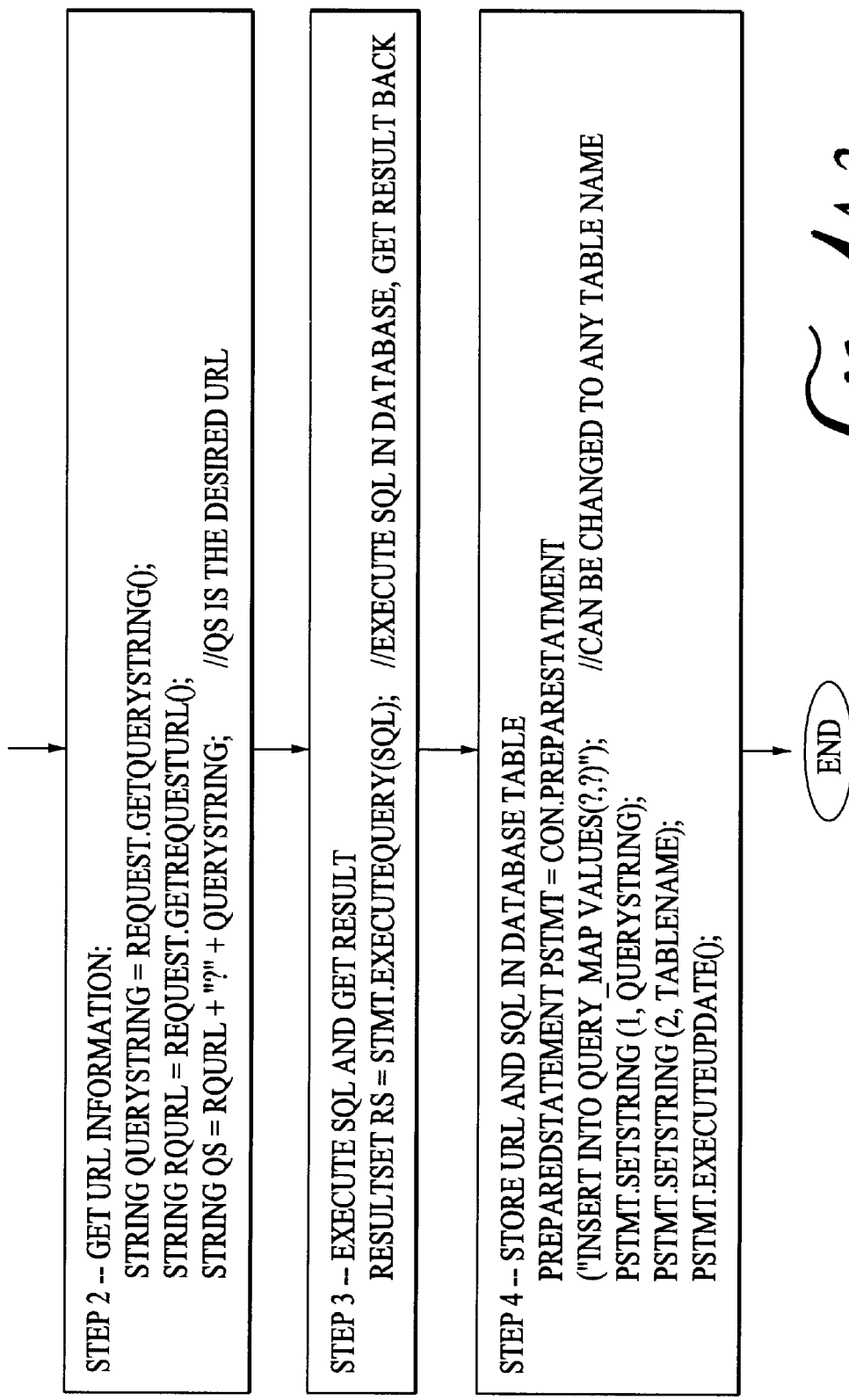
FIG. 4A shows the relationship between FIGS. 4A-1 and 4A-2.

Nevertheless, because the relationship between the URL and the data base query can implicitly be derived from the performance of the application server, it is possible for the application server to create and maintain the URL/relevant operation mapping table. Thus, in FIG. 4, an alternative embodiment of the present invention 106 is illustrated where the application server 108 keeps a URL/relevant operation mapping table 110 that stores the mapping between the requested URL and the DBMS SQL calls and external calls. The creation of the URL/relevant operation mapping table by the application server is illustrated in FIGS. 4A-1 and 4A-2.

Once the content change monitoring component 112 detects a DBMS change, determines the associated queries, and notifies 114 CachePortal™ 116, CachePortal™ 116 will access the URL/relevant operation mapping table 110 to identify those URLs associated with those queries, and invalidate or refresh the pages in the cache 118. Similarly, if the pages are in the Web server 120, CachePortal™ 116 may request the application server 108 to generate a new page or issue a query or a request to the Web server 120 to fetch or request a new page which has the most up-to-date data.

Intelligent Caching and Refreshing Mechanism 3

When the application server issues a query, it may be a "direct call" SQL exec string in the form of an API. This string or query may be issued while the program in the application server is running. Ultimately, during the course of running this program in the application server, several queries may be issued in the form of this string. This SQL exec query has two parameters, query string and handler cursor. The query string identifies the query itself, while the handler cursor is a pointer that points to the result located in a DBMS or an external source. It should be understood that the URL is not necessarily one of the parameters passed to the DBMS within a query.

Figure 5:
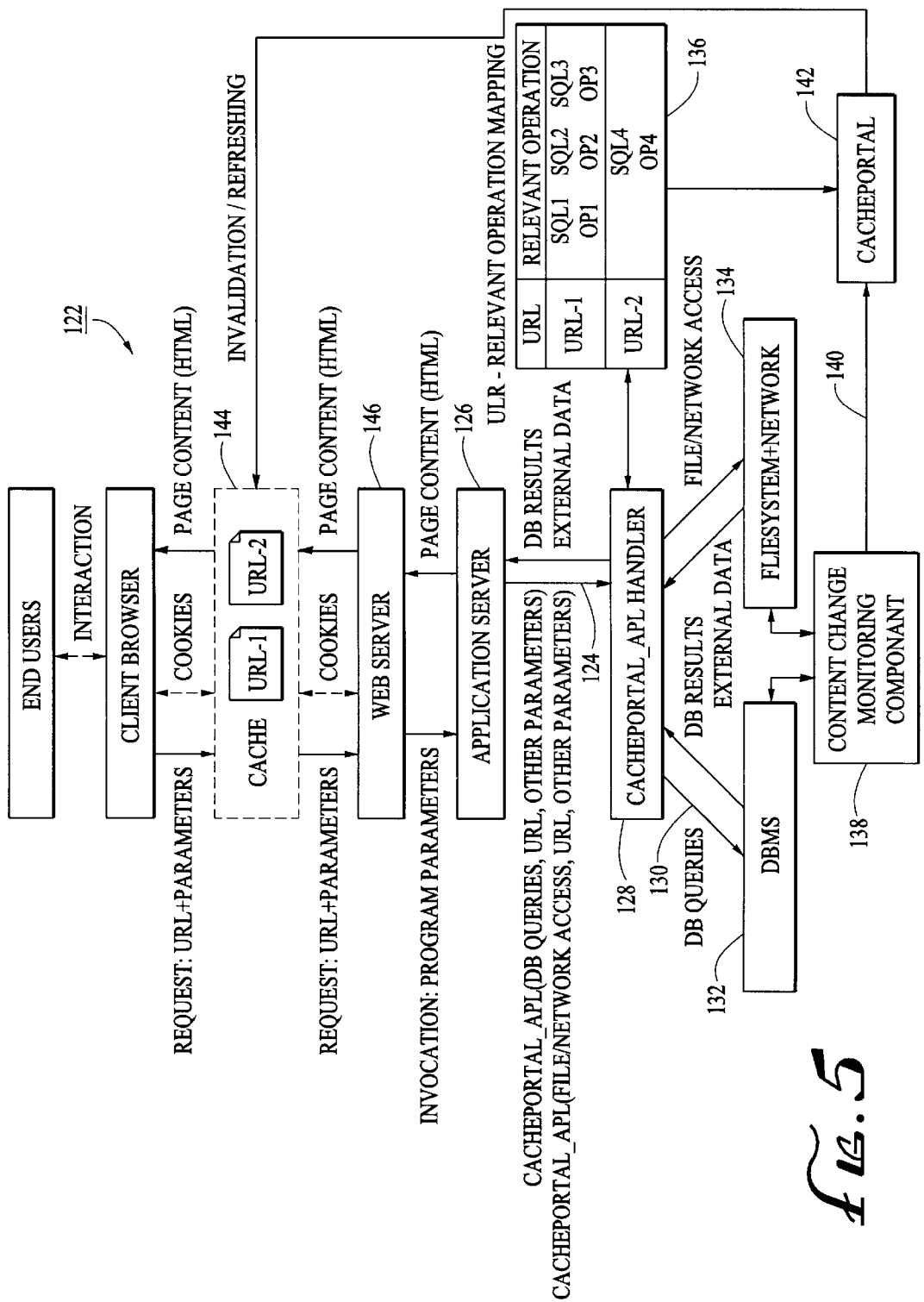
FIG. 5 is a block diagram illustrating an intelligent Web page caching and refreshing mechanism wherein a CachePortal™ API handler maintains the associations between URLs and related queries or operations according to an alternative embodiment of the present invention.
Figure 5A:
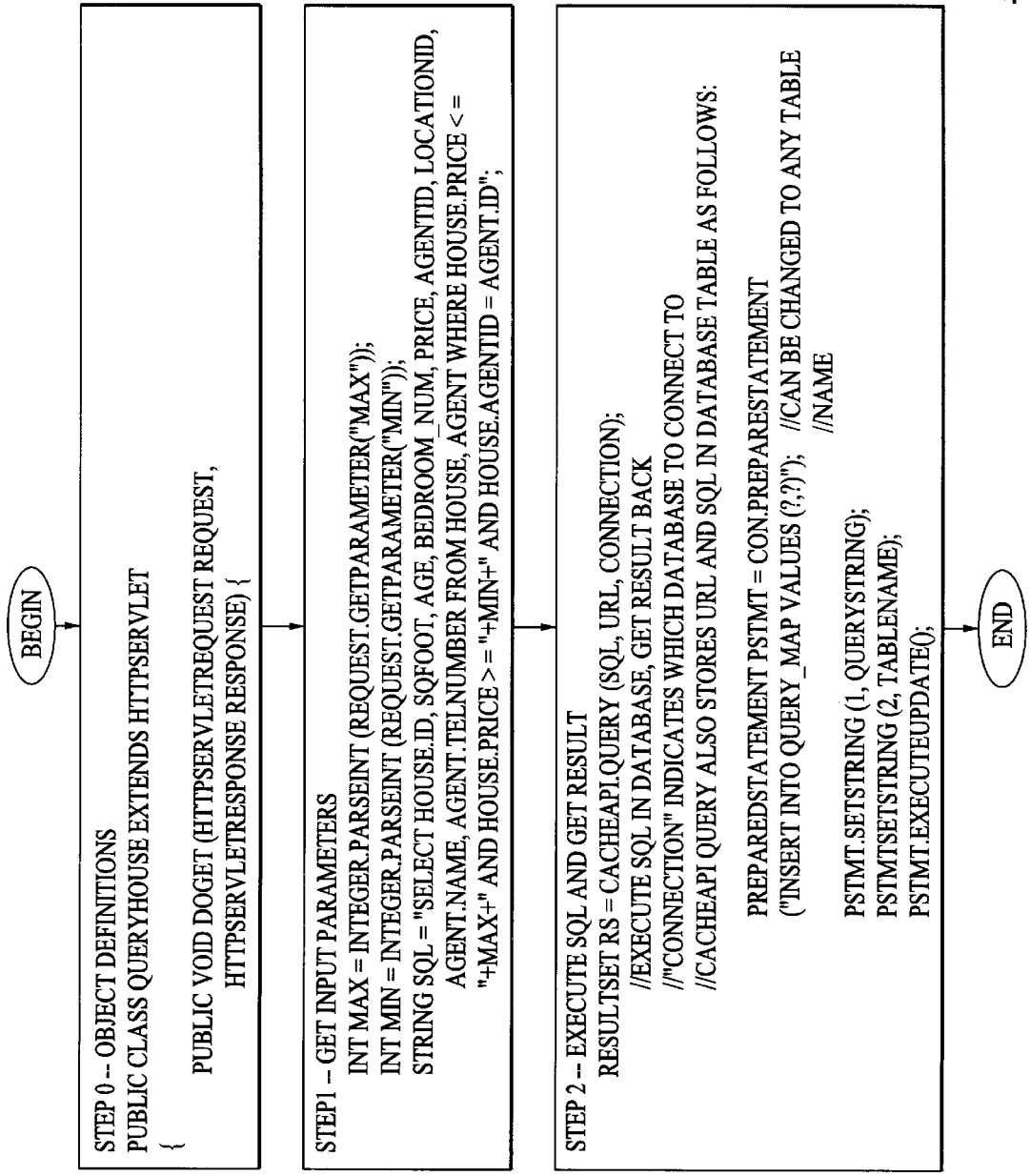
FIG. 5a is a flowchart containing source code for the creation of a URL/relevant operation mapping table by the by the CachePortal™ API handler in the embodiment of FIG. 5 according to an alternative embodiment of the present invention.

However, in an alternative embodiment of the present invention 122 illustrated in FIG. 5, such "direct calls" are replaced by calls to CachePortal™ APIs 124. In the embodiment of FIG. 5, the application server 126 executes a CachePortal™ API call 124, which includes URL information as a part of the parameters as shown in FIG. 5. The CachePortal™ API call 124 is executed by a CachePortal™ API handler 128, which strips off the URL information, and then sends the equivalent of the SQL exec string 130 to the DBMS 132 or external sources 134. The CachePortal™ API handler 128 also maintains the URL/relevant operation mapping table 136. The creation of the URL/relevant operation mapping table by the CachePortal™ API handler 128 is illustrated in FIG. 5a.

Once the content change monitoring component 138 detects a DBMS change, determines the associated queries, and notifies 140 the CachePortal™ system 142, the CachePortal™ system 142 will access the URL/relevant operation mapping table 136 to identify those URLs associated with those queries, and invalidate or refresh the pages in the cache 144. Similarly, if the pages are in the Web server 146, CachePortal™ 142 may request the application server 126 to generate a new page or it may issue a query or a request to the Web server 146 to fetch a new page which has the most up-to-date data.

Intelligent Caching and Refreshing Mechanism 4

In another alternative embodiment of the present invention 148 illustrated in FIG. 6 and FIGS. 6-1 and 6-2, application server "direct calls" are replaced by the execution of CachePortal™ stored procedures 150, or other stored procedures supported by CachePortal™, which include functions that can executed by application servers, DBMSs, or external sources. A stored procedure is a common function that is compiled along with certain objects, and becomes part of the source code in the DBMS 154. The CachePortal™ stored procedures will be written for, and executed by, the application server 152, DBMS 154, or external sources 156. In the embodiment of FIGS. 6-1 and 6-2, the application server 152 executes a CachePortal™ stored procedure 150, which includes URL information as one of the parameters. The stored procedures will issue queries 158 or operations 160 to the relevant DBMSs 154 or external sources 156. Data from the DBMS 154 or external sources 156 is returned to the application server 152 through the stored procedure 150.

Figure 6A:
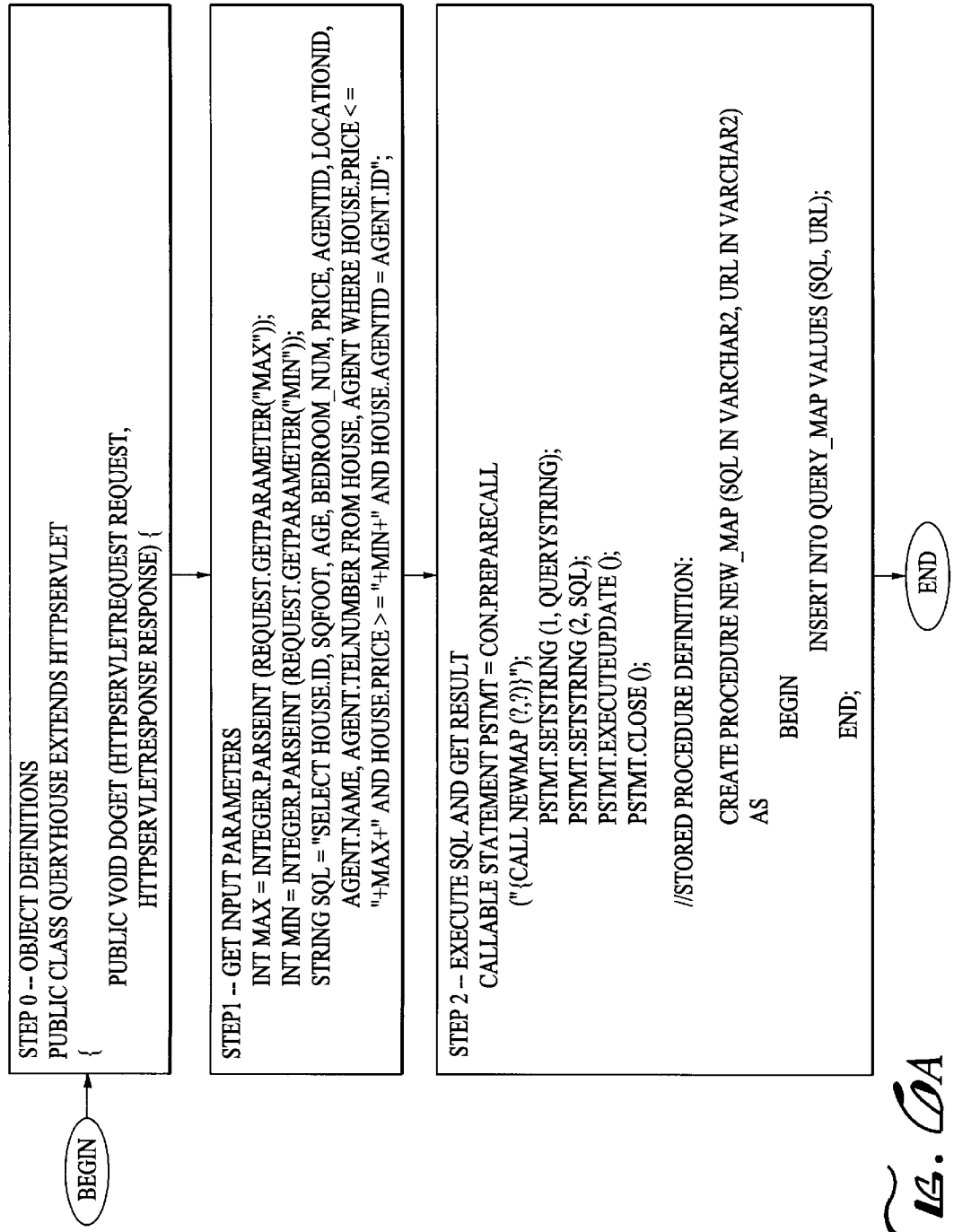
FIG. 6a is a flowchart containing source code for the creation of a URL/relevant operation mapping table by the by CachePortal™ in the embodiment of FIG. 6 according to an alternative embodiment of the present invention.

Because the CachePortal™ stored procedure 150 has both the query and URL information, the stored procedures maintain a database query log 162 and/or an operation log 164, which are accessed by CachePortal™ 166 to create a URL/relevant operation mapping table 168. The creation of the URL/relevant operation mapping table by CachePortal™ is illustrated in FIG. 6a. Note that in FIG. 5, the CachePortal™ API handler intercepted the queries before they were split into either the DBMS or the external source. However, in FIGS. 6-1 and 6-2, the request is split into either the DBMS 154 and the external source 156 and is not intercepted. Therefore, separate logs 162 and 164 must be written and then consolidated by CachePortal™ 166.

Once the content change monitoring component 168 detects a database change, determines the associated queries, and notifies 170 the CachePortal™ system 166, the CachePortal™ system 166 will access the URL/relevant operation mapping table 168 to identify those URLs associated with those queries, and invalidate or refresh the pages in the cache 172. Similarly, if the pages are in the Web server 174, CachePortal™ 166 may request the application server 152 to generate a new page or it may issue a query or a request to the Web server 174 to fetch a new page which has the most up-to-date data.

Intelligent Caching and Refreshing Mechanism 5

In another alternative embodiment of the present invention illustrated in FIG. 7, the application server 176 is "surrounded" by an application server proxy 200. The application server proxy 200, which in preferred embodiments is part of the CachePortal™ server 178, receives the requests 180 from the Web server 182 and forwards the requests 184 to the application server 176. In addition, the application server proxy 200 will act as a proxy for the application server 176 to issue queries 186 or external requests 188 as well as receive results 190 and 192 from DBMSs 194 or externals sources 196. The application server proxy 200 will also forward the results from DBMSs or external sources 198 to the application server 176.

Thus, in a sense, the application server proxy 200 listens to the input to the application server 176, and watches the output of the application server 176. By so doing, the application server proxy 200 determines the URL of the requested page as it comes into the application server 176, and determines the particular queries 186 which may be associated with that URL when the application server calls a DBMS 194 or external source 196. Thus, the application server proxy 200 will know that relationship between the URL and the queries at that time. As the application server proxy 200 intercepts the requests to the application server 176 as well as the queries and external calls by the application server, it can create the mapping 202 between the requested URL and the DBMS SQL calls and external calls.

An advantage of the embodiment of FIG. 7 is that the application server proxy 200 may be able to produce the URL/relevant operation mapping table 202 without having to modify the application server 176 to make it generate CachePortal™ API calls. Thus, an advantage to this alternative embodiment is that less collaboration is required between the owner of the application server 176 and CachePortal™ 178. Note that this mechanism can also be implemented using hardware devices such as a "sniffer,"

which can listen to the messages and strings passing through the network. It should also be noted that this mechanism can also be used together with Mechanism 1 described hereinabove.

Content Change Monitoring

Content Change Monitoring Mechanism 1

FIG. 8 illustrates a content change monitoring component 204 according to an embodiment of the present invention. In the embodiment of FIG. 8, queries 206 issued to the DBMS 208, or operations 210 issued to an external source 212 are also communicated to the content change monitoring component. The content change monitoring component 204 then creates a view definition 214 for each query or operation 206 or 210, which establishes the criteria for identifying data associated with that particular query or operation. The view definition 214 is then used to generate a view table 216 associated with that query or operation, which is a list of pointers to all data associated with the query or operation.

For example, assume that a DBMS for a housing management application includes Tables 1 and 2 below, which is a list of attributes of a house and agent:

TABLE 1

House Table Schema:

| Name | Type | Constraints |
| --- | --- | --- |
| ID | NUMBER(38) | -- primary key |
| SQFOOT | NUMBER(38) | |
| AGE | NUMBER(38) | |
| BEDROOM NUM | NUMBER(38) | |
| PRICE | NUMBER(38) | |
| AGENTID | NUMBER(38) | -- foreign key |
| LOCATIONID | NUMBER(38) | |

TABLE 2

Agent Schema:

| Name | Type | Constraints |
| --- | --- | --- |
| ID | NUMBER(38) | -- primary key |
| NAME | VARCHAR2(10) | |
| TELNUMBER | CHAR(10) | |
| BROKERID | NUMBER(38) | |

Referring to FIG. 8, also assume that a query SQL1 (see below), frequently issued to this housing application, is received by the content change monitoring component 204. Generally, queries are in the form: "select [data or attributes] from [data sources] where [list of query conditions is satisfied]." In the present example, SQL1 is defined as:

Query SQL1 select house.id,sqfoot,age,bedroom_num,price,agentid,locationid,agent.name,agent.telNumber
from house, agent
where house.agentid = agent.id and house.price < 50 and house.price > 20;

After SQL1 is received by the content change monitoring component 204, a statement to create a view table, which includes a view definition 214, is executed. In the present example, the statement is as follows:

create materialized view pricemv
build immediate refresh fast on commit
as
select house.rowid "houserowid", agent.rowid "agentrowid", house.id, sqfoot,age,bedroom_num,price,agentid,locationid,agent.name, agent.telNumber
from house, agent
where house.agentid = agent.id;

This statement will create a view table 216 containing a list of pointers to entries in Table 1 that satisfy the criteria (view definition) of the query SQL1. In this example, the view definition of SQL1 is a particular agent and a specified price range, as follows: house.agentid=agent.id, house.price<50, and house.price>20. In this example, a view table 216 identified as VIEW1 will be created. In addition, a view log 218 is maintained for each view table 216, which keeps a record of all operations to the view table 216.

Each view table entry (pointer) establishes an association between the view table 216 and its associated data. Thus, if the DBMS 208 receives a command to update particular data, then either before, after, or after committing to updating the data, the DBMS 208 will also identify any view tables 216 potentially affected by the data update. The DBMS 208 will then either invalidate or maintain the appropriate view table 216.

For invalidation, the DBMS 208 will mark a particular view table 216 as invalid. This may be accomplished by setting an attribute of the view table 216, recording an "invalid" operation in the view log 218, or the like. The system may also update a "last modified date" attribute of the view table 216. However, the view table 216 itself is not updated. Alternatively, all entries in the view table 216 may be deleted.

The Content Change Monitoring Component 204 can therefore determine that a particular view table 216 has been invalidated from the indicators described above. If an invalidation is detected, the Content Change Monitoring Component 204 can communicate the query or operation associated with the particular view table 216 to CachePortal™. The system can then identify one or more URLs associated with that query or operation, and if the Web pages associated with those URLs are stored in cache, may then mark the Web pages as invalid. It should be understood that invalidation is simply concerned with identifying which Web page to invalidate. Thus, it detects that an action needs to take place to maintain a particular view table 216, but does not initiate the action. This saves on the cost of updating the view table 216.

Maintenance of the view table 216 will now be explained. As mentioned above, a view log 218 is maintained for each view table 216, which keeps a record of all operations to the view table 216. View log entries include "query," which provides no definitive indication that the view table 216 has changed, and "update," "insert," or "delete," which do provide an indication that the view table 216, and thus the DBMS 208, has changed. For maintenance, the system will update the view table 216 in accordance with an "update," "insert," or "delete" operation, which will be recorded in the view log 218, and will also update the "last modified date" attribute.

By detecting an "update," "insert," or "delete" entry in the view log 218, the content change monitoring component 204 can determine that maintenance of the view table A 216 has occurred. If maintenance of the view table 216 is detected, the Content Change Monitoring Component 204 can communicate the query or operation associated with the particular view table 216 to CachePortal™. The system can then identify one or more URLs associated with that query or operation, and if the Web pages associated with those URLs are stored in cache, may then mark the Web pages as invalid. However, when a particular view table 216 is maintained (updated), much of the cost of updating the DBMS 208 or external source 212 will have been incurred, so in alternative embodiments it may become cost-efficient to pass the new data to the application server to refresh the Web page, even though there may not have been a user request for that page.

Although a view table was described above as containing pointers, in alternative embodiments of the present invention the view table may additionally or alternatively contain a copy the actual data associated with the particular query represented by the view table. Because the pointers are used to access data from the DBMS when a query is issued, having a copy of the data in the view table improves the query response time. However, a disadvantage is that whenever the database is changed, the copy of that data in the view table must also be changed.

Referring again to FIG. 8, if an external source 212 rather than a DBMS is accessed, a daemon 220 may be initialized to monitor changes to the external sources 212. For example, the daemon 220 may be a program that knows the association between an operation and its associated data, and checks, at periodic intervals, whether this associated data has changed. If the daemon 220 detects that the data in the external source 212 has changed, it will notify the Content Change Monitoring Component 204, and invalidation or maintenance can proceed as defined above.

In further alternative embodiments, not all queries and operations will have view or daemon definitions 220. View or daemon definitions 214 and 220 can be selectively defined for only the most frequently issued queries or operations, and/or those queries or operations whose results are updated more frequently.

Content Change Monitoring Mechanism 2

Figure 9:
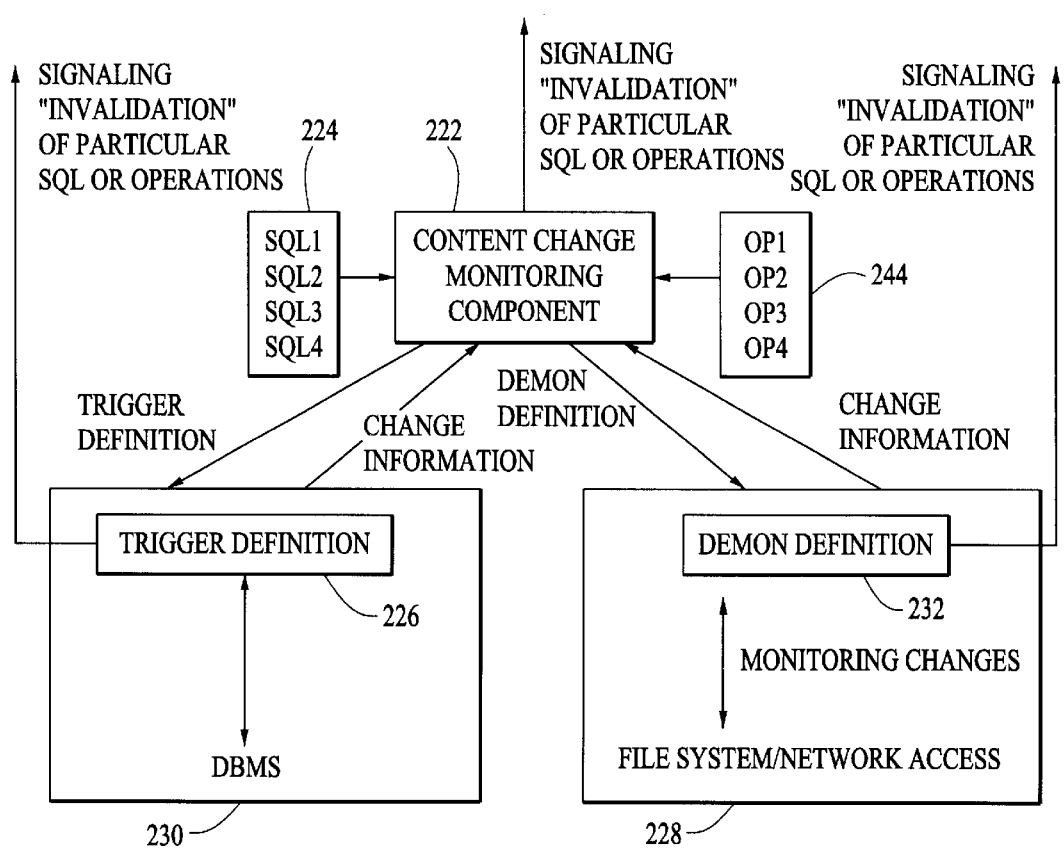
FIG. 9 is a block diagram illustrating a content change monitoring mechanism utilizing trigger definitions according to an alternative embodiment of the present invention.

FIG. 9 illustrates a content change monitoring component 222 according to an alternative embodiment of the present invention. In the embodiment of FIG. 9, queries 224 or operations 244 issued to DBMSs or external data sources are also communicated to the content change monitoring component 222. The content change monitoring component 222 then creates a trigger definition, which includes trigger statements defined to be active when certain query conditions are satisfied.

For example, assume that a DBMS for a housing management application includes Tables 1 and 2, as previously defined. Referring to FIG. 9, also assume that a query SQL1, as previously defined, is received by the content change monitoring component 222. After SQL1 is received, a trigger definition 226, which includes one or more trigger statements, is created. Generally, a trigger definition is of the form: "[on/before/after] [update/insert/delete] [list of data sources], [execute list of trigger statements.]" In the present example, the trigger definition 226 is created as follows:

```
CREATE OR REPLACE TRIGGER trigger-20-50
BEFORE INSERT OR DELETE OR UPDATE on pricemv
FOR EACH ROW
```

```
DECLARE
    msg varchar2(100);
BEGIN
    IF (inserting and :new.price < 50 and :new.price > 20) THEN
        msg : = 'insert trigger 2050';
        trysend(msg);
    ELSIF (deleting and :old.price < 50 and :old.price > 20) THEN
        msg : = 'delete trigger 2050';
        trysend(msg);
    ENDIF;
END;
```

In the example trigger definition 226 given above, the trigger statement is contained in the IF-THEN-ELSEIF clause. As described above, trigger statements are defined to be active when certain query conditions are satisfied. The trigger statements determine whether modifications to specific data will have an impact on certain queries, and thus establish an association between those queries and the specific data. In embodiments of the present invention, trigger statements may include, but are not limited to, the form: "IF [query condition is satisfied], THEN [do action]." If the trigger statement is active, then either before, after, or after committing to updating the specific data, the specified action is performed. For example, an action could include the issuance of a command to invalidate a particular Web page in cache, application servers, Web servers, CachePortal™, or the Content Change Monitoring Component. In the present example, the trigger statement within trigger definition 226 will detect insertions, deletions, or updates to the DBMS with a price between 20 and 50, and if such a DBMS change is detected, will attempt to send a message indicating that the trigger definition has been satisfied.

In alternative embodiments of the present invention, multiple trigger statements representing multiple queries can be combined into one trigger definition. For example, a trigger definition can be created having trigger statements of the form: "IF [query condition 1 is satisfied], THEN [invalidate Web pages associated with query 1], ELSEIF [query condition 2 is satisfied], THEN [invalidate Web pages associated with query 2], ELSEIF. . . ." Continuing the present example for purposes of illustration only, assume that a query SQL2 (see below) is received by the content change monitoring component 222. SQL2 is defined as:

Query SQL2:

```
select house.id,sqfoot,age,bedroom_num,price,agentid,locationid,agent.
name,agent.telNumber
from house, agent
where house.agentid = agent.id and house.price < 40 and house.
price > 20;
```

One way to implement a trigger definition for this second query is to create a separate trigger definition. In the present example, a separate trigger definition can be created as follows:

```
CREATE OR REPLACE TRIGGER trigger-20-40
BEFORE INSERT OR DELETE OR UPDATE on pricemv
FOR EACH ROW
```

-continued

```
DECLARE
    msg varchar2(100);
BEGIN
    IF (inserting and :new.price < 40 and :new.price > 20) THEN
        msg : = 'insert trigger 2040';
        trysend(msg);
    ELSIF (deleting and :old.price < 40 and :old.price > 20) THEN
        msg : = 'delete trigger 2040';
        trysend(msg);
    END IF;
END;
```

Alternatively, however, the two trigger definitions can be consolidated into one, which may be more efficient and less costly for the DBMS to handle and monitor. In the present example, when the pricemv table is updated, fewer trigger definitions need to be activated to perform condition checking. In the present example, the consolidated trigger can be defined as follows:

```
CREATE OR REPLACE TRIGGER trigger-20-40-50
BEFORE INSERT OR DELETE OR UPDATE on pricemv
FOR EACH ROW
DECLARE
    msg varchar2(100);
BEGIN
    IF (inserting and :new.price < 40 and :new.price > 20) THEN
        msg := 'insert trigger 2040 2050';
        trysend(msg);
    ELSIF (deleting and :old.price < 40 and :old.price > 20) THEN
        msg := 'delete trigger 2040 2050';
        trysend(msg);
    ELSIF inserting and :new.price < 50 and :new.price > 40) THEN
        msg := 'insert trigger 2050';
        trysend(msg);
    ELSIF (deleting and :old.price < 50 and :old.price > 40) THEN
        msg := 'delete trigger 2050';
        trysend(msg);
    END IF;
END;
```

Note that in trigger-20-40-50, the trigger statement for SQL2 is executed first, followed by the trigger statement for SQL1. Because a price that satisfies the query condition of SQL2 (price between 20 and 40) also satisfies the query condition of SQL1 (price between 20 and 50), checking will stop immediately if the trigger statement for SQL2 is satisfied. Thus, additional efficiencies may be realized by sequencing trigger statements so that not all of the trigger statements need be performed.

Consolidated trigger definitions can also be applied to situations where there are multiple queries with overlapping conditions, and the desired action is to invalidate Web pages associated with modified data. For example, assume that the following three generalized queries are received by the content change monitoring component:

```
SQL4: Select [attributes] from [data source]
    where [query condition 1 and query condition 2 exist]
SQL5: Select [attributes] from [data source]
    where [query condition 2 and query condition 3 and query
    condition 4 exist]
SQL6: Select [attributes] from [data source]
    where [query condition 2 and query condition 3 exist]
```

A generalized consolidated trigger definition can be created as follows:

```
[on/before/after] [update/insert/delete] [list of data sources],
    IF [query condition 2 is satisfied] THEN
        [invalidate Web pages associated with SQL4, SQL5, and
        SQL6, and exit],
    ELSIF [query condition 3 is satisfied] THEN
        [invalidate Web pages associated with SQL5 and SQL6],
    ELSIF [query condition 1 is satisfied] THEN
        [invalidate Web pages associated with SQL4],
    ELSIF [query condition 4 is satisfied] THEN
        [invalidate Web pages associated with SQL5]
    END IF
```

Because a change to query condition 2 may affect Web pages associated with SQL4, SQL5, and SQL6, checking will stop immediately if query condition 2 is satisfied. Thus, as before, additional efficiencies may be realized by sequencing trigger statements so that not all of the trigger statements need be performed. Although simple AND statements were used in the queries of the present example, it should be understood that complex boolean or relational algebra in the queries will have a corresponding effect on the complexity of the trigger statements in the trigger definitions.

As described with respect to FIGS. 3–7 above, in embodiments of the present invention the URL/relevant operation mapping table is not maintained by the content change monitoring component. Rather, as described with respect to FIGS. 8 and 9 above, the content change monitoring component only maintains the relationship between queries/operations and their associated data. In a preferred embodiment, when the content change monitoring component detects a modification to the data, it will communicate a message indicating that the queries/operations associated with the modified data are invalid to another component, which may be a Web server, CachePortal™ or other content delivery systems/services provider, and the like. These components can then access the URL/relevant operation mapping table, determine the URLs of the Web pages associated with the invalid queries/operations, and communicate an invalidate or refresh message to the cache or Web server that is storing those Web pages.

However, it should be understood that in alternative embodiments of the present invention, the information contained in the URL/relevant operation mapping table may be maintained in a variety of differing implementations. For example, the content change monitoring component may maintain the URL/relevant operation mapping table. When the content change monitoring component detects a modification to the data, it will identify the queries/operations associated with the modified data, access the URL/relevant operation mapping table, determine the URLs of the Web pages associated with the invalid queries/operations, and communicate a message indicating that the associated queries/operations are invalid to another component, which may be the Web server, CachePortal™ or other content delivery systems/services provider, and the like. These components can then communicate an invalidate or refresh message to the cache or Web server that is storing those Web pages. In an alternative embodiment, the content change monitoring component may directly communicate an invalidate or refresh message to the cache or Web server that is storing those Web pages.

Referring again to FIG. 9, if an external source 228 rather than a DBMS 230 is accessed, a daemon 232 may be initialized to monitor changes to the external sources 228. For example, the daemon 232 may be a program that knows the association between an operation and its associated data, and checks, at periodic intervals, whether this has changed. Similar to the trigger, the daemon 232 is defined to be active when certain data or tables are changed, or are to be changed, and establishes an association between a query and its associated data. If the daemon 232 is active, then either before, after, or after committing to updating the data, a daemon definition is executed. The daemon definition may generally be described as "if [condition], do [action]." The conditions check whether or not the updating of specific data will have an impact on their associated queries. If the conditions are met, some action is taken. For example, the actions defined in the daemon definition can signal the invalidation of a particular Web page to CachePortal™, cache, application servers, Web servers, or the Content Change Monitoring Component 222, as well as passing the new data to the application server to generate a new page.

In further alternative embodiments, not all queries and operations will have trigger or daemon definitions. Triggers or daemons can be selectively defined for only the most frequently issued queries or operations, and/or those queries or operations whose results are updated more frequently.

Content Change Monitoring Mechanism 3

Figure 10:
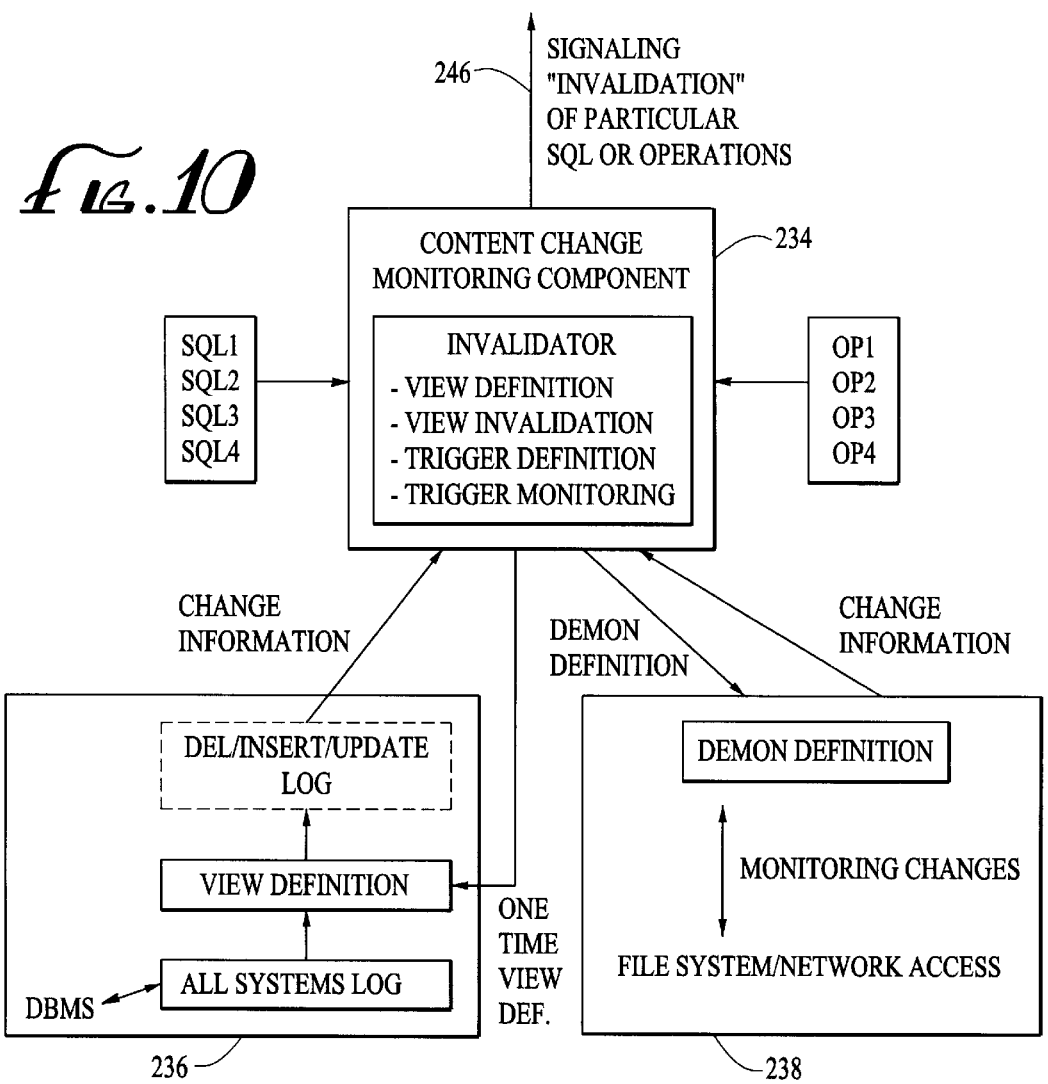
FIG. 10 is a block diagram illustrating a content change monitoring mechanism within an external system according to an alternative embodiment of the present invention.

FIG. 10 illustrates a content change monitoring component according to an alternative embodiment of the present invention. The embodiment of FIG. 10 combines the view definitions and/or trigger definitions of FIGS. 8 and 9 in a server 234 separate from the DBMS 236 or external data source 238, which may include, but is not limited to, a CachePortal™ server or the server for another content delivery services provider.

In an alternative embodiment of the present invention, the entire DBMS 236 and external data source 238 data, as well as relevant schema and constraints from the DBMS 236 or external data source 238, can be replicated onto the separate server 234 using a replication specification. Note that the separate server 234 may not necessarily have the same type of data management system that is used in the DBMS 236 or external data source 238. In the replication specification, automated data synchronization can also be specified so that when data modifications occur in the DBMS 236 or external data source 238, such changes will be automatically propagated to the separate server 234. In further alternative embodiments, rather than using a replication specification, the view log can be monitored to detect insert, update, and delete operations to the DBMS 236 and external data source 238. These operations can be performed on the copied data in the separate server 234 to harmonize the copied data.

With the copied data harmonized, content change monitoring mechanisms 1 or 2, as described above, can then be applied. In preferred embodiments of the present invention, view statements, view definitions, view tables and view logs may also be maintained within the separate server 234 to determine whether or not update, insertion, and deletion actions have an impact on the queries or operations associated with particular URL requests. In alternative embodiments, these data structures may be maintained by the DBMS 236 or external data source 238, and this information can be sent to the Content Change Monitoring Component 234. When modifications to DBMSs 236 or external data sources 238 are detected, the associated Web pages stored in cache or a Web server can be invalidated or refreshed by messages 246 sent by the separate server.

The embodiment of FIG. 10 allows the costs of maintaining the view tables and view logs to be borne by the separate server, and requires minimal modifications to customer Web servers, DBMSs, and external data sources. This loose coupling of systems may be preferable for companies that are uncomfortable with modifications to their machines.

Intelligent Invalidator/Refresher

In another alternative embodiment of the present invention, rather than maintaining a harmonized copy of the data in the separate server, only necessary data is copied onto the separate server. This embodiment of a content change monitoring component may include what shall be referred to herein as an intelligent invalidator/refresher. However, it should be understood that the intelligent invalidator/refresher functionality may be incorporated into the separate server, a content change monitoring component, CachePortal™ or other content deliver services provider, a Web server, an application server, or the like. Note also that although the following discussion may focus on invalidation, in alternative embodiments refreshing may also be performed.

Functional Overview of the Intelligent Invalidator/ Refresher

An explanation of the intelligent invalidator/refresher may be best presented through an example. Assume that a DBMS has the following two tables:

car(make, model, price)

mileage(model, mpg)

Further assume that in order to generate a Web page URL1, the following query QUERY1 has been issued to the DBMS:

| QUERY1 |
| --- |
| select make, model, price from car where make = "Toyota"; |

Because the invalidator/refresher also receives this query, it can maintain the association between URL1 and QUERY1. Now assume that a new tuple (Toyota, Avalon, 25000) has been inserted into the table "car," as evidenced by a series of corresponding view log entries. Since QUERY1 only needs to access a single table (car), it can be determined whether the new tuple value satisfies the query condition (make="Toyota") stated in QUERY1. In the present example, because the new tuple value satisfies the query condition, the result for QUERY1 may be impacted, and consequently URL1 needs to be invalidated or refreshed. Similarly, if a tuple (Toyota, Avalon, 25000) is deleted from the table "car," because this tuple satisfies the query condition stated in QUERY1, the result for QUERY1 may be impacted, and consequently URL1 needs to be invalidated or refreshed. In addition, because an update operation can be viewed as a delete operation followed by an insert operation, the procedures just described can be implemented to handle an update operation.

Generally, although the description herein may refer, for purposes of discussion, to one type of database update such as "insert," it should be understood that the description is conceptually applicable to delete and update operations as well.

In another example involving the same tables, assume that in order to generate a Web page URL2, the following query QUERY2 has been issued:

---
QUERY2:
---
select car.make, car.model, car.price, mileage.mpg
from car, mileage
where car.make = "Toyota" and car.model = mileage.model;
---

Note that this query involves more than one table, and a join query condition (a query condition requiring access to multiple data tables) exists. Specifically, in the query condition defined after the word "where," the table "car" needs to be accessed to determine the value for car.make and car.model, and the table "mileage" needs to be accessed to determine the value for mileage.model. Now assume that a new tuple (Toyota, Avalon, 25000) has been inserted into the table "car," as evidenced by a series of corresponding view log entries. Because QUERY2 needs to access two tables, it is first determined whether the new tuple value can satisfy only that portion of the query condition stated in QUERY2 associated with the table "car." If that portion of the query condition is not satisfied, the other portions of the query condition need not be tested, and it is known that the new insert operation does not have impact on the result of QUERY2, and that URL2 does not need to be invalidated or refreshed.

However, if the newly inserted tuple satisfies that part of the query condition associated with the table "car," it still cannot be determined whether the result of QUERY2 has been impacted until the remainder of the query condition associated with the table "mileage" has been checked. To check whether the partial query condition car.model= mileage.model is satisfied, the table "mileage" must be accessed. To check the partial query condition, the following subquery QUERY3 can be generated by the content change monitoring component and issued to the DBMS:

---
QUERY3:
---
select mileage.model, mileage.mpg
from mileage
where "Avalon" = mileage.model;
---

This subquery can be prepared by removing all conditions which are not relevant to the table "mileage," and replacing all attributes in the table "car" involved in the join operation with their corresponding values in the newly inserted tuple. In the present example, car.model is replaced with the string "Avalon" because that is the only value that will be used to join with the values of attribute mileage.model. If there is a result for QUERY3, the new insert operation has an impact on the result of QUERY2, and consequently URL2 needs to be invalidated or refreshed.

Note that because the attribute mileage.model must be retrieved from the table "mileage," the values of attribute mileage.model can be saved in the intelligent invalidator/refresher as an index structure or join index. Thereafter, if a subsequent query is issued that requires the values of attribute mileage.model, the join index can be accessed, and QUERY3 need not be issued again, because all information needed to process QUERY2 is already available. Join indexes can be maintained by performing operations listed in a database update log.

In a more complex example, assume that a DBMS has the following two tables:
   car(make, model, price)
   mileage(make, model, mpg)
Further assume that in order to generate a Web page URL4, the following query QUERY4 has been issued:

---
QUERY4:
---
select car.make, car.model, car.price, mileage.mpg
from car, mileage
where car.make = "Toyota" and car.model = mileage.model and
   car.make = mileage.make;
---

Note that this query involves more than one table, and a join query condition exists. Now assume that a new tuple (Toyota, Avalon, 25000) has been inserted into the table "car." Because QUERY4 needs to access two tables, it is first determined whether the new tuple value can satisfy only that portion of the query condition associated with the table "car." If that portion of the query condition is not satisfied, the other portions of the query condition need not be tested, and it is known that the new insert operation does not have impact on the result of QUERY4, and that URL4 does not need to be invalidated or refreshed.

However, even if the newly inserted tuple satisfies that part of the query condition associated with the table "car," it still cannot be determined whether the result of QUERY4 has been impacted until the remainder of the query condition associated with the table "mileage" has been checked. To check whether the partial query condition car.model= mileage.model is satisfied, the table "mileage" must be accessed. To check the partial query condition, the following subquery QUERY5 can be issued to the DBMS:

---
QUERY5:
---
select mileage.model, mileage.make
from mileage
where "Avalon" = mileage.model and "Toyota" = mileage.make;
---

This subquery can be prepared by removing all conditions which are not relevant to the table "mileage" and replacing all attributes in the table "car" involved in the join operation with values corresponding to the newly inserted tuple. In the present example, car.model is replaced with the string "Avalon" and car.make is replaced with the string "Toyota" because these are the only two values that will be used to join with the values of attribute mileage.model and mileage.make. If there is a result for QUERY5, the new insert operation has an impact on the result of QUERY4, and consequently URL4 needs to be invalidated or refreshed.

Note that the values of attribute mileage.model and mileage.make can be saved in the intelligent invalidator/refresher as a join index. Thereafter, if a subsequent query is issued that requires the values of attribute mileage.model, or mileage.make, the join index can be accessed, and QUERY5 need not be issued again, because all information needed to process QUERY5 is already available.

In yet another example, assume that QUERY2 and QUERY4, as defined above, are issued to the DBMS, and a new tuple (Toyota, Avalon, 25000) has been inserted into the table "car." The content change monitoring component can achieve a degree of efficiency by creating and issuing subqueries in a particular order. In the present example, if QUERY3 is issued to the DBMS first, and there is no result for the subquery, it can be determined that both URL2 and URL4 do not need to be invalidated. However, if there are results for QUERY3, the content change monitoring component can first invalidate URL2, and then issue QUERY5 to the DBMS. Note that the query result for QUERY5 can be saved as a join index for both QUERY2 and QUERY4.

It should be noted that in embodiments of the present invention, the techniques explained hereinabove by way of an "insert" example can be expanded to handle delete and update operations to the DBMS, and can additionally extend to queries which employ "or" or "not" or other Boolean operators, as well as relational operators.

A strategy can be defined for building join indexes rather than issuing subqueries to the DBMS. For example, if the join index is reasonably small, or if the query frequency of a DBMS is high, it may be preferable to save and maintain a join index. However, if many attributes of a DBMS must be saved in the join index, if the join index must be updated frequently, or if the query frequency of a DBMS is low, it may be more efficient to issue subqueries.

Architecture of Intelligent Invalidator/Refresher

Figure 11:
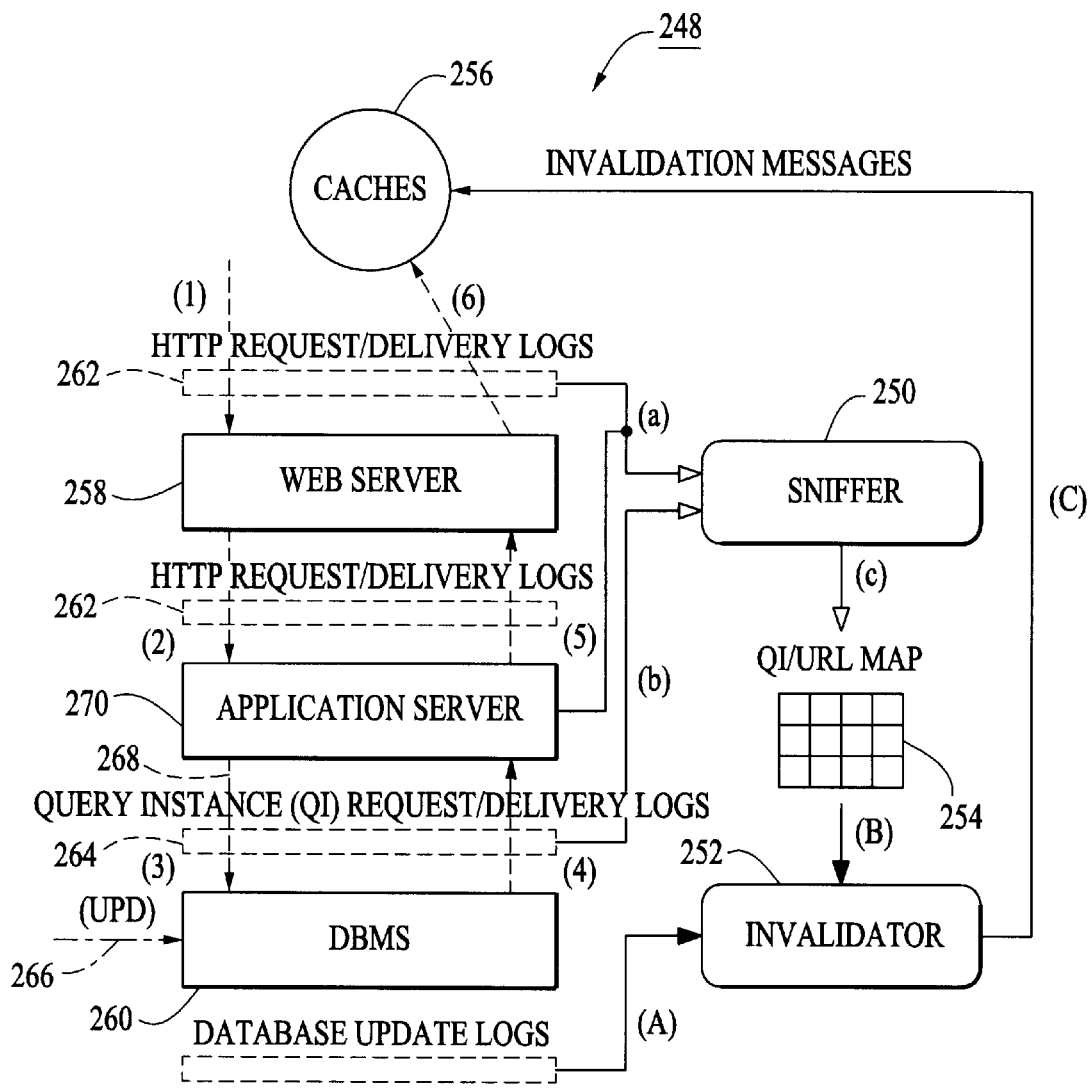
FIG. 11 is a block diagram illustrating the overall architecture of a dynamic content caching, invalidation, and refreshing system according to a preferred embodiment of the present invention.

FIG. 11 shows the overall architecture of a dynamic content caching, invalidation, and refreshing system 248 according to a preferred embodiment of the present invention. As shown in FIG. 11, there are four independent processes (indicated by arrows) in the system; a dynamic content request process, a DBMS update process, a URL/relevant operation determination process ("sniffing"), and a DBMS change detection and invalidation process ("invalidation").

The main components of the architecture include a sniffer 250 and an invalidator/refresher 252. The sniffer 250 detects user Web page requests and creates the URL+cookie+post data to query instance (QI) mapping (referred to herein as the URL/relevant operation mapping or QI/URL map) 254. It should be understood that URL information, as defined herein, includes the URL of the requested Web page, cookies that may accompany a Web page request, and post data information sent from the Web server to the application server. The sniffer 250 collects the QIs, but does not interpret them. The invalidator/refresher 252 will "listen" to updates to the DBMS and, using the QI/URL map 254, will notify the relevant cache 256 or Web server about the invalidity of a particular stored page. To do so, the invalidator/refresher 252 may need to interpret the QIs and access a QI/QT table to determine their query types (QTs) during compilation/registration for more efficient invalidation.

It should be understood that neither the sniffer 250 nor the invalidator/refresher 252 should become a bottleneck. Although the sniffer 250 must operate at speeds comparable to the web server 258, this is typically not a problem because the web server 258 must perform more processing to serve a request for dynamic content than the sniffer 250. The invalidator/refresher 252 should also not be a bottleneck, because it operates outside of the DBMS 260 and has control over how much time to spend for invalidation. Note, however, that if the invalidator/refresher 252 needs to send extra queries to the DBMS to gather relevant data for invalidation, then it may increase the load on the DBMS 260.

It should also be understood that although the architectures described hereinabove with respect to any of the intelligent caching and refreshing mechanisms 1 through may be employed to listen to network traffic and generate a URL/relevant operation mapping table, for purposes of explanation only, the architecture shown in FIG. 11 will be used as an example to describe the intelligent invalidator/refresher 248.

Referring now to FIG. 11, arrows (1)–(6) describe the steps that a typical dynamic content request may take. The sniffer 250 and invalidator/refresher 252 do not interrupt or alter the dynamic content request. Instead, they rely on three logs (the HTTP request/delivery logs 262 and the Query instance/delivery log 264) to gather all relevant information. The arrow (Upd) 266 indicates updates to the DBMS 260. These updates 266 are independent from the queries 268. The sniffer 250 and invalidator/refresher 252 do not alter the DBMS update process either; instead, they rely on the DBMS update logs to gather all relevant information.

Arrows (a)–(c) indicate the sniffer query instance/URL map generation process, while arrows (A)–(C) show the cache content invalidation process. These two processes are asynchronous yet complementary.

Properties of this architecture. The architecture of the intelligent invalidator/refresher is designed such that little or no change to the Web Server 258, Application Server 270, or the DBMS 260 is required. However, in preferred embodiments, cooperation from these entities can improve the performance of the architecture.

The architecture is capable of being deployed in several modes, which includes, but is not limited to, cold start, warm start, and hot start. In the cold start mode, a customer can obtain the system, install the software, and immediately start operating. The system will begin to generate relevant logs and perform self-tuning to obtain performance improvements. Although the cold start mode provides for quick deployment, because the system is not initially tuned up, it may take some time for the system to achieve high-performance.

In the warm start mode, a customer can obtain the system, install the software, and provide the system with existing logs. The system uses these logs to create initial performance policies. The warm start mode therefore provides relatively quick deployment and some degree of initial performance.

In the hot start mode, a customer and the owner of the intelligent invalidator/refresher, such as CachePortal™ or another content delivery services provider, may exchange relevant domain expertise prior to deployment, and the initial policy can then be tuned for high performance by the content delivery services provider's technical representatives. The system can also use existing logs to validate/improve initial performance policies. This option can provides a high degree of initial performance, but will require interaction with the customer.

Terminology. Before the main components are described in further detail, some relevant terminology should be understood. A query type (QT) is the definition of a query. It is a valid SQL statement which may or may not contain variables. A query type can be denoted as $Q(V_1, \ldots, V_n)$, where each $V_i$ is a variable that has to be instantiated by the application server before the query is passed to the DBMS.

A bound query type is a valid SQL statement which does not contain variables. A bound query type can be denoted as $Q(a_1, \ldots, a_n)$, where each $a_i$ is a value instantiated for variable $V_i$. Queries that are passed by the application server to the DBMS are bound queries.

A query instance (QI) is a bound query type with an associated request timestamp. A bound query type can be denoted as $Q^t(a_1, \ldots, a_n)$, where t is the time at which application server passed the request to the DBMS.

Therefore, multiple query instances can have the same bound query type, and, multiple bound query types may have the same query type.

Sniffer. A "sniffer" is a hardware or software device that can be placed on the network to "listen" to network traffic. A sniffer can be placed on an Ethernet through which Web servers, application servers, and DBMSs communicate. The sniffer creates the URL+cookie+post data to query instance (QI) mapping (URL/relevant operation mapping table). The sniffer collects query occurrences, but does not interpret them. The URL+cookie+post data information can be collected at the input to the Web server using a module which listens to the incoming HTTP requests. In addition, the URL+cookie+post data information can be collected at the input to the Application Server using a module which uses the environment variables set by the application server. For example, URL information can be collected using the HTTP_HOST environment variable followed by the QUERY_STRING, cookie information can be collected using the HTTP_COOKIE environment variable, and post data information can be collected using the HTTP message body.

Invalidator/refresher. As illustrated in FIG. 12, the invalidator/refresher 272 consists of three tightly coupled modules: a registration module 274, an information management module 276, and an invalidation module 278.

Registration module. The registration module 274 is responsible for the creation of invalidation policies, collection of relevant query statistics, and passing of these policies and statistics to the information management module 276 for the creation of auxiliary index and data structures 280. In other words, it answers the question about "what to invalidate."

When operating in an off-line mode, a system administrator can register the query types (QTs) that the invalidator/refresher 272 must detect. These QTs can be identified because there are only a limited number of QTs that can be generated by an application server 282. During a hot start, domain experts may declare which (bound or non-bound) type of queries will be created by the application server 282. The registration module 274 registers this information into the invalidator/refresher's internal or auxiliary data structures 280. Query types may be provided by the Web site application server designers since they know what types of queries can be issued from the application servers 282.

When operating in an on-line mode, the registration module 274 scans the QI/URL map 284 and registers the new QTs and QIs. For query type discovery, the invalidator/refresher 272 constantly listens to the QI/URL map 284 to see if there are any query instances that it cannot associate with known query types. If such query instances are encountered, the invalidator/refresher 272 will interpret them to identify their query types. For example, if the invalidator/refresher 272 observes the following three query instances in the log:

```
select make, model, price
from car
where make = "Toyota";
select make, model, price
from car
where make = "Honda";
select make, model, price
from car
where make = "Ford";
```

```
select make, model, price
from car
where make = $var;
```

Also, hard-coded invalidation policies 286 are registered at this mode. For invalidation policy registration, during a hot start, domain experts and CachePortal™ engineers may establish guidelines governing the invalidation process. These guidelines can be registered into the invalidator/refresher's internal data structures or auxiliary data structures 280. For example, a registered invalidation policy 286 may be to "cache and invalidate only the 100 most frequently accessed pages."

For invalidation policy discovery, the invalidator/refresher 272 is capable of constantly establishing/updating the performance guidelines governing the invalidation process. Some parameters to be considered may include database polling (access to the database with the purpose of gathering extra information that may be needed in the invalidation (refreshing process) frequency, join index size, the frequency of join index maintenance, and the like, as described herein. For example, a join index may initially be created for a particular query, but over time, the invalidator/refresher 272 may determine that the update frequency of that join index is to high to warrant maintaining the join index. Similarly, in the on-line mode, the registration module 274 can also dynamically create query statistics and create/update invalidation policies.

Invalidation module. The invalidation module 278 is responsible of answering the question, "when to invalidate." Unlike the registration module 274, which listens to the queries from the QI/URL map 284, the invalidation module 278 listens to the database update logs, passes update information to the information management unit for the creation of auxiliary data structures 280 (storage needed to keep mapping QI/QT, join indexes, and the like), and passes update information to the registration unit for the revision of invalidation policies 286. In addition, the invalidation module 278 uses the invalidation policy 286 and auxiliary data structures 280 to schedule the subqueries that will be sent to the DBMS 288 (database polling) and sends invalidation messages 290 to the appropriate cache 292 or Web'server. The invalidation module 278 may perform database polling request scheduling and request generation/result interpretation.

Typically, the invalidator/refresher 272 will use the internal auxiliary structures 280 to determine which cached pages should be invalidated. However, in some cases, the internally maintained information may not be enough for this purpose. In these cases, the invalidation module will perform database polling request scheduling by identifying which information polling requests have to be generated, and when should these requests passed to the DBMS 288.

In addition, the invalidation module 278 performs request generation/result interpretation by converting information requests into a form (i.e., queries) understandable to the DBMS 288, and converting query results into a form that the invalidator/refresher 272 can use.

Information management module. The information management module 276 creates auxiliary data structures 280 that the invalidation module 278 uses for decisionmaking purposes. Note that the decision can be either based on query types or query instances. For example, a decision based on query types could be that single table queries do not require further access to database (database polling) for invalidation. In another example, a decision based on QIs could be that if the domain of the query is small, then give it a low priority during update management. In other words, for a given query, the intelligent invalidator/refresher 272 will know how many Web pages are potentially impacted; the higher the potential impact, the higher priority for that QI.

Since update time and query time are not correlated, some benefit can be derived from this delay in optimizing the invalidation schedule. Therefore, decision parameters for query management may include the query type/definition, because a query type which requires too much overhead may not be cached. Another decision parameter may be the variable values (query instance), for a query instance that is not requested very often may not be cached. The update rate of the relevant relations may also be considered, for a page which requires frequent updates may not be cached.

The information management module 276 may perform QI/QT coalescing and update coalescing. Because the number of QTs and QIs to be maintained can be large, instead of treating each QI individually, the invalidator/refresher 272 may perform QI/QT coalescing by finding the related instances and processing them as a group. Similarly, if multiple query types have parts that are similar/related to each other, these parts will be treated in a coordinated manner. In addition, because the number of DBMS updates, deletes, or inserts to be processed can be large, instead of treating each change individually, the invalidator/refresher 272 will find the related updates and process them as a group. This is particularly important when handling range updates.

Techniques to Reduce the Amount of Information Polling

Range queries may update many similar tuples. An example of a range update is an operation to increase all the product prices in a database by five percent. To determine if associated Web pages need to be invalidated, the intelligent invalidator/refresher could detect each update, one at a time, and process one update at a time. However, this may be time consuming, and the creation of database information polling (subqueries) may be excessive. In preferred embodiments of the present invention, the intelligent invalidator/refresher can wait until all updates are finished, and treat all updates as an update to a single virtual table. In this section, techniques for reducing database information polling are described, especially when a range query for update, insert, and delete DBMS operations is issued.

FIG. 13 illustrates a timeline 294 and a sequence of events. The "sync" events are the times at which the invalidator/refresher retrieves updates from the update log. If the sync events are frequent then the invalidation process is more real-time; however, there is less time for decision making. The "up" events indicate the updates that occur to the database. The "qi" events show the query instances recorded by the sniffer. Note that updates logged between $sync_1$ and $sync_2$ are processed after $sync_2$.

For purposes of illustration only, assume $cond(qi_1) \rightarrow cond(qi_2)$ (condition of $qi_1$ implies condition of $qi_2$), and that $qi_1$ has not been not invalidated yet ($qi_1$ either occurred after $sync_1$ as shown in FIG. 13, or no relevant update occurred before $sync_1$). Under these circumstances, if $qi_1$ needs to be invalidated, then $qi_2$ also needs to be invalidated.

In a similar example, assume that $cond(qi_2) \rightarrow cond(qi_1)$ and that $qi_1$ is not invalidated yet. Under these circumstances, if $qi_2$ needs to be invalidated, then $qi_1$ also needs to be invalidated.

Therefore, query instance lattices can be formed which describe the partial order in which queries have to be invalidated. This concept can be generalized in the following discussion. Assume that the invalidator/refresher has the following query type registered in the internal data structures:

$$QT = F^f_{AG} \Pi_{AP} \sigma_C (R_1 \times \ldots \times R_N)[V_1, \ldots, V_M]$$

where $\sigma$ is the selection operator, $\Pi$ is the projection operator, F is the group-by operator, x is the Cartesian product operator, $R_i$s are the relations, C is the query condition, $V_j$s are the query variables/parameters, AP is the set of projection attributes, AG is the set of group-by attributes, and f is an aggregation function.

The set of all know query instances of this type can be denoted as a relation ($QITbl_{QT}$) with the following attributes:

| $QITbl_{QT} =$ | QID | $V_1$ | ... | $V_M$ | Req_time |
| --- | --- | --- | --- | --- | --- | where QID is the attribute in the table ($QITbl_{QT}$), M is the number of variables that form this query type, and the Req_time is the time stamp when the query was issued last time.

The set of all query instances (and their results) that have been executed so far and not invalidated can be formulated as follows:

$$F^f_{AG} \Pi_{AP_v} \sigma_{C_v} (R_1 \times \ldots \times R_N \times QITbl_{QT}),$$

where $APv = AP \cup \{QID\}$, and $C_v$ is the condition C augmented such that each $V_i$ is replaced with the corresponding attribute name in $QITbl_{QT}$.

Positive query lattices. Positive query lattices are a sequence of query conditions related by the "and" Boolean operator. Positive query lattices can be efficient mechanisms for determining when a database change will not affect a query, for as soon as one query condition is not satisfied, it is known that the database change will not affect the query result, and the remaining query conditions need not be checked.

Note that, in general, condition $C_v$ can be rewritten in a conjunctive normal form as follows:

$$C_v = C_1^{\wedge} \ldots {}^{\wedge} C_c,$$

where $C_j$s are sub-conditions or sub-queries (aggregations used in the where clause etc.). Therefore, the query can also be rewritten as:

$$F^f_{AG} \Pi_{AP_v} (\sigma_{C1}(R_1 \times \ldots \times QITbl_{QT}) \cap \ldots \cap \sigma_{Cc}(R_1 \times \ldots \times QITbl_{QT})), \text{ or as}$$

$$F^f_{AG} \Pi_{AP_v} (\sigma_{C1}(R_1 \times \ldots \times QITbl_{QT}) \cap \ldots \cap \Pi_{AP_v} \sigma_{Cc}(R_1 \times \ldots \times QITbl_{QT})).$$

Let $R_1(sync_1)$ denote the status of relation $R_1$ at $sync_1$. Then, the status of relation $R_1$ at $sync_2$ can be denoted as:

$$R_1(sync_2) = R_1(sync_1) + \Delta^+(R_1) - \Delta^-(R_1),$$

where $\Delta^+(R_1)$ is the new tuples added to the relation $R_1$ and where $\Delta^-(R_1)$ is the deleted tuples added to the relation $R_2$. Given a query instance with an ID equal to qid, if for all $C_j$s there is enough evidence to imply that:

$$qid \in \Pi_{QID} \sigma_{Cj}(\Delta^+(R_1) \times \ldots \times QITbl_{QT}) \text{ or}$$

$$qid \in \Pi_{QID} \sigma_{Cj}(\Delta^-(R^1) \times \ldots \times QITbl_{QT}),$$

then the query instance with the ID qid must be invalidated. Note that by keeping extra information, the semantics of the function f can be used to reduce the amount of over-invalidation. For instance, if the aggregation function is avg($A_1$), then if the value of avg($A_1$) and count(AG) at $sync_1$ is known, then the value of avg($A_1$) at $sync_2$ can be determined using $\Delta^+(R_1)$ and $\Delta^-(R_1)$.

Let $Q=\{q_1, \ldots, q_n\}$ denote all query definitions. Then, $L_p(V_p, E_p)$ (positive query lattice) is a directed acyclic graph, where the vertices in $V_p$ correspond to queries (not necessarily in Q) and edges in $E_p$ correspond to invalidation relationships (between these queries) that are defined as follows:

if $q_i \rightarrow q_j \epsilon E_p$, then if $qid \notin q_i$, then $qid \notin q_j$, either.

Therefore, positive query lattices can be used to propagate decisions of not-to-invalidate a query instance.

FIG. 14 shows an example positive query lattice. In this example, assume that it is known that an update will not affect the top-left query 296,

```
SELECT *
FROM R2
WHERE R2.b > 50.
```

Then, without further processing, it can be determined that the query 298,

```
SELECT *
FROM R1,R2
WHERE R1.a > R2.a and
      R1.a > 100 and
      R2.b > 50
``` is not affected by the update either.

The following example illustrates how it is possible to identify which query results have been impacted by the newly inserted, deleted, or updated tuples. In this example, assume that the query QUERY2 has been issued to produce a Web page, say URL2, as described hereinabove.

QUERY2

```
select car.make, car.model, car.price, mileage.mpg
from car, mileage
where car.make = "Toyota" and
      car.model = mileage.model;
```

Note that this query involves more than one table and includes a join operation. Now assume, based on the database log, that a range insert has been performed and a few tuples have been inserted into the table "car." The tuples inserted include:

(Acura, TL, 30,00)

(Acura, RL, 40,00)

(Toyota, Avalon, 25,00)

(Toyota, Camry, 20,00)

(Toyota, 4Runner, 30,00).

$\Delta^+(car)$ is a set of {(Acura, TL, 30,00), (Acura, RL, 40,00), (Toyota, Avalon, 25,00), (Toyota, Camry, 20,00), (Toyota, 4Runner, 30,00)}. Assume that a temporary table TEMP is created for $\Delta^+(car)$. QUERY2 can be converted to QUERY6:

QUERY6:

```
select temp.make
from temp, mileage
where temp.make = "Toyota" and
      temp.model = mileage.model;
```

Note that if the values of mileage.model are available, the temporary table TEMP for $\Delta^+(car)$ can be created within the invalidator, and query processing can be performed for QUERY6. If the query result is not empty, URL2 has been impacted by the range insert operation. However, if the values of mileage.model are not available, a temporary table TEMP can be created on the DBMS for $\Delta^+(car)$, and query processing for QUERY6 can be performed on the DBMS. Similarly, if the query result is not empty, URL2 has been impacted by the range insert operation. Alternatively, if the values for values of mileage.model are not available, the values can be requested from the DBMS. The query that polls data from the DBMS can be as follows:

```
select mileage.model
from mileage
where model = "Avalon" or
      model = "Camry" or
      model = "4Runner";
or
select mileage.model
from mileage.
```

In another example, assume that the following queries QUERY7, QUERY8, and QUERY9 have been issued to produce Web pages URL7, URL8, and URL9:

```
QUERY7:
select car.make, car.model, car.price
from car
where car.make = "Toyota"
QUERY8:
select car.make, car.model, car.price
from car
where car.make = "Nissan"
QUERY9:
select car.make, car.model, car.price
from car
where car.make = "Acura"
```

Because these three queries are of the same type, a query instance table, $QITbl_{QT}$, can be created for this query type as follows:

| QID | Make |
| --- | --- |
| QUERY7 | Toyota |
| QUERY8 | Nissan |
| QUERY9 | Acura | where the query type is

```
select car.make, car.model, car.price
from car
where car.make = $Variable.
```

Note that this is a simplified table in which the request time is not shown. Assume also, based on the database log, that a range insert has been performed and a few tuples have been inserted into the table CAR in the DBMS. The inserted tuples are:
(Acura, TL, 30000)
(Acura, RL, 40000)
(Toyota, Avalon, 25000)
(Toyota, Camry, 20000)
(Toyota, 4Runner, 30000)
Temporary tables can be created for the inserted tuples as temp1, and let the $QITbl_{QT}$ for QUERY7, QUERY8, and QUERY9 be Temp2. The queries QUERY7, QUERY8, and QUERY9 can be converted to the following query:

```
select temp2.QID
from temp1, temp2
where temp1.make = temp2.make;
```

The results of the query are QUERY7 and QUERY9, which means the Web pages using these two queries need to be invalidated.

If the query type is:

```
select car.make, car.model, mileage.mpg
from car, mileage
where car.make = $variable and
    car.model = mileage.model;
``` for the following queries:

```
select car.make, car.model, mileage.mpg
from car, mileage
where car.make = "Toyota" and
    car.model = mileage.model;
select car.make, car.model, mileage.epa
from car, mileage
where car.make = "Nissan" and
    car.model = mileage.model;
select car.make, car.model, mileage.epa
from car, mileage
where car.make = "Acura" and
    car.model = mileage.model;
```

These query instances and inserted tuples can be converted to a single query representation as follows:

```
select temp2.QID
from temp1, temp2, mileage
where temp1.make = temp2.make and
    temp1.model = mileage.model;
```

Note that this query representation contains a query condition temp1.model=mileage.model that cannot be answered based on the tables TEMP1 and TEMP2. If the mileage.model information is not available, then alternatively, the following query can be issued to the DBMS to retrieve the information we need:

```
select mileage.model
from mileage
```

Assume that the result of this query is stored as TEMP3, which has only one attribute, model. Then the query representation for checking invalidation above can be rewritten as:

```
select temp2.QID
from temp1, temp2, temp3
where temp1.make = temp2.make and
    temp1.model = temp3.model;
```

The query results will be the queries whose results have been impacted by the range insert. The complete and formal descriptions are given in an example provided hereinafter which uses the query Q($a,$b,$c).

Negative query lattices. Negative query lattices are a sequence of query conditions related by the "or" Boolean operator. Negative query lattices can be efficient mechanisms for determining when a database change will affect a query, for as soon as one query condition is satisfied, it is known that the database change will affect the query result, and the remaining query conditions need not be checked.

Note also that condition $C_v$ can be rewritten as:

$$C_v = C_1 v \ldots v C_c,$$

where $C_j$s are sub-conditions or sub-queries (aggregations used in the where clause etc.). In this case, the query can also be rewritten as:

$$F^f{}_{AG}\Pi_{APv}(\sigma_{C1}(R_1 \times \ldots \times QITbl_{QT}) \cup \ldots \cup 94_{Cc}(R_1 \times \ldots \times QITbl_{QT})), \text{ or as}$$

$$F^f{}_{AG}\Pi_{Apv}(\sigma_{C1}(R_1 \times \ldots \times QITbl_{QT}) \cup \ldots \cup \Pi_{Apv}\sigma_{Cc}(R_1 \times \ldots \times QITbl_{QT})).$$

Then, if for any $C_j$, there is enough evidence to imply that:

$$qid \in \Pi_{QID}\sigma_{Cj}(\Delta^+(R_1) \times \ldots \times QITbl_{QT}) \text{ or}$$

$$qid \in \Pi_{QID}\sigma_{Cj}(\Delta^-(R_1) \times \ldots \times QITbl_{QT}),$$

then the query instance with the ID qid must be invalidated.

Let $Q=\{q_1, \ldots, q_n\}$ denote all query definitions. Then, $L_n(V_n, E_n)$ (negative query lattice) is a directed acyclic graph, where the vertices in V correspond to queries (not necessarily in Q) and edges in $E_n$ correspond to invalidation relationships (between these queries) that are defined as follows:

if $q_i \rightarrow q_j \in E_n$, then if $qid \notin q_i$, then $qid \notin q_j$ too.

Therefore, negative query lattices can be used to propagate decisions to invalidate a query instance.

Figure 15:
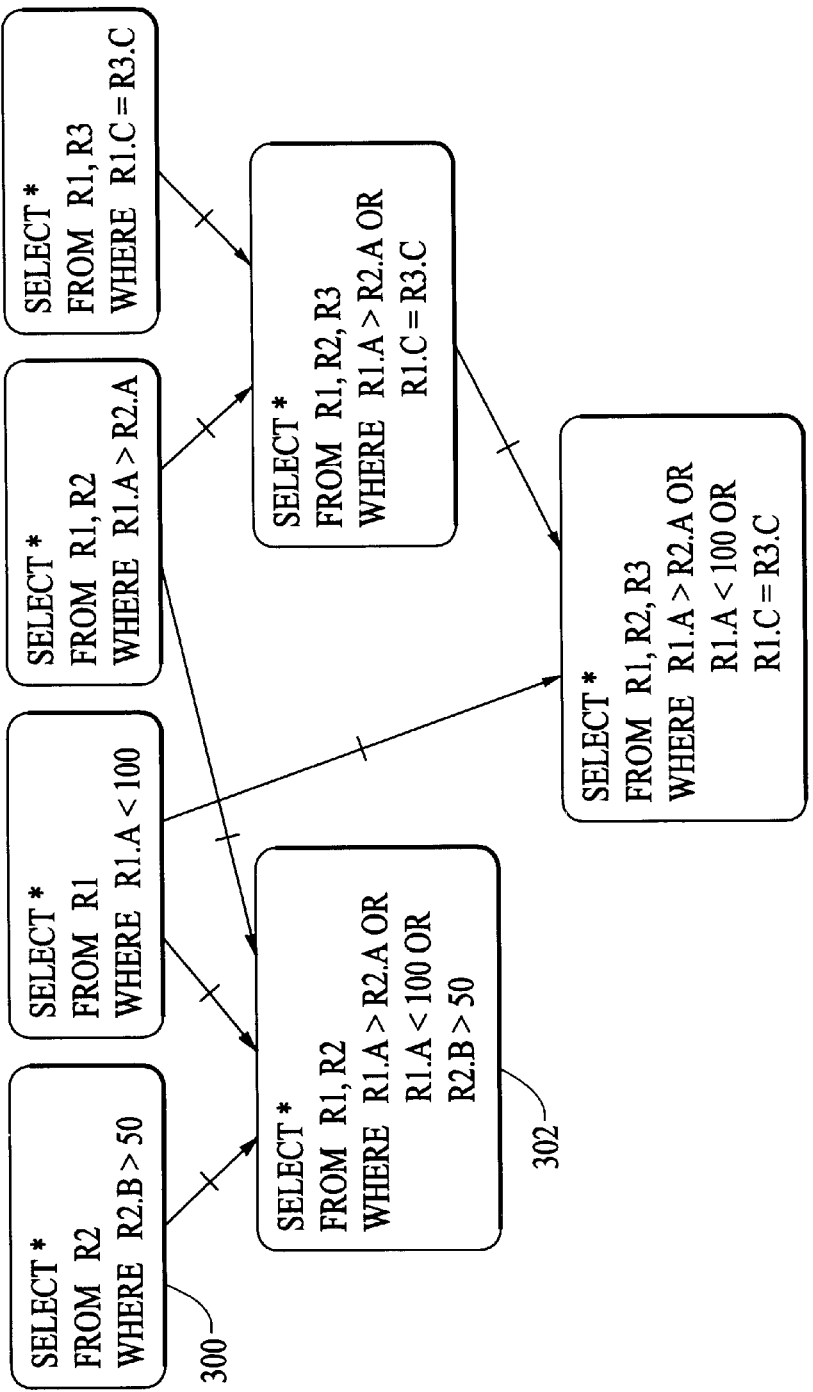
FIG. 15 is a flowchart illustrating a negative query lattice according to an embodiment of the present invention.

FIG. 15 shows an example negative query lattice. In this example, assume that it is known that an update affects the top-left query 300,

```
SELECT *
FROM R2
WHERE R2.b > 50.
```

Then, without further processing, we can determine that the query 302,

```
SELECT *
FROM R1,R2
WHERE R1.a > R2.a or
      R1.a > 100 or
      R2.b > 50.
``` is also affected by the update.

Database Polling Based on SQL Queries

This section lists methods for processing queries of differing syntaxes. It should be understood that, as with other queries, the results of these queries may be used to create and maintain join indexes.

Select Statement. For queries of the form:

Q=SELECT $A_1$ FROM Tbl or
Q=SELECT DISTINCT $A_1$ FROM Tbl, given DBMS changes $\Delta^+$Tbl and $\Delta^-$Tbl, the invalidator/refresher can evaluate whether P1=SELECT $A_1$ FROM $\Delta^+$Tbl and
P2=SELECT $A_1$ FROM $\Delta^-$Tbl are empty or not.

Conditional Select Statement. For queries of the form:

Q=SELECT $A_1$ FROM Tbl WHERE cond($A_1, A_2, \ldots$), the query can be split into two smaller queries as follows:

$Q_1$=SELECT * FROM Tbl WHERE cond($A_1, A_2, \ldots$)
$Q_2$=SELECT $A_1$ FROM $Q_1$ To determine if $Q_1$ will be affected by DBMS changes $\Delta^+$Tbl and $\Delta^-$Tbl, the invalidator/refresher can evaluate whether S1=SELECT * FROM $\Delta^+$Tbl WHERE cond($A_1, \ldots$) and
S2=SELECT * FROM $\Delta^-$Tbl WHERE cond($A_1, \ldots$)

are empty or not. If the result is empty, there is no need to check for $Q_2$. If the result is not empty, the invalidator/refresher can evaluate whether P1=SELECT $A_1$ FROM S1 and
P2=SELECT $A_1$ FROM S2 are empty or not.

Conditional Select Statement with Query Variables. For queries of the form:

Q($V_1, V_2, \ldots$)=SELECT * FROM Tbl WHERE cond($A_1, A_2, \ldots, V_1, V_2, \ldots$), this parametric query can be rewritten as a non-parametric query:

QI=SELECT QITbl.QID FROM Tbl, QITbl WHERE cond($A_1, A_2, \ldots$, QITbl.$V_1$, QITbl.$V_2, \ldots$), where QITbl is a table which consists of all query instances that have not been invalidated yet.

Given DBMS changes $\Delta^+$Tbl and $\Delta^-$Tbl, all query instances in

QI$^+$=SELECT QITbl.QID FROM $\Delta^+$Tbl, QITbl WHERE cond($A_1, \ldots$, QITbl.$V_1$, QITbl.$V_2, \ldots$) and
QI$^-$=SELECT QITbl.QID FROM $\Delta^-$Tbl1, QITbl WHERE cond($A_1, \ldots$, QITbl.$V_1$, QITbl.$V_2, \ldots$)

can be invalidated. Note that neither QI$^+$ or QI$^-$ need to access the original DBMS.

Conditional Join Statement with Query Variables: For queries of the form:

Q($V_1, V_2, \ldots$)=SELECT * FROM Tbl, Tbl2 WHERE cond($A_1, A_2, \ldots, V_1, V_2, \ldots$), this parametric query can be rewritten as a non-parametric query as follows:

Q'=SELECT QITbl.QID FROM Tbl1, Tbl2, QITbl WHERE cond($A_1, A_2, \ldots$, QITbl.$V_1$, QITbl.$V_2, \ldots$), where QITbl is a table which consists of all query instances that have not been invalidated yet. Given the DBMS changes $\Delta^+$Tbl, $\Delta^-$Tbl, $\Delta^+$Tbl2, and $\Delta^-$Tbl2, all query instances in $QI_1^+$=SELECT QITbl.QID FROM Tbl1, $\Delta^+$Tbl2, QITbl WHERE cond($A_1, \ldots$, QITbl.$V_1, \ldots$),
$QI_2^+$=SELECT QITbl.QID FROM Tbl2, $\Delta^+$Tbl1, QITbl WHERE cond($A_1, \ldots$, QITbl.$V_1, \ldots$),
$QI_3^+$=SELECT QITbl.QID FROM $\Delta^+$Tbl1, $\Delta^+$Tbl2, QITbl WHERE cond($A_1, \ldots$, QITbl.$V_1, \ldots$),
$QI_4^+$=SELECT QITbl.QID FROM $\Delta^-$Tbl1, $\Delta^{31}$ Tbl2, QITbl WHERE cond($A_1, \ldots$, QITbl.$V_1, \ldots$),
$QI_1^-$=SELECT QITbl.QID FROM $\Delta^-$Tbl1, $\Delta^-$Tbl2, QITbl WHERE cond($A_1, \ldots$, QITbl.$V_1, \ldots$),
$QI_2^-$=SELECT QITbl.QID FROM Tbl2, $\Delta^-$Tbl1, QITbl WHERE cond($A_1, \ldots$, QITbl.$V_1, \ldots$),
$QI_3^-$=SELECT QITbl.QID FROM $\Delta^-$Tbl1, $\Delta^-$Tbl2, QITbl WHERE cond($A_1, \ldots$, QITbl.$V_1, \ldots$), and
$QI_4^-$=SELECT QITbl.QID FROM $\Delta^+$Tbl1, $\Delta^+$Tbl2, QITbl WHERE cond($A_1, \ldots$ QITbl.$V_1, \ldots$)

can be invalidated. Note that $QI_3^+$, $QI_4^+$, $QI_3^-$, $QI_4^-$ can be entirely executed outside of the DBMS. On the other hand, $QI_1^+$, $QI_2^+$, $QI_1^-$, $QI_2^-$ require access to the original table. In order to minimize the access to the DBMS, references to the original tables can be omitted from the queries. Note that QIs describe the query instances to be invalidated. Equivalently, the query instances that will be kept intact can be described by:

$KEEP_1$=SELECT QITbl.QID FROM Tbl1, $\Delta^+$Tbl2, QITbl WHERE not cond($\ldots$),
$KEEP_2$=SELECT QITbl.QID FROM Tbl2, $\Delta^+$Tbl1, QITbl WHERE not cond($\ldots$),
$KEEP_3$=SELECT QITbl.QID FROM Tbl1, $\Delta^-$Tbl2, QITbl WHERE not cond($\ldots$), and
$KEEP_4$=SELECT QITbl.QID FROM Tbl2, $\Delta^-$Tbl1, QITbl WHERE not cond($\ldots$).

Given the descriptions of the query instances to be kept intact, the set of query instances that will be invalidated by $QI_1^+$, $QI_2^+$, $QI_1^-$, $QI_2^-$ can be found as follows:

$QI_{agg}$=(SELECT QITbl.QID FROM QITbl) MINUS ($KEEP_1$ UNION $KEEP_2$ UNION $KEEP_3$ UNION $KEEP_4$).

$QI^{agg}$ will be used instead of $QI_1^+$, $QI_2^+$, $QI_1^-$, $QI_2^-$. Note that although KEEPs also require access to at least one base table, they can be further limited to $\Delta$ files if speed is essential:

$KEEP'_1$=SELECT QITbl.QID FROM $\Delta^+$Tbl2, QITbl WHERE not cond'($\ldots$),
$KEEP'_2$=SELECT QITbl.QID FROM $\Delta^+$Tbl1, QITbl WHERE not cond'($\ldots$),
$KEEP'_3$=SELECT QITbl.QID FROM $\Delta^-$Tbl2, QITbl WHERE not cond'($\ldots$), and
$KEEP'_4$=SELECT QITbl.QID FROM $\Delta^-$Tbl1, QITbl WHERE not cond'($\ldots$).

Here cond' is the part of the condition that can be answered using the corresponding $\Delta$ files and QITbl. Note that this action may result in under-invalidation if $KEEP'_i \supseteq KEEP_i$ hence this should be employed only if $KEEP'_i \subseteq KEEP_i$ for all i.

Select Statement with Aggregation: For queries of the form:

$Q = \text{SELECT func}(A_1), A_2 \text{ FROM Tbl GROUPBY } A_2$ given the DBMS changes $\Delta^+\text{Tbl}$ and $\Delta^-\text{Tbl}$, these can be handled in special conditions.

Nested Sub-queries with EXISTS. For queries of the form:

```
Q = SELECT *
    FROM Tbl
    WHERE EXISTS (subquery);
```

Q will be invalidated only if the state of the subquery changes from empty to non-empty, or vice versa. Because this may be too costly to evaluate, the subquery can be invalidated instead of Q. If there is any change in the result of subquery, then it can be assumed that the result for Q will also change. This can be extended to join queries, queries with variables, and queries with more complex conditions.

More Nested Sub-queries. For queries of the following forms:

```
Q = SELECT *
    FROM Tbl
    WHERE A comparison-operator ALL (subquery);
Q = SELECT *
    FROM Tbl
    WHERE A IN (subquery);
Q = SELECT *
    FROM Tbl
    WHERE A comparison-operator (aggregation-subquery);
```

(where A is an attribute in table Tbl) because these may be too costly to evaluate, the subquery can be invalidated instead of Q. If there is any change in the result of subquery, then it can be assumed that the result of Q will also change. This can be extended to join queries and queries with variables.

Set Operations. For queries of the following forms:

```
Q = SELFCT *
    FROM Tbl1
    UNION
    SELECT *
    FROM Tbl2.
Q = SELECT *
    FROM Tbl1
    DIFFERENCE
    SELECT *
    FROM Tbl2.
Q = SELECT *
    FROM Tbl1
    MINUS
    SELECT *
    FROM Tbl2.
``` because these may be too costly to evaluate, the two sub-queries can be invalidated instead of Q. If there is any change in any of the sub-queries, then it can be assumed that the result of Q will also change. This can be extended to join queries and queries with variables.

For example, given the following query:

```
Q($a,$b,$c) = SELECT R1.a, R2.b, count(*)
    FROM R1, R2
    WHERE R1.a > $a and
        R2.c < $c and
        R2.d in (SELECT R3.d
            FROM R3
            WHERE R3.b = $b and
                R3.a > R1.a and
                R3.b > R2.b)
    GROUPBY R2.b
``` this query can be converted into the following query:

```
Q' = SELECT R1.a, R2.b, count(*), QITbl.QID
    FROM R1, R2, QITbl
    WHERE R1.a > QITbl.a and
        R2.c < QITbl.c and
        R2.d in (SELECT R3.d
            FROM R3
            WHERE R3.b = QITbl.b and
                R3.a > R1.a and
                R3.b > R2.b)
    GROUPBY R2.b,QITbl.QID
```

The query can then be split into the following pieces:

```
Q1 = SELECT QITbl.QID
    FROM R1, QITbl
    WHERE R1.a > QI.a
Q2 = SELECT QITbl.QID
    FROM R2, QITbl
    WHERE R2.c < QI.c
Q3 = SELECT QITbl.QID
    FROM R3, R1, R2, QITbl
    WHERE R3.b = QITbl.b and
        R3.a > R1.a and
        R3.b > R2.b.
```

Assume that there is a set $\Delta R_1$ of insertions to table $R1$. These pieces can be further refined as follows:

```
Q1^Δ = SELECT QITb1.QID
    FROM ΔR1, QITbl
    WHERE ΔR1.a > QITbl.a
Q2^Δ = SELECT QITbl.QID
    FROM R2, QITbl
    WHERE R2.c < QITbl.c
Q3^Δ = SELECT QITbl.QID
    FROM R3, ΔR1, R2, QITbl
    WHERE R3.b < QITbl.b and
        R3.a > ΔR1.a and
        R3.b > R2.b
```

Note that, since the last query may be too costly to execute, it can be split as follows:

```
Q3_1^Δ = SELECT QITbl.QID
FROM R3, ΔR1, QITbl
WHERE R3.b = QITbl.b and
    R3.a > ΔR1.a
Q3_2^Δ = SELECT QITbl.QID
FROM R3, R2, QITbl
WHERE R3.b = QITbl.b and
    R3.b > R2.b
```

The set of query instances to invalidate is the set of query instances that are returned by all queries; i.e., the intersection of all results. Note that in order to speed up the process, some of these polling-queries can be omitted or replaced with cheaper polling-queries (potentially causing over-invalidation).

Because the original DBMS does not have tables $\Delta R1$ and QI, the above queries can be rewritten as follows:

```
Q1^Δ = SELECT QITbl.QID
       FROM ΔR1, QITbl
       WHERE ΔR1.a > QITbl.a
PollQ1 = SELECT c
         FROM R2
Q2^Δ = SELECT QITbl.QID
       FROM PollQ1, QITbl
       WHERE PollQ1.c < QITbl.c
PollQ2 = SELECT a,b
         FROM R3
Q3_1^Δ = SELECT QITbl.QID
         FROM PollQ2, ΔR1, QITbl
         WHERE PollQ2.b = QITbl.b and
               PollQ2.a > ΔR1.a
PollQ3 = SELECT R3.b
         FROM R2,R3
         WHERE R3.b > R2.b
Q3_2^Δ = SELECT QITbl.QID
         FROM PollQ3, QITbl
         WHERE PollQ3.b = QITbl.b
```

Therefore, three polling queries (PollQs) must be issued to the DBMS (or the relevant information can be maintained outside of the DBMS).

Additional Comments

The previous discussion described five intelligent Web page caching and refreshing mechanisms, illustrated in FIGS. 3–7, and three content change monitoring components, illustrated in FIGS. 8–10. Furthermore, an intelligent invalidator/refresher, which may reside in the content change monitoring component or, work in conjunction with it, has been described. It should be understood that in alternative embodiments of the present invention, any of the content change monitoring components may be used in conjunction with any of the intelligent Web page caching and refreshing mechanisms and the intelligent invalidator/refresher. Furthermore, any of the functional blocks described herein may be physically located in different servers or in the same server. For any of the possible combinations described above, it may also be possible for CachePortal™ or another content delivery services provider to contain the content change monitoring component or the intelligent invalidator/refresher and perform the invalidation or refreshing of the stored content.

It should be further understood that the content change monitoring components and intelligent invalidator/refresher described herein may, at times, be used in combination within a single system. Queries can use a particular mechanism to achieve more efficient performance. For example, frequently used queries are generally suited for the speed of the trigger definition, which is faster because it is part of the program in the data base. However, complicated queries are generally suited for view definitions, because it is very difficult to define a complicated query using a trigger definition. Additionally, for non-frequently used queries, some sort of external server may be used.

The content change monitoring component can execute a program which examines a particular query and determines whether the view definition, trigger definition, or an external server should be used. For example, if a query accesses a single database, the program may select the trigger definition. For multiple database queries or joint operations, the program may select the view definition. For infrequently used queries, the program may select an external server.

It should also be understood that in the case where there are multiple DBMSs to be called, an additional string would have to be added to the stored procedure or API calls, identifying the location and name of the DBMS to be accessed. Additional information that might be necessary to access multiple databases is information such as user name and password.

Therefore, embodiments of the present invention provide a system and method for intelligent caching and refreshing of Web content to synchronize the data stored in cache with the data stored in DBMSs. Embodiments of the present invention also provide a system and method for intelligent caching and refreshing of Web content where, when data in a DBMS changes, the Web pages that utilize that data will be invalidated. Furthermore, embodiments of the present invention provide a system and method for intelligent caching and refreshing of Web content where, when data in a DBMS changes, the Web pages that utilize that data will be refreshed.

What is claimed is:

1. In a system having at least one first memory for storing Web pages and a memory management system including at least one second memory for storing data used to generate Web pages, the memory management system capable of identifying modified data stored in the at least one second memory and maintaining at least one database log sequentially containing all operations to the at least one second memory, a system for updating stored Web pages based on modifications to data stored in the at least one second memory, comprising:

at least one server programmed for
   maintaining associations between each stored Web page and the stored data used to generate that particular Web page,
   receiving the identity of modified data from the memory management system,
   determining, from the identified modified data and the maintained associations, which stored Web pages are associated with the identified modified data, and
   communicating an update command to the at least one first memory that contains the stored Web pages associated with the identified modified data for updating the stored Web pages.

2. A system for updating stored Web pages as recited in claim 1, the at least one server further programmed for:
   receiving a Web content request containing a URL;
   issuing at least one query or operation to the at least one second memory in response to the Web content request;
   maintaining associations between the URL of the Web content request and the issued queries or operations;
   maintaining associations between the issued queries or operations and the stored data accessed by the queries or operations;
   deriving associations between the stored Web pages and the stored data from the maintained associations between the URL of the Web content request and the issued queries or operations, and the maintained associations between the issued queries or operations and the stored data accessed by the queries or operations; and identifying, through prior processing steps to store the stored Web pages in the at least one first memory, the location of the Web pages associated with the identified modified data.

3. A system for updating the stored Web pages as recited in claim 2, wherein the update command includes a message to invalidate or delete the stored Web pages.

4. A system for updating the stored Web pages as recited in claim 2, wherein the update command includes a message to refresh the stored Web pages.

5. A system for updating the stored Web pages as recited in claim 4, wherein if the stored Web page is in a Web server, the update command includes a message to generate a new Web page and store the new Web page in the Web server.

6. A system for updating stored Web pages as recited in claim 2, the at least one server further programmed for:
   maintaining a Web server log containing a request and delivery timestamp for the received URL;
   maintaining a query and operation log containing an issuance timestamp for the issued query or operation;
   deriving associations between the stored Web pages and the stored data from the Web server log and the query and operation log; and
   determining, from the identity of the modified data and the derived MO associations between the stored Web pages and the stored data, which stored Web pages are associated with the identified modified data.

7. A system for updating stored Web pages as recited in claim 6, the at least one server including:
   a Web server programmed for receiving the Web content request and maintaining the Web server log;
   an application server programmed for receiving a forwarded Web content request from the Web server and issuing the at least one query or operation to the at least one second memory in response to the forwarded Web content request;
   a content change monitor programmed for maintaining the associations between the issued queries or operations and the stored data accessed by the queries or operations, and determining which queries or operations are associated with the identified modified data; and
   a content delivery services server programmed for determining the associations between the URLs of the Web content requests and the issued queries or operations from the query and operation logs and the Web server log, receiving an identity of the queries or operations associated with the identified modified data from the content change monitor, determining which stored Web pages are associated with the queries or operations associated with the identified modified data, and communicating the update command to the at least one first memory that contains the stored Web pages associated with the identified modified data.

8. A system for updating the stored Web pages as recited in claim 7, the content change monitor programmed for:
   receiving queries sent to the at least one second memory;
   defining a view table for each query containing pointers to all data in the at least one second memory that is associated with that particular query;
   receiving the identified modified data from the memory management system; and
   determining from the view table and the identified modified data any queries associated with the identified modified data.

9. A system for updating the stored Web pages as recited in claim 7, the content change monitor programmed for:
   receiving operations sent to the at least one second memory;
   defining a daemon for each operation, the daemon establishing criteria for identifying stored data in the at least one second memory that is associated with that particular operation; and
   determining queries associated with the identified modified data by determining if the identified modified data satisfies the daemon.

10. A system for updating the stored Web pages as recited in claim 7, the content change monitor programmed for:
    receiving queries sent to the at least one second memory;
    creating a trigger definition for each query, the trigger definition establishing criteria for identifying stored data in the at least one second memory associated with that particular query; and
    determining queries associated with the identified modified data by determining if the identified modified data satisfies the trigger definition.

11. A system for updating the stored Web pages as recited in claim 7, the content change monitor containing at least one third memory and further programmed for:
    replicating data from the at least one second memory to the at least one third memory to harmonize the at least one third memory with the at least one second memory; and
    defining the view table for each query containing pointers to all data in the at least one third memory that is associated with that particular query.

12. A system for updating the stored Web pages as recited in claim 8, the content change monitor containing at least one third memory and further programmed for:
    performing all operations in the database log on the at least one third memory, in sequential order, to harmonize the at least one third memory with the at least one second memory; and
    defining the view table for each query containing pointers to all data in the at least one third memory that is associated with that particular query.

13. A system for updating the stored Web pages as recited in claim 6, further including a sniffer for listening to network traffic by reading request/delivery logs, collecting URL information and query or operation instances by reading a query instance delivery log, and generating the associations between the URL of the Web content request and the issued queries or operations.

14. A system for updating the stored Web pages as recited in claim 6, further including an invalidator/refresher for notifying appropriate caches or Web servers of the invalidity of a particular stored Web page, the invalidator/refresher including:
    a registration module for creating invalidation policies and collecting relevant query or operation statistics;
    an invalidation module for reading the database update logs and the associations between the URL of the Web content request and the issued queries or operations, scheduling subqueries, and notifying appropriate caches or Web servers of the invalidity of a particular stored Web page; and
    an information management module for creating auxiliary data structures for the invalidation module.

15. A system for updating the stored Web pages as recited in claim 6, the at least one server further programmed for:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

16. A system for updating the stored Web pages as recited in claim 15, wherein if the linked query conditions require access to more than one table in the at least one second memory, the at least one server is further programmed such that for each table to which access is required, the at least one server determines if the identified modified data satisfies those portions of the linked query condition specific to that particular table;

wherein after it is determined whether the identified modified data satisfies those portions of the linked query condition specific to a particular table, those portions of the linked query condition specific to a particular table are replaced by a determined value prior to evaluating those portions of the linked query condition specific to another particular table; and wherein, if at any time during the determination of whether the identified modified data satisfies those portions of the linked query condition specific to a particular table, it is determined that the linked query conditions are satisfied, then the identified modified data satisfies the linked query conditions.

17. A system for updating the stored Web pages as recited in claim 16, wherein after those portions of the linked query condition specific to a particular table are evaluated and a value for those portions is determined, in order to evaluate those portions of the linked query condition specific to another particular table, the at least one server is further programmed for:

issuing a subquery to the other particular table containing the linked query conditions, with portions of the linked query condition replaced by any previously determined values.

18. A system for updating the stored Web pages as recited in claim 17, wherein after a subquery issued to a particular table returns determined values for that subquery, the determined values are stored in an index structure;

wherein if subsequent queries are received by the at least one server that would require reissuing the same subquery, the index structure may be accessed by the at least one server to avoid having to issue the same subquery.

19. A system for updating stored Web pages as recited in claim 2, the at least one server further programmed for:

maintaining a URL/relevant operation mapping log from the URLs contained in the received Web content requests and the queries or operations issued to the least one second memory in response to the Web content requests; and determining, from the identity of the modified data, the maintained associations between the issued queries or operations and the stored data, and the URL/relevant operation mapping log, which stored Web pages are associated with the identified modified data.

20. A system for updating stored Web pages as recited in claim 19, the at least one server including:

an application server programmed for maintaining the URL/relevant operation mapping log, receiving a forwarded Web content request and issuing the at least one query or operation to the at least one second memory in response to the forwarded Web content request;

a content change monitor programmed for maintaining the associations between the issued queries or operations and the stored data accessed by the queries or operations, and determining which queries or operations are associated with the identified modified data; and a content delivery services server programmed for receiving an identity of the queries or operations associated with the identified modified data from the content change monitor, receiving the URL/relevant operation mapping log, determining which stored Web pages are associated with the queries or operations associated with the identified modified data, and communicating the update command to the at least one first memory that contains the stored Web pages associated with the identified modified data.

21. A system for updating the stored Web pages as recited in claim 20, the content change monitor programmed for:

receiving queries sent to the at least one second memory;

defining a view table for each query containing pointers to all data in the at least one second memory that is associated with that particular query;

receiving the identified modified data from the memory management system; and determining from the view table and the identified modified data any queries associated with the identified modified data.

22. A system for updating the stored Web pages as recited in claim 20, the content change monitor programmed for:

receiving operations sent to the at least one second memory;

defining a daemon for each operation, the daemon establishing criteria for identifying stored data in the at least one second memory that is associated with that particular operation; and determining queries associated with the identified modified data by determining if the identified modified data satisfies the daemon.

23. A system for updating the stored Web pages as recited in claim 20, the content change monitor programmed for:

receiving queries sent to the at least one second memory;

creating a trigger definition for each query, the trigger definition establishing criteria for identifying stored data in the at least one second memory associated with that particular query;

determining queries associated with the identified modified data by determining if the identified modified data satisfies the trigger definition.

24. A system for updating the stored Web pages as recited in claim 20, the content change monitor containing at least one third memory and further programmed for:

replicating data from the at least one second memory to the at least one third memory to harmonize the at least one third memory with the at least one second memory; and defining the view table for each query containing pointers to all data in the at least one third memory that is associated with that particular query.

25. A system for updating the stored Web pages as recited in claim 21, the content change monitor containing at least one third memory and further programmed for:

performing all operations in the database log on the at least one third memory, in sequential order, to harmonize the at least one third memory with the at least one second memory; and defining the view table for each query containing pointers to all data in the at least one third memory that is associated with that particular query.

26. A system for updating the stored Web pages as recited in claim 19, further including a sniffer for listening to network traffic by reading request/delivery logs, collecting URL information and query or operation instances by reading a query instance delivery log, and generating the associations between the URL of the Web content request and the issued queries or operations.

27. A system for updating the stored Web pages as recited in claim 19, further including an invalidator/refresher for notifying appropriate caches or Web servers of the invalidity of a particular stored Web page, the invalidator/refresher including:

a registration module for creating invalidation policies and collecting relevant query or operation statistics;

an invalidation module for reading the database update logs and the associations between the URL of the Web content request and the issued queries or operations, scheduling subqueries, and notifying appropriate caches or Web servers of the invalidity of a particular stored Web page; and an information management module for creating auxiliary data structures for the invalidation module.

28. A system for updating the stored Web pages as recited in claim 19, the at least one server further programmed for:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

29. A system for updating the stored Web pages as recited in claim 28, wherein if the linked query conditions require access to more than one table in the at least one second memory, the at least one server is further programmed such that for each table to which access is required, the at least one server determines if the identified modified data satisfies those portions of the linked query condition specific to that particular table;

wherein after it is determined whether the identified modified data satisfies those portions of the linked query condition specific to a particular table, those portions of the linked query condition specific to a particular table are replaced by a determined value prior to evaluating those portions of the linked query condition specific to another particular table; and wherein, if at any time during the determination of whether the identified modified data satisfies those portions of the linked query condition specific to a particular table, it is determined that the linked query conditions are satisfied, then the identified modified data satisfies the linked query conditions.

30. A system for updating the stored Web pages as recited in claim 29, wherein after those portions of the linked query condition specific to a particular table are evaluated and a value for those portions is determined, in order to evaluate those portions of the linked query condition specific to another particular table, the at least one server is further programmed for:

issuing a subquery to the other particular table containing the linked query conditions, with portions of the linked query condition replaced by any previously determined values.

31. A system for updating the stored Web pages as recited in claim 30, wherein after a subquery issued to a particular table returns determined values for that subquery, the determined values are stored in an index structure;

wherein if subsequent queries are received by the at least one server that would require reissuing the same subquery, the index structure may be accessed by the at least one server to avoid having to issue the same subquery.

32. A system for updating stored Web pages as recited in claim 19, the at least one server including:

an application server programmed for receiving a forwarded Web content request and issuing a content delivery services provider API call;

a content delivery services provider API handler programmed for receiving the content delivery services provider API call, maintaining the URL/relevant operation mapping log, and issuing the at least one query or operation to the at least one second memory in response to the content delivery services provider API call;

a content change monitor programmed for maintaining the associations between the issued queries or operations and the stored data accessed by the queries or operations, and determining which queries or operations are associated with the identified modified data; and a content delivery services server programmed for receiving an identity of the queries or operations associated with the identified modified data from the content change monitor, receiving the URL/relevant operation mapping log, determining which stored Web pages are associated with the queries or operations associated with the identified modified data, and communicating the update command to the at least one first memory that contains the stored Web pages associated with the identified modified data.

33. A system for updating the stored Web pages as recited in claim 32, the content change monitor programmed for:

receiving queries sent to the at least one second memory;

defining a view table for each query containing pointers to all data in the at least one second memory that is associated with that particular query;

receiving the identified modified data from the memory management system; and determining from the view table and the identified modified data any queries associated with the identified modified data.

34. A system for updating the stored Web pages as recited in claim 32, the content change monitor programmed for:

receiving operations sent to the at least one second memory;

defining a daemon for each operation, the daemon establishing criteria for identifying stored data in the at least one second memory that is associated with that particular operation; and determining queries associated with the identified modified data by determining if the identified modified data satisfies the daemon.

35. A system for updating the stored Web pages as recited in claim 32, the content change monitor programmed for:

receiving queries sent to the at least one second memory;

creating a trigger definition for each query, the trigger definition establishing criteria for identifying stored data in the at least one second memory associated with that particular query; and determining queries associated with the identified modified data by determining if the identified modified data satisfies the trigger definition.

36. A system for updating the stored Web pages as recited in claim 32, the content change monitor containing at least one third memory and further programmed for:
   replicating data from the at least one second memory to the at least one third memory to harmonize the at least one third memory with the at least one second memory; and
   defining the view table for each query containing pointers to all data in the at least one third memory that is associated with that particular query.

37. A system for updating the stored Web pages as recited in claim 33, the content change monitor containing at least one third memory and further programmed for:
   performing all operations in the database log on the at least one third memory, in sequential order, to harmonize the at least one third memory with the at least one second memory; and
   defining the view table for each query containing pointers to all data in the at least one third memory that is associated with that particular query.

38. A system for updating stored Web pages as recited in claim 2, the at least one server further programmed for:
   converting received Web content requests into stored procedures;
   maintaining a database query log from the URLs contained in the stored procedures and the queries issued to the least one second memory in response to the stored procedures;
   maintaining an operation log from the URLs contained in the stored procedures and the operations issued to the least one second memory in response to the stored procedures;
   generating a URL/relevant operation mapping table from the database query log and the operation log; and
   determining, from the identity of the modified data, the maintained associations between the issued queries or operations and the stored data, and the URL/relevant operation mapping table which stored Web pages are associated with the identified modified data.

39. A system for updating stored Web pages as recited in claim 38, the at least one server including:
   an application server programmed for converting received Web content requests into stored procedures, generating the database query log from the URLs contained in the stored procedures and the queries issued to the least one second memory in response to the stored procedures, and generating the operation log from the URLs contained in the stored procedures and the operations issued to the least one second memory in response to the stored procedures;
   a content change monitor programmed for maintaining the associations between the issued queries or operations and the stored data accessed by the queries or operations, and determining which queries or operations are associated with the identified modified data; and
   a content delivery services server for generating a URL/relevant operation mapping table from the database query log and the operation log and determining, from the identity of the modified data, the maintained associations between the issued queries or operations and the stored data, and the URL/relevant operation mapping table, which stored Web pages are associated with the identified modified data, and communicating the update command to the at least one first memory that contains the stored Web pages associated with the identified modified data.

40. A system for updating the stored Web pages as recited in claim 39, the content change monitor programmed for:
   receiving queries sent to the at least one second memory;
   defining a view table for each query containing pointers to all data in the at least one second memory that is associated with that particular query;
   receiving the identified modified data from the memory management system; and
   determining from the view table and the identified modified data any queries associated with the identified modified data.

41. A system for updating the stored Web pages as recited in claim 39, the content change monitor programmed for:
   receiving queries or operations sent to the at least one second memory;
   defining a daemon for each query or operation, the daemon establishing criteria for identifying stored data in the at least one second memory that is associated with that particular query or operation; and
   determining queries associated with the identified modified data by determining if the identified modified data satisfies the daemon.

42. A system for updating the stored Web pages as recited in claim 39, the content change monitor programmed for:
   receiving queries sent to the at least one second memory;
   creating a trigger definition for each query, the trigger definition establishing criteria for identifying stored data in the at least one second memory associated with that particular query; and
   determining queries associated with the identified modified data by determining if the identified modified data satisfies the trigger definition.

43. A system for updating the stored Web pages as recited in claim 39, the content change monitor containing at least one third memory and further programmed for:
   replicating data from the at least one second memory to the at least one third memory to harmonize the at least one third memory with the at least one second memory; and
   defining the view table for each query containing pointers to all data in the at least one third memory that is associated with that particular query.

44. A system for updating the stored Web pages as recited in claim 40, the content change monitor containing at least one third memory and further programmed for:
   performing all operations in the database log on the at least one third memory, in sequential order, to harmonize the at least one third memory with the at least one second memory; and
   defining the view table for each query containing pointers to all data in the at least one third memory that is associated with that particular query.

45. A system for updating the stored Web pages as recited in claim 38, further including a sniffer for listening to network traffic by reading request/delivery logs, collecting URL information and query or operation instances by reading a query instance delivery log, and generating the associations between the URL of the Web content request and the issued queries or operations.

46. A system for updating the stored Web pages as recited in claim 38, further including an invalidator/refresher for notifying appropriate caches or Web servers of the invalidity of a particular stored Web page, the invalidator/refresher including:
    a registration module for creating invalidation policies and collecting relevant query or operation statistics;
    an invalidation module for reading the database update logs and the associations between the URL of the Web content request and the issued queries or operations, scheduling subqueries, and notifying appropriate caches or Web servers of the invalidity of a particular stored Web page; and
    an information management module for creating auxiliary data structures for the invalidation module.

47. A system for updating the stored Web pages as recited in claim 38, the at least one server further programmed for:
    receiving a query sent to the at least one second memory, the query including one or more query conditions linked by operators, the linked query conditions identifying data in the at least one second memory associated with that query; and
    determining if the query is associated with the identified modified data by determining if the identified modified data satisfies the linked query conditions.

48. A system for updating the stored Web pages as recited in claim 47, wherein if the linked query conditions require access to more than one table in the at least one second memory, the at least one server is further programmed such that for each table to which access is required, the at least one server determines if the identified modified data satisfies those portions of the linked query condition specific to that particular table;
    wherein after it is determined whether the identified modified data satisfies those portions of the linked query condition specific to a particular table, those portions of the linked query condition specific to a particular table are replaced by a determined value prior to evaluating those portions of the linked query condition specific to another particular table; and
    wherein, if at any time during the determination of whether the identified modified data satisfies those portions of the linked query condition specific to a particular table, it is determined that the linked query conditions are satisfied, then the identified modified data satisfies the linked query conditions.

49. A system for updating the stored Web pages as recited in claim 48, wherein after those portions of the linked query condition specific to a particular table are evaluated and a value for those portions is determined, in order to evaluate those portions of the linked query condition specific to another particular table, the at least one server is further programmed for:
    issuing a subquery to the other particular table containing the linked query conditions, with portions of the linked query condition replaced by any previously determined values.

50. A system for updating the stored Web pages as recited in claim 49, wherein after a subquery issued to a particular table returns determined values for that subquery, the determined values are stored in an index structure;
    wherein if subsequent queries are received by the at least one server that would require reissuing the same subquery, the index structure may be accessed by the at least one server to avoid having to issue the same subquery.

51. A system for updating stored Web pages as recited in claim 2, the at least one server further programmed for:
    extracting URL information from the received the Web content requests;
    extracting query and operation information from the issued queries and operations;
    maintaining a URL/relevant operation mapping log from the extracted URL information and the extracted query and operation information; and
    determining, from the identity of the modified data, the maintained associations between the issued queries or operations and the stored data, and the URL/relevant operation mapping log, which stored Web pages are associated with the identified modified data.

52. A system for updating stored Web pages as recited in claim 51, the at least one server including:
    an application server proxy for extracting URL information from the received the Web content requests, extracting query and operation information from the issued queries and operations, forwarding the received Web content requests, and maintaining the URL/relevant operation mapping log;
    an application server for receiving Web server requests forwarded by the application server proxy and issuing the at least one query or operation in response to the forwarded Web content request;
    a content change monitor programmed for maintaining the associations between the issued queries or operations and the stored data accessed by the queries or operations, and determining which queries or operations are associated with the identified modified data; and
    a content delivery services server programmed for receiving an identity of the queries or operations associated with the identified modified data from the content change monitor, receiving the URL/relevant operation mapping log, determining which stored Web pages are associated with the queries or operations associated with the identified modified data, and communicating the update command to the at least one first memory that contains the stored Web pages associated with the identified modified data.

53. A system for updating the stored Web pages as recited in claim 52, the content change monitor programmed for:
    receiving queries sent to the at least one second memory;
    defining a view table for each query containing pointers to all data in the at least one second memory that is associated with that particular query;
    receiving the identified modified data from the memory management system; and
    determining from the view table and the identified modified data any queries associated with the identified modified data.

54. A system for updating the stored Web pages as recited in claim 52, the content change monitor programmed for:
    receiving operations sent to the at least one second memory;
    defining a daemon for each operation, the daemon establishing criteria for identifying stored data in the at least one second memory that is associated with that particular operation; and
    determining queries associated with the identified modified data by determining if the identified modified data satisfies the daemon.

55. A system for updating the stored Web pages as recited in claim 52, the content change monitor programmed for:
    receiving queries sent to the at least one second memory;

creating a trigger definition for each query, the trigger definition establishing criteria for identifying stored data in the at least one second memory associated with that particular query; and determining queries associated with the identified modified data by determining if the identified modified data satisfies the trigger definition.

56. A system for updating the stored Web pages as recited in claim 52, the content change monitor containing at least one third memory and further programmed for:

replicating data from the at least one second memory to the at least one third memory to harmonize the at least one third memory with the at least one second memory; and defining the view table for each query containing pointers to all data in the at least one third memory that is associated with that particular query.

57. A system for updating the stored Web pages as recited in claim 53, the content change monitor containing at least one third memory and further programmed for:

performing all operations in the database log on the at least one third memory, in sequential order, to harmonize the at least one third memory with the at least one second memory; and defining the view table for each query containing pointers to all data in the at least one third memory that is associated with that particular query.

58. A system for updating the stored Web pages as recited in claim 51, further including a sniffer for listening to network traffic by reading request/delivery logs, collecting URL information and query or operation instances by reading a query instance delivery log, and generating the associations between the URL of the Web content request and the issued queries or operations.

59. A system for updating the stored Web pages as recited in claim 51, further including an invalidator/refresher for notifying appropriate caches or Web servers of the invalidity of a particular stored Web page, the invalidator/refresher including:

a registration module for creating invalidation policies and collecting relevant query or operation statistics;

an invalidation module for reading the database update logs and the associations between the URL of the Web content request and the issued queries or operations, scheduling subqueries, and notifying appropriate caches or Web servers of the invalidity of a particular stored Web page; and an information management module for creating auxiliary data structures for the invalidation module.

60. A system for updating the stored Web pages as recited in claim 51, the at least one server further programmed for:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

61. A system for updating the stored Web pages as recited in claim 60, wherein if the linked query conditions require access to more than one table in the at least one second memory, the at least one server is further programmed such that for each table to which access is required, the at least one server determines if the identified modified data satisfies those portions of the linked query condition specific to that particular table;

wherein after it is determined whether the identified modified data satisfies those portions of the linked query condition specific to a particular table, those portions of the linked query condition specific to a particular table are replaced by a determined value prior to evaluating those portions of the linked query condition specific to another particular table; and wherein, if at any time during the determination of whether the identified modified data satisfies those portions of the linked query condition specific to a particular table, it is determined that the linked query conditions are satisfied, then the identified modified data satisfies the linked query conditions.

62. A system for updating the stored Web pages as recited in claim 61, wherein after those portions of the linked query condition specific to a particular table are evaluated and a value for those portions is determined, in order to evaluate those portions of the linked query condition specific to another particular table, the at least one server is further programmed for:

issuing a subquery to the other particular table containing the linked query conditions, with portions of the linked query condition replaced by any previously determined values.

63. A system for updating the stored Web pages as recited in claim 62, wherein after a subquery issued to a particular table returns determined values for that subquery, the determined values are stored in an index structure;

wherein if subsequent queries are received by the at least one server that would require reissuing the same subquery, the index structure may be accessed by the at least one server to avoid having to issue the same subquery.

64. In a system having at least one first memory for storing Web pages and a memory management system including at least one second memory for storing data used to generate Web pages, the memory management system capable of identifying modified data stored in the at least one second memory and maintaining at least one database log sequentially containing all operations to the at least one second memory, a method for updating stored Web pages based on modifications to data stored in the at least one second memory comprising the steps of:

maintaining associations between each stored Web page and the stored data used to generate that particular Web page, receiving the identity of modified data from the memory management system, determining, from the identified modified data and the maintained associations, which stored Web pages are associated with the identified modified data, and communicating an update command to the at least one first memory that contains the stored Web pages associated with the identified modified data for updating the stored Web pages.

65. A method for updating stored Web pages as recited in claim 64, the method further including the steps of:

receiving a Web content request containing a URL;

issuing at least one query or operation to the at least one second memory in response to the Web content request;

maintaining associations between the URL of the Web content request and the issued queries or operations;

maintaining associations between the issued queries or operations and the stored data accessed by the queries or operations;

deriving associations between the stored Web pages and the stored data from the maintained associations between the URL of the Web content request and the issued queries or operations, and the maintained associations between the issued queries or operations and the stored data accessed by the queries or operations; and identifying, through prior processing steps to store the stored Web pages in the at least one first memory, the location of the Web pages associated with the identified modified data.

66. A method for updating the stored Web pages as recited in claim 65, wherein the step of communicating an update command includes communicating a message to invalidate or delete the stored Web pages.

67. A method for updating the stored Web pages as recited in claim 65, wherein the step of communicating an update command includes communicating a message to refresh the stored Web pages.

68. A method for updating the stored Web pages as recited in claim 67, wherein if the stored Web page is in a Web server, the step of communicating an update command includes communicating a message to generate a new Web page and store the new Web page in the Web server.

69. A method for updating stored Web pages as recited in claim 65, the method further including the steps of:

maintaining a Web server log containing a request and delivery timestamp for the received URL;

maintaining a query and operation log containing an issuance timestamp for the issued query or operation;

deriving associations between the stored Web pages and the stored data from the Web server log and the query and operation log; and determining, from the identity of the modified data and the derived associations between the stored Web pages and the stored data, which stored Web pages are associated with the identified modified data.

70. A method for updating the stored Web pages as recited in claim 69, the method further including the steps of:

receiving queries sent to the at least one second memory;

defining a view table for each query containing pointers to all data in the at least one second memory that is associated with that particular query;

receiving the identified modified data from the memory management system; and determining from the view table and the identified modified data any queries associated with the identified modified data.

71. A method for updating the stored Web pages as recited in claim 69, the method further including the steps of:

receiving operations sent to the at least one second memory;

defining a daemon for each operation, the daemon establishing criteria for identifying stored data in the at least one second memory that is associated with that particular operation; and determining queries associated with the identified modified data by determining if the identified modified data satisfies the daemon.

72. A method for updating the stored Web pages as recited in claim 69, the method further including the steps of:

receiving queries sent to the at least one second memory;

creating a trigger definition for each query, the trigger definition establishing criteria for identifying stored data in the at least one second memory associated with that particular query; and determining queries associated with the identified modified data by determining if the identified modified data satisfies the trigger definition.

73. A method for updating the stored Web pages as recited in claim 70, the method further including the steps of:

replicating data from the at least one second memory to at least one third memory to harmonize the at least one third memory with the at least one second memory; and defining the view table for each query containing pointers to all data in the at least one third memory that is associated with that particular query.

74. A method for updating the stored Web pages as recited in claim 70, the method further including the steps of:

performing all operations in a database log on at least one third memory, in sequential order, to harmonize the at least one third memory with the at least one second memory; and defining the view table for each query containing pointers to all data in the at least one third memory that is associated with that particular query.

75. A method for updating the stored Web pages as recited in claim 69, the method further including the steps of listening to network traffic by reading request/delivery logs, collecting URL information and query or operation instances by reading a query instance delivery log, and generating the associations between the URL of the Web content request and the issued queries or operations.

76. A method for updating the stored Web pages as recited in claim 69, the method further including the steps of:

creating invalidation policies and collecting relevant query or operation statistics;

reading database update logs and the associations between the URL of the Web content request and the issued queries or operations, scheduling subqueries, and notifying appropriate caches or Web servers of the invalidity of a particular stored Web page; and creating auxiliary data structures.

77. A method for updating the stored Web pages as recited in claim 69, the method further including the steps of:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

78. A method for updating the stored Web pages as recited in claim 77, wherein if the linked query conditions require access to more than one table in the at least one second memory, the method further includes the step of determining, for each table to which access is required, if the identified modified data satisfies those portions of the linked query condition specific to that particular table;

wherein after it is determined whether the identified modified data satisfies those portions of the linked query condition specific to a particular table, the method further includes the step of replacing those portions of the linked query condition specific to a particular table by a determined value prior to evaluating those portions of the linked query condition specific to another particular table; and wherein the method further includes the step of determining that the identified modified data satisfies the linked query conditions if, at any time, the linked query conditions are satisfied.

79. A method for updating the stored Web pages as recited in claim 78, wherein after those portions of the linked query condition specific to a particular table are evaluated and a value for those portions is determined, in order to evaluate those portions of the linked query condition specific to another particular table, the method further includes the step of:

issuing a subquery to the other particular table containing the linked query conditions, with portions of the linked query condition replaced by any previously determined values.

80. A method for updating the stored Web pages as recited in claim 79, wherein after a subquery issued to a particular table returns determined values for that subquery, the method further includes the step of storing the determined values in an index structure;

wherein if subsequent queries are received by the at least one server that would require reissuing the same subquery, the method further includes the step of accessing the index structure to avoid having to issue the same subquery.

81. A method for updating stored Web pages as recited in claim 65, the method further including the steps of:

maintaining a URL/relevant operation mapping log from the URLs contained in the received Web content requests and the queries or operations issued to the least one second memory in response to the Web content requests; and determining, from the identity of the modified data, the maintained associations between the issued queries or operations and the stored data, and the URL/relevant operation mapping log, which stored Web pages are associated with the identified modified data.

82. A method for updating the stored Web pages as recited in claim 81, the method further including the steps of:

receiving queries sent to the at least one second memory;

defining a view table for each query containing pointers to all data in the at least one second memory that is associated with that particular query;

receiving the identified modified data from the memory management system; and determining from the view table and the identified modified data any queries associated with the identified modified data.

83. A method for updating the stored Web pages as recited in claim 81, the method further including the steps of:

receiving operations sent to the at least one second memory;

defining a daemon for each operation, the daemon establishing criteria for identifying stored data in the at least one second memory that is associated with that particular operation; and determining queries associated with the identified modified data by determining if the identified modified data satisfies the daemon.

84. A method for updating the stored Web pages as recited in claim 81, the method further including the steps of:

receiving queries sent to the at least one second memory;

creating a trigger definition for each query, the trigger definition establishing criteria for identifying stored data in the at least one second memory associated with that particular query; and determining queries associated with the identified modified data by determining if the identified modified data satisfies the trigger definition.

85. A method for updating the stored Web pages as recited in claim 82, the method further including the steps of:

replicating data from the at least one second memory to at least one third memory to harmonize the at least one third memory with the at least one second memory; and defining the view table for each query containing pointers to all data in the at least one third memory that is associated with that particular query.

86. A method for updating the stored Web pages as recited in claim 82, the method further including the steps of:

performing all operations in the database log on at least one third memory, in sequential order, to harmonize the at least one third memory with the at least one second memory; and defining the view table for each query containing pointers to all data in the at least one third memory that is associated with that particular query.

87. A method for updating the stored Web pages as recited in claim 81, the method further including the steps of listening to network traffic by reading request/delivery logs, collecting URL information and query or operation instances by reading a query instance delivery log, and generating the associations between the URL of the Web content request and the issued queries or operations.

88. A method for updating the stored Web pages as recited in claim 81, the method further including the steps of:

creating invalidation policies and collecting relevant query or operation statistics;

reading database update logs and the associations between the URL of the Web content request and the issued queries or operations, scheduling subqueries, and notifying appropriate caches or Web servers of the invalidity of a particular stored Web page; and creating auxiliary data structures.

89. A method for updating the stored Web pages as recited in claim 81, the method further including the steps of:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

90. A method for updating the stored Web pages as recited in claim 89, wherein if the linked query conditions require access to more than one table in the at least one second memory, the method further includes the step of determining, for each table to which access is required, if the identified modified data satisfies those portions of the linked query condition specific to that particular table;

wherein after it is determined whether the identified modified data satisfies those portions of the linked query condition specific to a particular table, the method further includes the step of replacing those portions of the linked query condition specific to a particular table by a determined value prior to evaluating those portions of the linked query condition specific to another particular table; and wherein the method further including the step of determining that the identified modified data satisfies the linked query conditions if, at any time, the linked query conditions are satisfied.

91. A method for updating the stored Web pages as recited in claim 90, wherein after those portions of the linked query condition specific to a particular table are evaluated and a value for those portions is determined, in order to evaluate those portions of the linked query condition specific to another particular table, the method further includes the step of:

issuing a subquery to the other particular table containing the linked query conditions, with portions of the linked query condition replaced by any previously determined values.

92. A method for updating the stored Web pages as recited in claim 91, wherein after a subquery issued to a particular table returns determined values for that subquery, the method further includes the step of storing the determined values in an index structure;

wherein if subsequent queries are received by the at least one server that would require reissuing the same subquery, the method further including the step of accessing the index structure to avoid having to issue the same subquery.

93. A method for updating stored Web pages as recited in claim 65, the method further including the steps of:

converting received Web content requests into stored procedures;

maintaining a database query log from the URLs contained in the stored procedures and the queries issued to the least one second memory in response to the stored procedures;

maintaining an operation log from the URLs contained in the stored procedures and the operations issued to the least one second memory in response to the stored procedures;

generating a URL/relevant operation mapping table from the database query log and the operation log; and determining, from the identity of the modified data, the maintained associations between the issued queries or operations and the stored data, and the URL/relevant operation mapping table which stored Web pages are associated with the identified modified data.

94. A method for updating the stored Web pages as recited in claim 93, the method further including the steps of:

receiving queries sent to the at least one second memory;

defining a view table for each query containing pointers to all data in the at least one second memory that is associated with that particular query;

receiving the identified modified data from the memory management system; and determining from the view table and the identified modified data any queries associated with the identified modified data.

95. A method for updating the stored Web pages as recited in claim 93, the method further including the steps of:

receiving queries or operations sent to the at least one second memory;

defining a daemon for each query or operation, the daemon establishing criteria for identifying stored data in the at least one second memory that is associated with that particular query or operation; and determining queries associated with the identified modified data by determining if the identified modified data satisfies the daemon.

96. A method for updating the stored Web pages as recited in claim 93, the method further including the steps of:

receiving queries sent to the at least one second memory;

creating a trigger definition for each query, the trigger definition establishing criteria for identifying stored data in the at least one second memory associated with that particular query; and determining queries associated with the identified modified data by determining if the identified modified data satisfies the trigger definition.

97. A method for updating the stored Web pages as recited in claim 94, the method further including the steps of:

replicating data from the at least one second memory to at least one third memory to harmonize the at least one third memory with the at least one second memory; and defining the view table for each query containing pointers to all data in the at least one third memory that is associated with that particular query.

98. A method for updating the stored Web pages as recited in claim 94, the method further including the steps of:

performing all operations in the database log on at least one third memory, in sequential order, to harmonize the at least one third memory with the at least one second memory; and defining the view table for each query containing pointers to all data in the at least one third memory that is associated with that particular query.

99. A method for updating the stored Web pages as recited in claim 93, the method further including the steps of listening to network traffic by reading request/delivery logs, collecting URL information and query or operation instances by reading a query instance delivery log, and generating the associations between the URL of the Web content request and the issued queries or operations.

100. A method for updating the stored Web pages as recited in claim 93, the method further including the steps of:

creating invalidation policies and collecting relevant query or operation statistics;

reading database update logs and the associations between the URL of the Web content request and the issued queries or operations, scheduling subqueries, and notifying appropriate caches or Web servers of the invalidity of a particular stored Web page; and creating auxiliary data structures.

101. A method for updating the stored Web pages as recited in claim 93, the method further including the steps of:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

102. A method for updating the stored Web pages as recited in claim 101, wherein if the linked query conditions require access to more than one table in the at least one second memory, the method further includes the step of determining, for each table to which access is required, if the identified modified data satisfies those portions of the linked query condition specific to that particular table;

wherein after it is determined whether the identified modified data satisfies those portions of the linked query condition specific to a particular table, the method further includes the step of replacing those portions of the linked query condition specific to a particular table by a determined value prior to evaluating those portions of the linked query condition specific to another particular table; and wherein the method further includes the step of determining that the identified modified data satisfies the linked query conditions if, at any time, the linked query conditions are satisfied.

103. A method for updating the stored Web pages as recited in claim 102, wherein after those portions of the linked query condition specific to a particular table are evaluated and a value for those portions is determined, in order to evaluate those portions of the linked query condition specific to another particular table, the method further includes the step of:

issuing a subquery to the other particular table containing the linked query conditions, with portions of the linked query condition replaced by any previously determined values.

104. A method for updating the stored Web pages as recited in claim 103, wherein after a subquery issued to a particular table returns determined values for that subquery, the method further includes the step of storing the determined values in an index structure;

wherein if subsequent queries are received by the at least one server that would require reissuing the same subquery, the method further includes the step of accessing the index structure to avoid having to issue the same subquery.

105. A method for updating stored Web pages as recited in claim 65, the method further including the steps of:

extracting URL information from the received the Web content requests;

extracting query and operation information from the issued queries and operations;

maintaining a URL/relevant operation mapping log from the extracted URL information and the extracted query and operation information; and determining, from the identity of the modified data, the maintained associations between the issued queries or operations and the stored data, and the URL/relevant operation mapping log, which stored Web pages are associated with the identified modified data.

106. A method for updating the stored Web pages as recited in claim 105, the method further including the steps of:

receiving queries sent to the at least one second memory;

defining a view table for each query containing pointers to all data in the at least one second memory that is associated with that particular query;

receiving the identified modified data from the memory management system; and determining from the view table and the identified modified data any queries associated with the identified modified data.

107. A method for updating the stored Web pages as recited in claim 105, the method further including the steps of:

receiving operations sent to the at least one second memory;

defining a daemon for each operation, the daemon establishing criteria for identifying stored data in the at least one second memory that is associated with that particular operation; and determining queries associated with the identified modified data by determining if the identified modified data satisfies the daemon.

108. A method for updating the stored Web pages as recited in claim 105, the method further including the steps of:

receiving queries sent to the at least one second memory;

creating a trigger definition for each query, the trigger definition establishing criteria for identifying stored data in the at least one second memory associated with that particular query; and determining queries associated with the identified modified data by determining if the identified modified data satisfies the trigger definition.

109. A method for updating the stored Web pages as recited in claim 106, the method further including the steps of:

replicating data from the at least one second memory to at least one third memory to harmonize the at least one third memory with the at least one second memory; and defining the view table for each query containing pointers to all data in the at least one third memory that is associated with that particular query.

110. A method for updating the stored Web pages as recited in claim 106, the method further including the steps of:

performing all operations in the database log on at least one third memory, in sequential order, to harmonize the at least one third memory with the at least one second memory; and defining the view table for each query containing pointers to all data in the at least one third memory that is associated with that particular query.

111. A method for updating the stored Web pages as recited in claim 105, the method further including the steps of listening to network traffic by reading request/delivery logs, collecting URL information and query or operation instances by reading a query instance delivery log, and generating the associations between the URL of the Web content request and the issued queries or operations.

112. A method for updating the stored Web pages as recited in claim 105, the method further including the steps of:

creating invalidation policies and collecting relevant query or operation statistics;

reading database update logs and the associations between the URL of the Web content request and the issued queries or operations, scheduling subqueries, and notifying appropriate caches or Web servers of the invalidity of a particular stored Web page; and creating auxiliary data structures.

113. A method for updating the stored Web pages as recited in claim 105, the method further including the steps of:

receiving a query sent to the at least one second memory, the query including one or more query conditions linked by operators, the linked query conditions identifying data in the at least one second memory associated with that query; and determining if the query is associated with the identified modified data by determining if the identified modified data satisfies the linked query conditions.

114. A method for updating the stored Web pages as recited in claim 113, wherein if the linked query conditions require access to more than one table in the at least one second memory, the method further includes the step of determining, for each table to which access is required, if the identified modified data satisfies those portions of the linked query condition specific to that particular table;

wherein after it is determined whether the identified modified data satisfies those portions of the linked query condition specific to a particular table, the method further includes the step of replacing those portions of the linked query condition specific to a particular table by a determined value prior to evaluating those portions of the linked query condition specific to another particular table; and wherein the method further includes the step determining that the identified modified data satisfies the linked query conditions if, at any time, the linked query conditions are satisfied.

115. A method for updating the stored Web pages as recited in claim 114, wherein after those portions of the linked query condition specific to a particular table are evaluated and a value for those portions is determined, in order to evaluate those portions of the linked query condition specific to another particular table, the method further includes the step of:

issuing a subquery to the other particular table containing the linked query conditions, with portions of the linked query condition replaced by any previously determined values.

116. A method for updating the stored Web pages as recited in claim 115, wherein after a subquery issued to a particular table returns determined values for that subquery, the method further includes the step of storing the determined values in an index structure;

wherein if subsequent queries are received by the at least one server that would require reissuing the same subquery, the method further includes the step of accessing the index structure to avoid having to issue the same subquery.

117. A system for updating the stored Web pages as recited in claim 14, the registration module further programmed for:

registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained;

wherein updating the stored Web pages includes refreshing, invalidating, or deleting the stored Web pages.

118. A system for updating the stored Web pages as recited in claim 117, wherein the determination of whether a join index should be maintained is favored if the join index size is small, the join index update frequency is low, the database or external data source query frequency is high, or the database or external data source query cost is high.

119. A system for updating the stored Web pages as recited in claim 14, the invalidation module further programmed for:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

120. A system for updating the stored Web pages as recited in claim 14, the information management module further programmed for:

performing query instance coalescing by identifying related query instances and processing them as a group;

performing query type coalescing by identifying related query types and processing them in a coordinated manner; and performing update coalescing by identifying related database or external data source updates, deletions, or insertions, and processing them as a group.

121. A system for updating the stored Web pages as recited in claim 14, the invalidator/refresher further programmed for:

forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;

forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and utilizing the positive query lattice for determining when a database or external data source change will not affect a query, and utilizing the negative query lattice for determining when a database or external data source change will affect a query.

122. A system for updating the stored Web pages as recited in claim 14, the invalidator/refresher further programmed for:

determining, based on a number or complexity of queries generated by a particular Web page request, whether to cache, invalidate, or refresh the stored Web pages.

123. A system for updating the stored Web pages as recited in claim 27, the registration module further programmed for:

registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained;

wherein updating the stored Web pages includes refreshing, invalidating, or deleting the stored Web pages.

124. A system for updating the stored Web pages as recited in claim 123, wherein the determination of whether a join index should be maintained is favored if the join index size is small, the join index update frequency is low, the database or external data source query frequency is high, or the database or external data source query cost is high.

125. A system for updating the stored Web pages as recited in claim 27, the invalidation module further programmed for:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

126. A system for updating the stored Web pages as recited in claim 27, the information management module further programmed for:

performing query instance coalescing by identifying related query instances and processing them as a group;

performing query type coalescing by identifying related query types and processing them in a coordinated manner; and performing update coalescing by identifying related database or external data source updates, deletions, or insertions, and processing them as a group.

127. A system for updating the stored Web pages as recited in claim 27, the invalidator/refresher further programmed for:

forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;

forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and utilizing the positive query lattice for determining when a database or external data source change will not affect a query, and utilizing the negative query lattice for determining when a database or external data source change will affect a query.

128. A system for updating the stored Web pages as recited in claim 27, the invalidator/refresher further programmed for:

determining, based on a number or complexity of queries generated by a particular Web page request, whether to cache, invalidate, or refresh the stored Web pages.

129. A system for updating the stored Web pages as recited in claim 46, the registration module further programmed for:

registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained;

wherein updating the stored Web pages includes refreshing, invalidating, or deleting the stored Web pages.

130. A system for updating the stored Web pages as recited in claim 129, wherein the determination of whether a join index should be maintained is favored if the join index size is small, the join index update frequency is low, the database or external data source query frequency is high, or the database or external data source query cost is high.

131. A system for updating the stored Web pages as recited in claim 46, the invalidation module further programmed for:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

132. A system for updating the stored Web pages as recited in claim 46, the information management module further programmed for:

performing query instance coalescing by identifying related query instances and processing them as a group;

performing query type coalescing by identifying related query types and processing them in a coordinated manner; and performing update coalescing by identifying related database or external data source updates, deletions, or insertions, and processing them as a group.

133. A system for updating the stored Web pages as recited in claim 46, the invalidator/refresher further programmed for:

forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;

forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and utilizing the positive query lattice for determining when a database or external data source change will not affect a query, and utilizing the negative query lattice for determining when a database or external data source change will affect a query.

134. A system for updating the stored Web pages as recited in claim 46, the invalidator/refresher further programmed for:

determining, based on a number or complexity of queries generated by a particular Web page request, whether to cache, invalidate, or refresh the stored Web pages.

135. A system for updating the stored Web pages as recited in claim 59, the registration module further programmed for:

registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained;

wherein updating the stored Web pages includes refreshing, invalidating, or deleting the stored Web pages.

136. A system for updating the stored Web pages as recited in claim 135, wherein the determination of whether a join index should be maintained is favored if the join index size is small, the join index update frequency is low, the database or external data source query frequency is high, or the database or external data source query cost is high.

137. A system for updating the stored Web pages as recited in claim 59, the invalidation module further programmed for:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

138. A system for updating the stored Web pages as recited in claim 59, the information management module further programmed for:

performing query instance coalescing by identifying related query instances and processing them as a group;

performing query type coalescing by identifying related query types and processing them in a coordinated manner; and performing update coalescing by identifying related database or external data source updates, deletions, or insertions, and processing them as a group.

139. A system for updating the stored Web pages as recited in claim 59, the invalidator/refresher further programmed for:

forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;

forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and utilizing the positive query lattice for determining when a database or external data source change will not affect a query, and utilizing the negative query lattice for determining when a database or external data source change will affect a query.

140. A system for updating the stored Web pages as recited in claim 59, the invalidator/refresher further programmed for:

determining, based on a number or complexity of queries generated by a particular Web page request, whether to cache, invalidate, or refresh the stored Web pages.

141. A method for updating the stored Web pages as recited in claim 76, the method further including the steps of:

registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained.

142. A method for updating the stored Web pages as recited in claim 141, wherein the step of determining whether a join index should be maintained comprises favoring the maintenance of a join index if the join index size is small, the join index update frequency is low, the database or external data source query frequency is high, or the database or external data source query cost is high.

143. A method for updating the stored Web pages as recited in claim 76, the method further including the steps of:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

144. A method for updating the stored Web pages as recited in claim 76, the method further including the steps of:
  performing query instance coalescing by identifying related query instances and processing them as a group;
  performing query type coalescing by identifying related query types and processing them in a coordinated manner; and
  performing update coalescing by identifying related database or external data source updates, deletions, or insertions, and processing them as a group.

145. A method for updating the stored Web pages as recited in claim 76, the method further including the steps of:
  forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;
  forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and
  utilizing the positive query lattice for determining when a database or external data source change will not affect a query, and utilizing the negative query lattice for determining when a database or external data source change will affect a query.

146. A method for updating the stored Web pages as recited in claim 76, the method further including the step of determining, based on a number or complexity of queries generated by a particular Web page request, whether to cache, invalidate or refresh the stored Web pages.

147. A method for updating the stored Web pages as recited in claim 88, the method further including the steps of:
  registering, in an off-line mode, those query types that the invalidator/refresher must detect, and storing the registered query types in an auxiliary data structure;
  scanning the associations between the URL of the Web content request and the issued queries or operations, locating query instances that cannot be associated with a known query type, interpreting those query instances to identify their query types, and registering, in an on-line mode, the identified query types; and
  determining, based on join index size, update frequency, or query frequency, whether a join index should be maintained;
  wherein updating the stored Web pages includes refreshing, invalidating, or deleting the stored Web pages.

148. A method for updating the stored Web pages as recited in claim 147, wherein the step of determining whether a join index should be maintained comprises favoring the maintenance of a join index if the join index size is small, the join index update frequency is low, the database or external data source query frequency is high, or the database or external data source query cost is high.

149. A method for updating the stored Web pages as recited in claim 88, the method further including the steps of:
  performing database polling request scheduling by reading invalidation policies and the auxiliary data structures to identify which database polling requests must be generated, and determining when these requests should be sent to memory management systems or external data sources; and
  converting database polling requests into subqueries or suboperations readable by the memory management systems or the external data sources;
  wherein updating the stored Web pages includes refreshing, invalidating, or deleting the stored Web pages.

150. A method for updating the stored Web pages as recited in claim 88, the method further including the steps of:
  performing query instance coalescing by identifying related query instances and processing them as a group;
  performing query type coalescing by identifying related query types and processing them in a coordinated manner; and
  performing update coalescing by identifying related database or external data source updates, deletions, or insertions, and processing them as a group.

151. A method for updating the stored Web pages as recited in claim 88, the method further including the steps of:
  forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;
  forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and
  utilizing the positive query lattice for determining when a database or external data source change will not affect a query, and utilizing the negative query lattice for determining when a database or external data source change will affect a query.

152. A method for updating the stored Web pages as recited in claim 88, the method further including the step of determining, based on a number or complexity of queries generated by a particular Web page request, whether to invalidate or refresh the stored Web pages.

153. A method for updating the stored Web pages as recited in claim 100, the method further including the steps of:
  registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained;

wherein updating the stored Web pages includes refreshing, invalidating, or deleting the stored Web pages.

154. A method for updating the stored Web pages as recited in claim 153, wherein the step of determining whether a join index should be maintained comprises favoring the maintenance of a join index if the join index size is small, the join index update frequency is low, the database or external data source query frequency is high, or the database or external data source query cost is high.

155. A method for updating the stored Web pages as recited in claim 100, the method further including the steps of:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

156. A method for updating the stored Web pages as recited in claim 100, the method further including the steps of:

performing query instance coalescing by identifying related query instances and processing them as a group;

performing query type coalescing by identifying related query types and processing them in a coordinated manner; and performing update coalescing by identifying related database or external data source updates, deletions, or insertions, and processing them as a group.

157. A method for updating the stored Web pages as recited in claim 100, the method further including the steps of:

forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;

forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and utilizing the positive query lattice for determining when a database or external data source change will not affect a query, and utilizing the negative query lattice for determining when a database or external data source change will affect a query.

158. A method for updating the stored Web pages as recited in claim 100, the method further including the step of determining, based on a number or complexity of queries generated by a particular Web page request, whether to invalidate or refresh the stored Web pages.

159. A method for updating the stored Web pages as recited in claim 112, the method further including the steps of:

registering, in an off-line mode, those query types that the invalidator/refresher must detect, and storing the registered query types in an auxiliary data structure;

scanning the associations between the URL of the Web content request and the issued queries or operations, locating query instances that cannot be associated with a known query type, interpreting those query instances to identify their query types, and registering, in an on-line mode, the identified query types; and determining, based on join index size, update frequency, or query frequency, whether a join index should be maintained;

wherein updating the stored Web pages includes refreshing, invalidating, or deleting the stored Web pages.

160. A method for updating the stored Web pages as recited in claim 159, wherein the step of determining whether a join index should be maintained comprises favoring the maintenance of a join index if the join index size is small, the join index update frequency is low, the database or external data source query frequency is high, or the database or external data source query cost is high.

161. A method for updating the stored Web pages as recited in claim 112, the method further including the steps of:

performing database polling request scheduling by reading invalidation policies and the auxiliary data structures to identify which database polling requests must be generated, and determining when these requests should be sent to memory management systems or external data sources; and converting database polling requests into subqueries or suboperations readable by the memory management systems or the external data sources;

wherein updating the stored Web pages includes refreshing, invalidating, or deleting the stored Web pages.

162. A method for updating the stored Web pages as recited in claim 112, the method further including the steps of:

performing query instance coalescing by identifying related query instances and processing them as a group;

performing query type coalescing by identifying related query types and processing them in a coordinated manner; and performing update coalescing by identifying related database or external data source updates, deletions, or insertions, and processing them as a group.

163. A method for updating the stored Web pages as recited in claim 112, the method further including the steps of:

forming a positive query lattice for a particular query, the positive query lattice comprised of a sequence of query conditions arranged in an order such that if a database or external data source change is detected, and the sequence of query conditions is evaluated, as soon as one query condition is not satisfied, it can be determined that the database or external data source change will not affect the particular query, and no further query conditions will need to be evaluated;

forming a negative query lattice for a particular query, the negative query lattice comprised of a sequence of query conditions arranged in an order such that if a database or external data source change is detected, and the sequence of query conditions is evaluated, as soon as one query condition is satisfied, it can be determined that the database or external data source change will affect the particular query, and no further query conditions will need to be evaluated; and utilizing the positive query lattice for determining when a database or external data source change will not affect a query, and utilizing the negative query lattice for determining when a database or external data source change will affect a query.

164. A method for updating the stored Web pages as recited in claim 112, the method further including the step of determining, based on a number or complexity of queries generated by a particular Web page request, whether to invalidate or refresh the stored Web pages.

* * * * *